(12) United States Patent
Yosoku et al.

(10) Patent No.: US 8,422,581 B2
(45) Date of Patent: Apr. 16, 2013

(54) MULTI-ANTENNA TRANSMISSION DEVICE, MULTI-ANTENNA RECEPTION DEVICE, MULTI-ANTENNA TRANSMISSION METHOD, MULTI-ANTENNA RECEPTION METHOD, TERMINAL DEVICE, AND BASE STATION DEVICE

(75) Inventors: Naoya Yosoku, Kanagawa (JP); Yutaka Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 943 days.

(21) Appl. No.: 12/523,481

(22) PCT Filed: Jan. 21, 2008

(86) PCT No.: PCT/JP2008/050714
§ 371 (c)(1),
(2), (4) Date: Jul. 16, 2009

(87) PCT Pub. No.: WO2008/088066
PCT Pub. Date: Jul. 24, 2008

(65) Prior Publication Data
US 2010/0046658 A1 Feb. 25, 2010

(30) Foreign Application Priority Data

Jan. 19, 2007 (JP) .................. 2007-010817
Jan. 21, 2008 (JP) .................. 2008-010337

(51) Int. Cl.
*H04B 7/02* (2006.01)

(52) U.S. Cl.
USPC .......... 375/267; 375/260; 375/261; 375/262; 375/269; 375/295; 375/298; 375/299; 375/302; 375/340; 375/341; 375/347; 370/210; 370/334; 370/344; 370/464; 455/101; 455/132; 455/500; 455/562.1; 341/173; 341/180

(58) Field of Classification Search .................. 375/260, 375/261, 262, 267, 269, 279, 295, 298, 299, 375/302, 308, 340, 341, 347; 370/210, 334, 370/344, 464, 480; 455/101, 132, 500, 562.1; 341/173, 180
See application file for complete search history.

(56) References Cited

U.S. PATENT DOCUMENTS

2003/0002450 A1 * 1/2003 Jalali et al. .................. 370/294
(Continued)

FOREIGN PATENT DOCUMENTS
EP 1 865 642 12/2007
(Continued)

OTHER PUBLICATIONS

International Search Report dated Apr. 22, 2008.
(Continued)

*Primary Examiner* — Leon Flores
(74) *Attorney, Agent, or Firm* — Dickinson Wright PLLC

(57) ABSTRACT

Provided is a multi-antenna transmission device (400) which can perform MLD by using a simple configuration of a reception device in a MIMO-AMC system. The multi-antenna transmission device (400) includes common signal point mapping units (401, 402) for mapping data transmitted from different antennas (111, 112) in transmission scheme using MIMO spatial multiplexing, to common signal points shared by respective modulation methods. Thus, the arrangement of baseband signal points obtained by mapping a code word after channel encoding onto an IQ plane can be shared as common signal points shared by modulation methods. Accordingly, the reception device need not prepare a particular circuit for performing MLD calculation in accordance with a combination of the methods for modulating the signals which have been MIMO-space multiplexed. This can reduce the circuit size of the MLD calculation circuit.

13 Claims, 37 Drawing Sheets

U.S. PATENT DOCUMENTS

| | | | |
|---|---|---|---|
| 2003/0108117 A1* | 6/2003 | Ketchum et al. | 375/295 |
| 2006/0136975 A1 | 6/2006 | Murakami | |
| 2007/0253476 A1* | 11/2007 | Tirkkonen et al. | 375/230 |

FOREIGN PATENT DOCUMENTS

| | | |
|---|---|---|
| JP | 10-093650 | 4/1998 |
| JP | 2002-204275 | 7/2002 |
| JP | 2006-196989 | 7/2006 |
| JP | 2006-211096 | 8/2006 |
| WO | 2006/106613 A1 | 10/2006 |

OTHER PUBLICATIONS

3GPP TSG RAN WG1, TSG-R1(01)0879, "Increasing MIMO throughput with per-antenna rate control," Lucent Technologies, Aug. 2001, p. 1-13, p. 12, line 8.

IEEE Std 802.11a-1999(R 2003), ISO/IEC 8802-11:1999/Amd 1:2000 (E), "Part 11 Wireless LAN Medium Access Control (MAC) and Physical Layer (PHY) specifications: High-speed Physical Layer in the 5 GHz Band," IEEE-SA Standards Board, Jun. 2003, pp. i-vii and 1-83, p. 12, line 12.

G. Strang, "Linear algebra and its applications," Sangyo Tosho Publishing Co., Ltd., Jan. 2005, p. 135-145, with 7 page English translation, p. 12, line 20.

* cited by examiner

| RECEPTION SINR [dB] | CODE RATE | MODULATION SCHEME | TRANSMISSION POWER [dBm] |
|---|---|---|---|
| LESS THAN 15 | 1/2 | QPSK | 20 |
| 15 TO LESS THAN 21 | 3/4 | QPSK | 20 |
| 21 TO LESS THAN 27 | 1/2 | 16QAM | 20 |
| 27 TO LESS THAN 33 | 3/4 | 16QAM | 20 |
| 33 TO LESS THAN 39 | 5/6 | 16QAM | 20 |
| 39 TO LESS THAN 42 | 5/6 | 16QAM | 17 |
| 42 TO LESS THAN 45 | 5/6 | 16QAM | 14 |
| 45 OR MORE | 5/6 | 16QAM | 11 |

FIG.13

MULTI-ANTENNA TRANSMISSION DEVICE, MULTI-ANTENNA RECEPTION DEVICE, MULTI-ANTENNA TRANSMISSION METHOD, MULTI-ANTENNA RECEPTION METHOD, TERMINAL DEVICE, AND BASE STATION DEVICE

TECHNICAL FIELD

The present invention relates to a multi-antenna transmitting apparatus, multi-antenna receiving apparatus, multi-antenna transmitting method, multi-antenna receiving method, terminal apparatus, and base station apparatus that use a MIMO (Multiple Input Multiple Output) spatial-multiplexing.

BACKGROUND ART (MIMO-AMC)

In recent years, there has been a demand in the radio communications field for a technology for transmitting large-volume digital data using a limited frequency band, and transmission scheme using MIMO spatial-multiplexing is known as one method for realizing this.

Also, AMC (Adaptive Modulation and Channel coding) is known as a method for improving transmission efficiency. A method combining MIMO and AMC (hereinafter referred to as MIMO-AMC) has been proposed whereby a modulation scheme and code rate are changed for each transmit antenna so as to adapt to the state of a channel traversed by a signal transmitted from each antenna of a transmitting apparatus. The technology described in Non-patent Document 1 is such a MIMO-AMC technology. The configuration of a transmitting apparatus based on Non-patent Document 1 is shown in FIG. 1. Base station 100 in FIG. 1 illustrates a configuration of a transmitting apparatus based on the technology described in Non-patent Document 1. This configuration is described below taking a case in which the base station transmits information code to a terminal as an example.

Information code is input to base station 100. Information code input to base station 100 is arranged into a parallel sequence from a serial sequence by serial/parallel conversion section 101. Serial/parallel conversion section 101 switches sequences that are output on a timing-by-timing basis, so that information code input at a particular timing is output as sequence #A, and information code input at the next timing is output as sequence #B, for example.

Information code arranged into parallel format is channel-encoded by encoding sections 102 and 103. An error correction code such as a block code, convolutional code, or the like, for example, is used in channel encoding, Encoding sections 102 and 103 can perform channel encoding using a plurality of coding rates, and which coding rate is used for encoding is controlled by adaptive modulation control section 113.

A channel encoded codeword is mapped by mapping sections 104 and 105. The mapping executed here is processing that maps post conversion code to a baseband signal point of a selected modulation scheme. Mapping sections 104 and 105 have mapping patterns of a plurality of modulation schemes, and which modulation scheme is selected is controlled by adaptive modulation control section 113.

Next, frame configuration sections 106 and 107 configure a frame such as shown in FIG. 2. First, frame configuration section 106 inserts a preamble signal in a stream #A frame in time 1. A preamble signal is a signal sequence known to a receiving apparatus, and the receiving apparatus performs synchronization with a received frame by finding a correlation with a preamble signal. An M sequence or the like may be used as a preamble signal, for example. A characteristic of M sequence autocorrelation is that a correlation value when there is no time deviation shows a peak, and a correlation value when there is time deviation shows an extremely low value.

Consequently, the receiving apparatus can find synchronization timing by means of M sequence sliding correlation. Therefore, the receiving apparatus can establish synchronization timing by finding preamble signal sliding correlation value and taking a time at which the correlation value shows a peak value as synchronization timing.

Frame configuration section 107 inserts a null signal in stream #B in time 1. Here, a null signal represents a void signal. In time 2, a pilot signal is inserted in stream #A. This pilot signal is a signal known to the receiving apparatus. The receiving apparatus performs channel estimation based on channel fluctuation undergone by this pilot signal in the course of propagation. A received signal of a receiving apparatus that receives a pilot signal transmitted in time 2 is represented by the following equation.

[1]

$$y = Hp + n \quad \text{(Equation 1)}$$

where $y = [y_1 \ y_2]^T$ represents a received signal, $$H = \begin{bmatrix} h_{11} & h_{12} \\ h_{21} & h_{22} \end{bmatrix}$$

represents a channel matrix, $$p = [\ p_1 \quad p_2\ ]^T$$

represents a pilot signal, and $n = [n_1 \ n_2]^T$ represents noise. Noise power is assumed to be $n^2$.

Also, "[ ]" are symbols representing a matrix or vector, and T indicates that matrix or vector elements are transposed.

Since the pilot signal in time 2 is $p = [p_1 \ 0]^T$, a received signal is as shown by the following equation.

[2]

$$\begin{bmatrix} y_1|_{t=2} \\ y_2|_{t=2} \end{bmatrix} = \begin{bmatrix} h_{11} & h_{12} \\ h_{21} & h_{22} \end{bmatrix} \begin{bmatrix} p_1 \\ 0 \end{bmatrix} + \begin{bmatrix} n_1 \\ n_2 \end{bmatrix} \quad \text{(Equation 2)}$$

$$= \begin{bmatrix} h_{11} p_1 + n_1 \\ h_{21} p_1 + n_2 \end{bmatrix}$$

Here, t represents time. A channel estimation value may be found by the receiving apparatus as shown by the following equation.

[3]

$$\begin{bmatrix} \hat{h}_{11} \\ \hat{h}_{21} \end{bmatrix} = \begin{bmatrix} y_1|_{t=2} / p_1 \\ y_2|_{t=2} / p_1 \end{bmatrix} \quad \text{(Equation 3)}$$

$$= \begin{bmatrix} h_{11} + n_1 / p_1 \\ h_{21} + n_2 / p_1 \end{bmatrix}$$

By this means, the receiving apparatus can obtain a channel estimation value for which the SN ratio is $p_1^2 / n^2$.

Similarly, frame configuration section 107 inserts a pilot signal in stream #B in time 3. Since the pilot signal in time 3 is p=[0 p$_2$]$^T$, a received signal is as shown by the following equation.

[4]

$$\begin{bmatrix} y_1|_{t=3} \\ y_2|_{t=3} \end{bmatrix} = \begin{bmatrix} h_{11} & h_{12} \\ h_{21} & h_{22} \end{bmatrix} \begin{bmatrix} 0 \\ p_2 \end{bmatrix} + \begin{bmatrix} n_1 \\ n_2 \end{bmatrix}$$
$$= \begin{bmatrix} h_{12}p_2 + n_1 \\ h_{22}p_2 + n_2 \end{bmatrix}$$

(Equation 4)

A channel estimation value may be found by the receiving apparatus as shown by the following equation.

[5]

$$\begin{bmatrix} \hat{h}_{12} \\ \hat{h}_{22} \end{bmatrix} = \begin{bmatrix} y_1|_{t=3}/p_2 \\ y_2|_{t=3}/p_2 \end{bmatrix}$$
$$= \begin{bmatrix} h_{12} + n_1/p_2 \\ h_{22} + n_2/p_2 \end{bmatrix}$$

(Equation 5)

By this means, the receiving apparatus can obtain a channel estimation value for which the SN ratio is $p_2^2/n^2$.

In time 4, a signal indicating a modulation scheme applied to stream #A is inserted as a signal for notification to the receiving apparatus. In time 5, a signal indicating a modulation scheme applied to stream #B is inserted as a signal for notification to the receiving apparatus. In time 6, a signal for notification of a code rate applied to stream #A is inserted. In time 7, a signal for notification of a code rate applied to stream #B is inserted. In time 8 onward, modulated signals transmitted in streams #A and #1 are inserted. Here, information on modulation schemes and code rates applied to streams #A and #B is obtained from adaptive modulation control section 113.

Frame configuration sections 106 and 107 configure a transmit frame as described above.

Radio section 108 converts a frame configured by frame configuration sections 106 and 107 to a radio signal of a radio frequency band used by the communication system.

Power control sections 109 and 110 convert a radio signal generated by radio section 108 to a radio signal having power equivalent to transmission power. Power conversion here is controlled by adaptive modulation control section 113, and is controlled so that transmission power is the same for streams #A and #B.

Here, encoding sections 102 and 103, mapping sections 104 and 105, frame configuration sections 106 and 107, and power control sections 109 and 110 are controlled by adaptive modulation control section 113. This control is as follows.

First, a stream quality notification frame fed back from the receiving apparatus is input to adaptive modulation control section 113. This stream quality notification frame includes a parameter indicating received stream quality in the receiving apparatus. For example, the SINR (Signal to Interference and Noise power Ratio), received power, or the like of each stream is used as received stream quality.

Adaptive modulation control section 113 obtains information on received stream quality in the receiving apparatus from this stream quality notification frame. Adaptive modulation control section 113 has a table associating stream quality with a modulation scheme, coding rate, and transmission power. Adaptive modulation control section 113 controls adaptive modulation using this table. That is to say, the table contains combinations of modulation scheme, coding rate, and transmission power that improve transmission efficiency according to stream quality.

Using this table, adaptive modulation control section 113 decides a coding rate, modulation scheme, and transmission power corresponding to a received stream quality signal, and controls encoding sections 102 and 103, mapping sections 104 and 105, and power control sections 109 and 110 so as to correspond to the table. Also, adaptive modulation control section 113 controls frame configuration sections 106 and 107 so that stream #A and #B modulation scheme notification signals and coding rate notification signals correspond to a transmitted frame. Antennas 111 and 112 perform spatial-multiplex transmission of transmit signals output from power control sections 109 and 110.

As described above, Non-patent Document 1 discloses a technology that improves transmission efficiency by performing adaptive modulation for each stream that undergoes MIMO spatial-multiplexing.

A method of mapping a channel encoded codeword to a baseband signal is described in Non-patent Document 2. FIG. 3 shows the configuration of a transmitting apparatus that performs mapping according to Non-patent Document 2. In FIG. 3, in which parts corresponding to those in FIG. 1 are assigned the same reference codes as in FIG. 1, as compared with base station 100 in FIG. 1, base station 300 is equipped with source signal point mapping sections 301 and 302 instead of mapping sections 104 and 105. In addition, base station 300 has normalization coefficient multiplication sections 303 and 304.

Source signal point mapping sections 301 and 302 map a channel encoded codeword to a source signal point. Here, a source signal point is defined as a signal point shown in FIG. 4(*a*). FIG. 4(*a*) shows QPSK and 16QAM source signal points.

In mapping shown in Non-patent Document 2, a baseband signal point is generated by multiplying a source signal point by a normalization coefficient. This configuration corresponds to normalization coefficient multiplication sections 303 and 304 in base station 300. Here, the normalization coefficients by which QPSK and 16QAM source signal points are multiplied are as shown in FIG. 4(*a*).

Normalization coefficient multiplication sections 303 and 304 multiply QPSK source signal points by a 1/√2 normalization coefficient, and 16QAM source signal points by a 1/√10 normalization coefficient. Normalization coefficient multiplication sections 303 and 304 generate a baseband signal by performing this normalization coefficient multiplication.

Baseband signal point constellation generated by the above is shown in FIG. 4(*b*). At the same time, FIG. 4(*b*) shows pilot-signal signal point placement. Here, mapping sections 104 and 105 in base station 100 perform mapping so that mapping output constitutes the baseband signal points shown in FIG. 4(*b*).

(MLD)

One technology for MIMO spatial-multiplexed signal detection in a receiving apparatus is MLD (Maximum Likelihood Detection). MLD obtains good characteristics compared with ZF (Zero Forcing), MMSE (Minimum Mean Squared Error), or suchlike spatial-multiplexed signal detection, and has therefore attracted attention as a spatial-multiplexed signal detection technology that enables high-quality reception characteristics to be obtained.

Although spatial-multiplexed signal detection by means of MLD shows excellent characteristics, the arithmetic calculation scale is large, and therefore inventions have appeared that focus on reducing the MLD arithmetic calculation circuit scale. One such method of reducing the MLD arithmetic calculation circuit scale is described in Patent Document 1. A brief description of the MLD arithmetic calculation shown in Patent Document 1 is given below.

First, in the following description, a case in which communication is performed using a two-stream spatial-multiplexing MIMO method will be considered. At this time, a received signal can be represented as shown by the following equation. [6]

$$y=Hx+n \qquad \text{(Equation 6)}$$

where $x=[x_1\ x_2]^T$ represents a transmit signal.

Here, the square Euclidean distance of a received signal is found as shown by the following equation.

[7]

$$E = \|y - Hs\|^2 \qquad \text{(Equation 7)}$$
$$= |y_1 - (h_{11}s_a + h_{12}s_b)^2| + |y_2 - (h_{12}s_a + h_{22}s_b)|^2$$

As y is a received signal, it can be found by the receiving apparatus. H is estimated by the receiving apparatus using a pilot signal. The estimation method is as shown in Equation (3) and Equation (5). Also, s is a vector representing transmit symbols that can be used by the transmitting apparatus, and $s=[s_a\ s_b]^T$. Hereinafter, $s_a$ and $s_b$ are referred to as candidate signal points. In MLD, a combination of candidate signal points $s_a$ and $s_b$ for which Equation (7) is a minimum is taken as a detection result.

The invention disclosed in Patent Document 1 shows in particular that it is possible for the circuit scale to be reduced in spatial-multiplexed signal detection even if the M-ary modulation value is large. The technology disclosed in Patent Document 1 generates a replica signal corresponding to each transmit signal.

Replica signals here are $h_{11}s_a+h_{12}s_b$ and $h_{21}s_a+h_{22}s_b$ shown in Equation (7).

In the technology disclosed in Patent Document 1, terms $h_{11}s_a+h_{12}s_b$ and $h_{21}s_a+h_{22}s_b$ configuring replica signals are stored. Furthermore, addition of these replica signals is performed taking account of a combination of terms configuring the stored replica signals. It is shown that the number of complex multipliers necessary for replica signal generation can be reduced by this means.

Patent Document 1: Japanese Patent Application Laid-Open No. 2006-196989

Non-patent Document 1: 3GPP TSG RAN WG1, TSG-R1-010879, Lucent Technologies, "Increasing MIMO throughput with per-antenna rate control"

Non-patent Document 2: ISO/IEC and redesignated as ISO/IEC 8802-111:1999/Amd 1:2000, "Supplement to IEEE Standard for information technology—Telecommunications and information exchange between systems—Local and metropolitan area networks—Specific requirements. Part 11: Wireless LAN Medium Access Control (MAC) and Physical Layer (PHY) specifications High-speed Physical Layer in the 5 GHz Band," IEEE Std 802.11a-1999

Non-patent Document 3: "Linear Algebra and its Applications," G. Strang, Sangyo Tosho Publishing Co., Ltd.

DISCLOSURE OF INVENTION

Problems to be Solved by the Invention

The following problem is associated with performing spatial-multiplexed signal detection by means of MLD in a receiving apparatus.

When a transmitting apparatus that performs transmission scheme using MIMO spatial multiplexing performs AMC for each antenna, combinations arise in modulation schemes of candidate signal points $s_1$ and $s_2$ shown in Equation (7). For example, when a transmitting apparatus uses QPSK and 16QAM as modulation schemes, combinations of $s_1$ and $s_2$ modulation schemes are as shown in Table 1.

TABLE 1

| | $s_1$ | $s_2$ |
| --- | --- | --- |
| 1 | QPSK | QPSK |
| 2 | QPSK | 16QAM |
| 3 | 16QAM | QPSK |
| 4 | 16QAM | 16QAM |

However, hitherto, sufficient consideration has not been given to an MLD receiving apparatus supporting a MIMO-AMC system, as disclosed in Patent Document 1. For example, as disclosed in Patent Document 1, an MLD arithmetic calculation circuit has only supported a case in which modulation schemes applied to MIMO spatial-multiplexed streams are the same.

In the future, a configuration in which AMC is performed for each antenna will be essential in order to improve the transmission efficiency of transmission scheme using MIMO spatial-multiplexing.

There are consequently hopes for an MLD arithmetic calculation apparatus that supports the kind of modulation scheme combinations shown in Table 1.

It is an object of the present invention to provide a method and apparatus capable of performing MLD by means of a simple configuration in a receiving apparatus in a MIMO-AMC system.

Means for Solving the Problems

One aspect of a multi-antenna transmitting apparatus of the present invention employs a configuration having a mapping section that maps data transmitted from different antennas in transmission scheme using MIMO spatial-multiplexing, to signal points shared by respective modulation schemes, and a transmitting section that transmits a modulated signal obtained by execution of mapping of the same or different modulation schemes by the mapping section, using multiple-input multiple-output spatial-multiplexing scheme.

According to this configuration, an arrangement of baseband signal points obtained by mapping a channel encoded codeword to an IQ (In-phase versus Quadrature) plane comprises signal points shared by modulation schemes, and therefore a receiving apparatus need not provide a circuit that performs MLD arithmetic calculation according to a combination of modulation schemes of MIMO spatial-multiplexed signals. For example, if the signal points of respective modulation schemes are all shared, MLD candidate signal points are only signal points of a modulation scheme with the maximum M-ary modulation value. Therefore, an MLD circuit required by a receiving apparatus need only be a circuit that performs MLD arithmetic calculation for a combination of modulation schemes with the maximum M-ary modulation value. As a result, the circuit scale of an MLD arithmetic calculation circuit required by a receiving apparatus in a communication system using MIMO-AMC can be reduced.

One aspect of a multi-antenna receiving apparatus of the present invention employs a configuration having a receiving section that receives spatial-multiplexed signals transmitted by a multi-antenna transmitting apparatus at a plurality of antennas, a channel estimation section that estimates the condition of a communication channel traversed by the spatial-multiplexed signals, and an MLD arithmetic calculation section that performs MLD arithmetic calculation using a channel estimation value from the channel estimation section and also using only signal points shared by respective modulation schemes as candidate signal points.

Advantageous Effect of the Invention

By employing a configuration of the present invention, an MLD arithmetic calculation apparatus that supports combinations of modulation schemes arising in a MIMO-AMC system can be provided, and a multi-antenna transmitting apparatus can be implemented that enables the configuration of an MLD arithmetic calculation apparatus to be simplified.

BRIEF DESCRIPTION OF DRAWINGS

FIG. 13 is a drawing showing adaptive modulation control section table contents;

BEST MODE FOR CARRYING OUT THE INVENTION

Embodiments of the present invention will now be described in detail with reference to the accompanying drawings.

Embodiment 1

In Embodiment 1, a MIMO-AMC receiving apparatus is described. That is to say, in Embodiment 1, a receiving apparatus in a MIMO-AMC system performs spatial-multiplexed signal detection using MLD. In this embodiment, a configuration whereby a terminal performs signal detection by means of MLD is described. A terminal of this embodiment performs detection of a spatial multiplexed signal by means of MLD in a MIMO-AMC system by being provided with an MLD arithmetic calculation apparatus that supports combinations of modulation schemes applied to MIMO streams.

Figure 5:
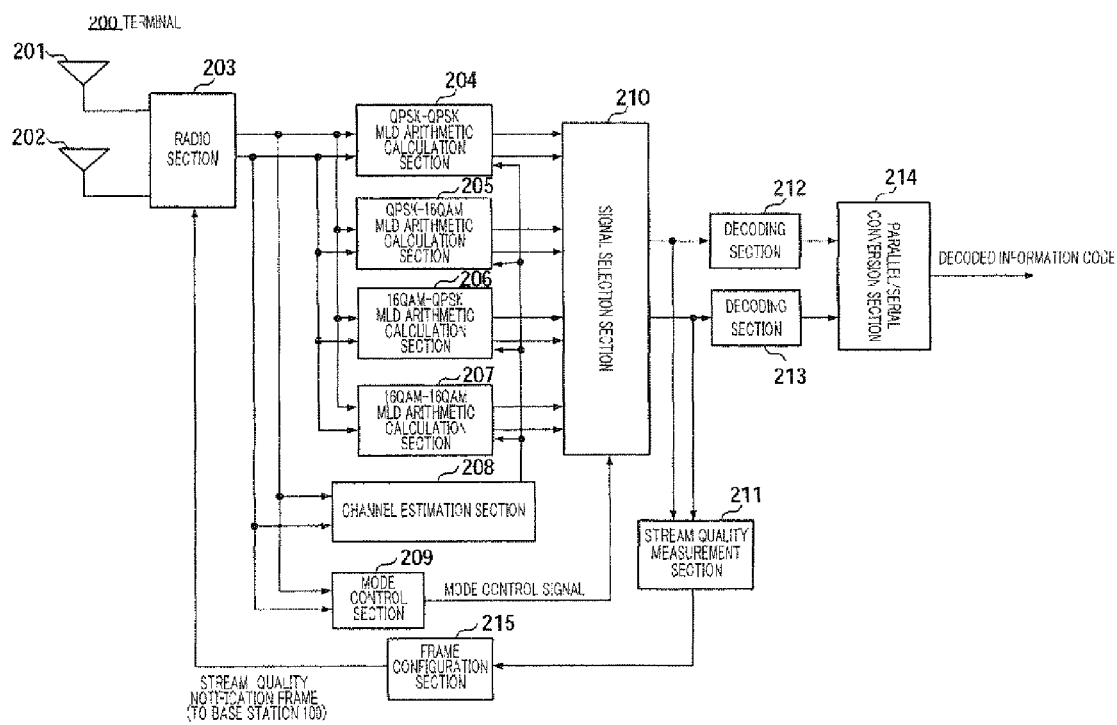
FIG. 5 is a block diagram showing a configuration of a terminal of Embodiment 1.

The configuration of a terminal according to this embodiment is shown in FIG. 5. In this embodiment, a case is described by way of example in which the number of MIMO spatial-multiplexed streams is two, and QPSK (Quadrature Phase Shift Keying) and 16QAM (Quadrature Amplitude Modulation) are used as modulation schemes.

Figure 1:
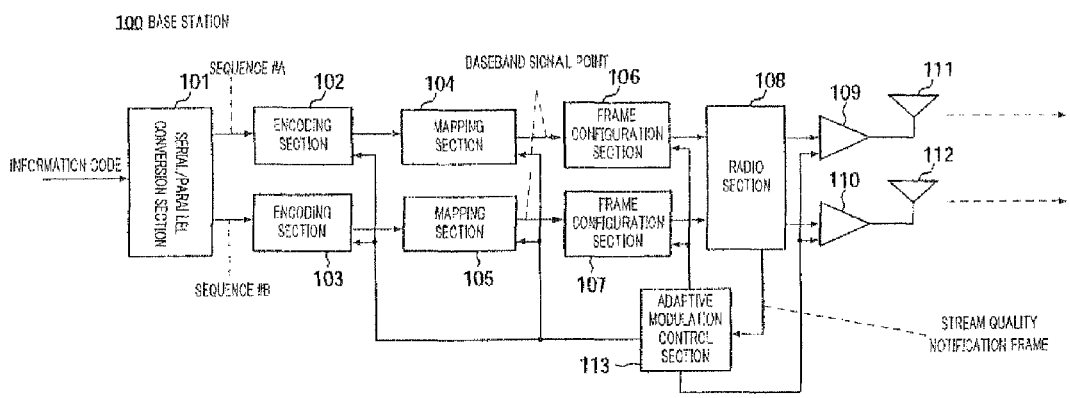
FIG. 1 is a block diagram showing a configuration of a conventional base station.

A terminal supporting MIMO-AMC will now be described with reference to FIG. 5. Terminal 200 receives a spatial-multiplexed signal transmitted by base station 100 (FIG. 1). First, terminal 200 converts a received frame (received stream) to a handleable frequency band by means of radio section 203. Radio section 203 also finds a sliding correlation with a preamble signal of the received frame, and detects a time at which a peak appears in the preamble signal correlation value as received frame synchronization timing.

Channel estimation section 208 estimates channel fluctuation undergone by streams #A and #B using a pilot signal in the received frame. The Equation (3) or Equation (5) method may be used as the channel estimation method. By this means, a channel estimation value can be obtained. Mode control section 209 obtains information on modulation schemes and code rates applied to the received frame from stream #A and stream #B modulation scheme notification signals and coding rate notification signals.

QPSK-QPSK MLD arithmetic calculation section 204, QPSK-16QAM MLD arithmetic calculation section 205, 16QAM-QPSK MLD arithmetic calculation section 206, and 16QAM-16QAM MLD arithmetic calculation section 207 perform detection (separation) of stream #A and #B signals spatial-multiplexed in the received frame.

Here, QPSK-QPSK MLD arithmetic calculation section 204 performs signal detection by means of MLD when a combination of QPSK and QPSK is used as a candidate signal point combination of stream #A and stream #B. That is to say, QPSK-QPSK MLD arithmetic calculation section 204 finds a square Euclidean distance when a QPSK signal point is used for $s_1$ and a QPSK signal point is used for $s_2$ as a candidate signal point s combination in Equation (7), and takes a candidate signal point combination for which this square Euclidean distance is a minimum as a detection result.

Similarly, QPSK-16QAM MLD arithmetic calculation section 205 finds a square Euclidean distance using a QPSK signal point for $s_1$ and a 16 QAM signal point for $s_2$ as a candidate signal point combination in Equation (7) 16QAM-QPSK MLD arithmetic calculation section 206 using a 16 QAM signal point for $s_1$ and a QPSK signal point for $s_2$, and 16QAM-16QAM MLD arithmetic calculation section 207 using a 16QAM signal point for $s_1$ and a 16QAM signal point for $s_2$. A candidate signal point combination for which the calculated square Euclidean distance is a minimum is taken as a detection result. MLD arithmetic calculation sections 204, 205, 206, and 207 perform MLD arithmetic calculation using a channel estimation value from channel estimation section 208.

Of the outputs of MLD arithmetic calculation sections 204, 205, 206, and 207, signal selection section 210 selects that corresponding to the combination of modulation schemes of stream #A and stream #B. Signal selection section 210 uses stream #A and stream #B modulation scheme information obtained by mode control section 209 for this selection. For example, if the modulation schemes applied to stream #A and stream #B are QPSK and QPSK, signal selection section 210 selects the output from QPSK-QPSK MLD arithmetic calculation section 204.

Thus, signal selection section 210 output that has undergone MLD is selected using candidate signal points of the modulation schemes applied to stream #A and stream #B. By this means, a selected signal is one for which signal selection has been performed by means of MLD corresponding to the modulation schemes applied to respective streams of a received frame.

Stream quality measurement section 211 measures signal-detected stream reception quality. Here, stream quality represents a stream reception condition, and therefore an SINR (Signal to Interference and Noise power Ratio), received signal power, or the like is used, for example. In order to support MIMO-AMC, terminal 200 feeds back measured stream reception quality to base station 100. For this purpose, terminal 200 configures a frame including measured reception quality information by means of frame configuration section 215, and feeds back the configured frame to base station 100.

Frame configuration section 215 configures a frame that includes stream quality information. The configuration of a stream quality notification frame is as shown in FIG. 6(a). In a stream quality notification frame, a preamble signal is inserted in time 1, a pilot signal for stream quality notification in time 2, and stream #A and #B quality notification signals (reception quality information) in time 3 and time 4.

Figure 6:
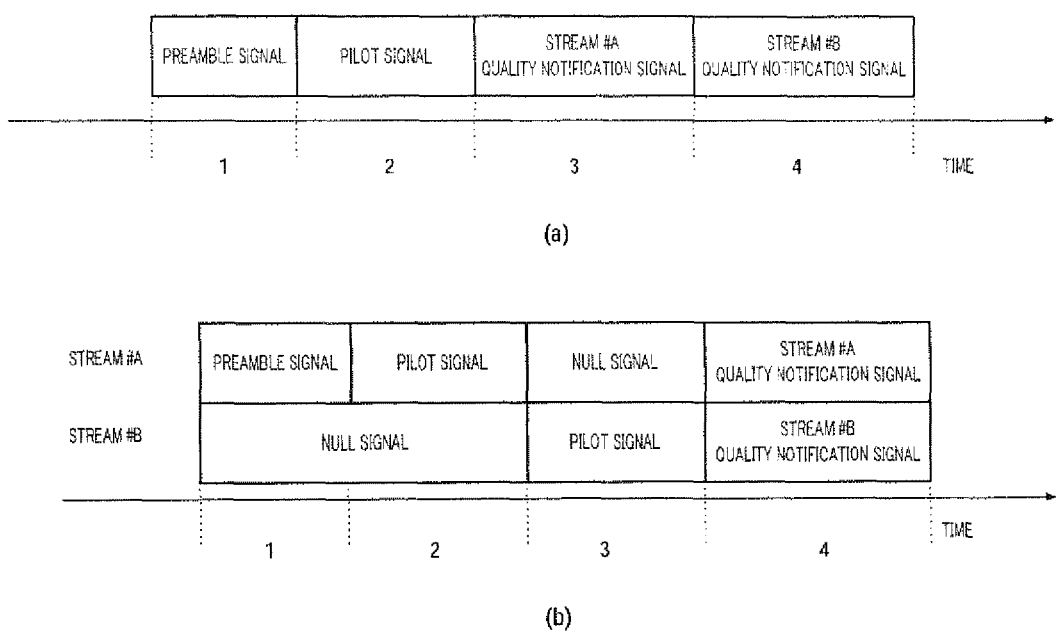
FIG. 6 is a drawing showing stream quality notification frame configurations, in which (a) is a drawing showing a frame configuration when transmission scheme using MIMO spatial-multiplexing is not performed and (b) is a drawing showing a frame configuration when transmission scheme using MIMO spatial-multiplexing is performed.

The stream quality notification frame is converted to a radio signal by radio section 203, and fed back to base station 100 from antenna section 201. In the terminal 200 configuration shown in FIG. 5, a case in which a stream quality notification frame is fed back without undergoing transmission scheme using MIMO spatial-multiplexing is shown as an example, but stream quality may also be fed back to base station 100 using MIMO spatial-multiplexing. In this case, however, a stream quality notification frame must be compatible with transmission scheme using MIMO spatial-multiplexing. An example of such a frame configuration is shown in FIG. 6 (b).

An example of a stream quality notification frame configuration when stream quality is fed back using MIMO spatial-multiplexing will now be described using FIG. 6 (b). In time 1, a preamble signal is inserted in stream #A. In time 2, a pilot signal is inserted in stream #A. In time 3, a pilot signal is inserted in stream #B. In time 4, signals giving notification of stream #A and stream #B reception quality are inserted.

Figure 7:
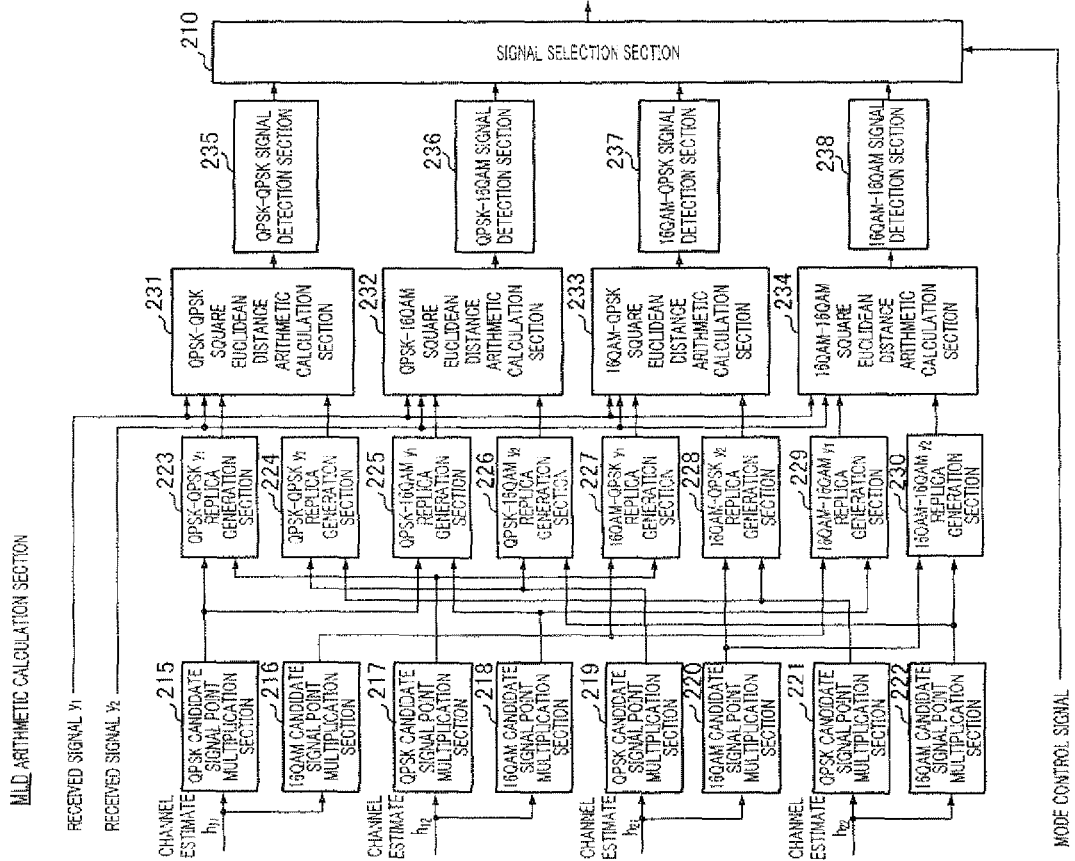
FIG. 7 is a block diagram showing a configuration of an MLD arithmetic calculation section.

FIG. 7 shows an example of the configuration of an MLD arithmetic calculation section when a receiving apparatus performs spatial-multiplexed signal detection by means of MLD in a MIMO-AMC system.

In the MLD arithmetic calculation section shown in FIG. 7, a channel estimation value is multiplied by a candidate signal point. QPSK candidate signal point multiplication section 215 multiplies channel estimation value $h_{11}$ by a QPSK modulation scheme candidate signal point. 16QAM candidate signal point multiplication section 216 multiplies channel estimation value $h_{11}$ by a 16QAM modulation scheme candidate signal point. This corresponds to an $h_{11} s_a$ arithmetic calculation in Equation (7).

Similarly, QPSK candidate signal point multiplication section 217 and 16QAM candidate signal point multiplication section 218 multiply channel estimation value $h_{12}$ by QPSK and 16QAM modulation scheme candidate signal points respectively; QPSK candidate signal point multiplication section 219 and 16QAM candidate signal point multiplication section 220 multiply channel estimation value $h_{21}$ by QPSK and 16QAM modulation scheme candidate signal points respectively; and QPSK candidate signal point multiplication section 221 and 16QAM candidate signal point multiplication section 222 multiply channel estimation value $h_{22}$ by QPSK and 16QAM modulation scheme candidate signal points respectively. These correspond to $h_{12} s_b$, $h_{21} s_a$, and $h_{22} s_b$ arithmetic calculations in Equation (7).

QPSK-QPSK $y_1$ replica generation section 223 performs replica signal generation when the combination of modulation schemes of the respective streams is QPSK-QPSK, using QPSK candidate signal point multiplication section 215 and 217 outputs. This corresponds to an $h_{11} s_a + h_{12} s_b$ arithmetic calculation in Equation (7). Similarly, QPSK-QPSK $y_2$ replica generation section 224 performs replica signal generation when the combination of modulation schemes of the respective streams is QPSK-QPSK, using QPSK candidate signal point multiplication section 219 and 221 outputs. This corresponds to an $h_{21} s_a + h_{22} s_b$ arithmetic calculation in Equation (7).

Then QPSK-16QAM $y_1$ replica generation section 225 adds together QPSK candidate signal point multiplication section 215 and 16QAM candidate signal point multiplication section 218 outputs, and generates a replica signal. QPSK-16QAM $y_2$ replica generation section 226 adds together QPSK candidate signal point multiplication section 219 and 16QAM candidate signal point multiplication section 222 outputs, and generates a replica signal. 16QAM-QPSK $y_1$ replica generation section 227 adds together 16QAM candidate signal point multiplication section 216 and QPSK candidate signal point multiplication section 217 outputs, and generates a replica signal.

16QAM-QPSK $y_2$ replica generation section 228 adds together 16QAM candidate signal point multiplication section 220 and QPSK candidate signal point multiplication section 221 outputs, and generates a replica signal. 16QAM-16QAM $y_1$ replica generation section 229 adds together 16QAM candidate signal point multiplication section 216 and 16QAM candidate signal point multiplication section 218 outputs, and generates a replica signal. 16QAM-16QAM $y_2$ replica generation section 230 adds together 16QAM candidate signal point multiplication section 220 and 16QAM candidate signal point multiplication section 222 outputs, and generates a replica signal.

QPSK-QPSK square Euclidean distance arithmetic calculation section 231 finds a square Euclidean distance using received signals $y_1$ and $y_2$, and QPSK-QPSK $y_3$ replica generation section 223 and QPSK-QPSK $y_2$ replica generation section 224 outputs. This corresponds to finding a square Euclidean distance when the combination of modulation schemes of the respective streams is QPSK-QPSK, corresponding to performing a $|y_1-(h_{11}s_a+h_{12}s_b)|^2+|y_2-(h_{21}s_a+h_{22}s_b)|^2$ arithmetic calculation in Equation (7).

Similarly, QPSK-16QAM square Euclidean distance arithmetic calculation section 232 finds a square Euclidean distance using received signals $y_1$ and $y_2$, and QPSK-16QAM $y_1$ replica generation section 225 and QPSK-16QAM $y_2$ replica generation section 226 outputs; 16QAM-QPSK square Euclidean distance arithmetic calculation section 233 finds a square Euclidean distance using received signals $y_1$ and $y_2$, and 16QAM-QPSK $y_1$ replica generation section 227 and 16QAM-QPSK $y_2$ replica generation section 228 outputs; and 16QAM-16QAM square Euclidean distance arithmetic calculation section 234 finds a square Euclidean distance using received signals $y_1$ and $y_2$, and 16QAM-16QAM $y_1$ replica generation section 229 and 16QAM-16QAM $y_2$ replica generation section 230 outputs.

QPSK-QPSK signal detection section 235 selects a candidate signal point used to generate the minimum square Euclidean distance among the square Euclidean distances found by QPSK-QPSK square Euclidean distance arithmetic calculation section 231, and outputs the selected candidate signal point. Similarly, QPSK-16QAM signal detection section 236 selects a candidate signal point that generates a minimum QPSK-16QAM square Euclidean distance arithmetic calculation section 232 output, and outputs the selected candidate signal point. 16QAM-QPSK signal detection section 237 selects a candidate signal point that generates a minimum 16QAM-QPSK square Euclidean distance arithmetic calculation section 233 output, and outputs the selected candidate signal point. 16QAM-16QAM signal detection section 238 selects a candidate signal point that generates a minimum 16QAM-16QAM square Euclidean distance arithmetic calculation section 234 output, and outputs the selected candidate signal point. By this means, signal detection can be performed by means of MLD corresponding to a combination of stream modulation schemes.

Since there is actually one combination of modulation schemes applied to streams, it is necessary to select an output corresponding to a stream modulation scheme from among the outputs of signal detection sections 235 through 238. Signal selection section 210 selects an MLD arithmetic calculation result corresponding to modulation schemes applied to the streams based on a mode control signal. For example, if QPSK and QPSK modulation schemes are applied to stream #A and stream #B respectively, signal selection section 210 selects the output from QPSK-QPSK signal detection section 235.

An important point of this embodiment is that a terminal is provided with a configuration that generates a replica signal using a candidate signal point corresponding to a modulation scheme applied to a MIMO stream. That is to say, the fact that a terminal is provided with a configuration that substitutes candidate signal points corresponding to modulation schemes applied to MIMO streams for candidate signal points $s_a$ and $s_b$ when replica signal terms $h_{11}s_a+h_{12}s_b$ and $h_{21}s_a+h_{22}s_b$ shown in Equation (7) are generated is important.

For example, if a terminal is provided with a configuration that substitutes QPSK and 16QAM modulation scheme candidate signal points respectively for $s_a$ and $s_b$, and finds terms $h_{11}s_a$, $h_{12}s_b$, $h_{21}s_a$, and $h_{22}s_b$, as shown in this embodiment, it is possible to generate a replica signal when modulation schemes applied to streams are different by combining and adding these. MLD arithmetic calculation can be performed by finding a square Euclidean distance of a received signal from a replica signal found in this way, and taking a candidate signal point that generates a minimum square Euclidean distance that is found as a signal detection result.

As described above, a terminal can perform signal detection by means of MLD in a MIMO-AMC system by being provided with MLD arithmetic calculation sections corresponding to combinations of modulation schemes applied to streams.

Embodiment 2

This embodiment enables an MLD arithmetic calculation apparatus supporting a MIMO-AMC system to be configured in a simpler way. This embodiment simplifies an MLD arithmetic calculation apparatus in a receiving apparatus by sharing signal points of a modulation scheme applied to a MIMO stream among modulation schemes.

One aspect of a multi-antenna transmitting apparatus of this embodiment employs a configuration having a mapping section that maps data transmitted from different antennas in a transmission scheme using MIMO spatial-multiplexing, to signal points shared by respective modulation schemes, and a transmitting section that transmits a modulated signal obtained by execution of mapping of the same or different modulation schemes by the mapping section, using transmission scheme using MIMO spatial-multiplexing scheme.

According to this configuration, an arrangement of baseband signal points obtained by mapping a channel encoded codeword to an IQ (In-phase versus Quadrature) plane comprises signal points shared by modulation schemes, and therefore a receiving apparatus need not provide a circuit that performs MLD arithmetic calculation according to a combination of modulation schemes of MIMO spatial-multiplexed signals. For example, if the signal points of respective modulation schemes are all shared, MLD candidate signal points are only signal points of a modulation scheme with the maximum M-ary modulation value. Therefore, an MLD circuit required by a receiving apparatus need only be a circuit that performs MLD arithmetic calculation for a combination of modulation schemes with the maximum M-ary modulation value. As a result, the circuit scale of an MLD arithmetic calculation circuit required by a receiving apparatus in a communication system using MIMO-AMC can be reduced.

One aspect of a multi-antenna receiving apparatus of this embodiment employs a configuration having a receiving section that receives spatial-multiplexed signals transmitted by a multi-antenna transmitting apparatus at a plurality of antennas, a channel estimation section that estimates the condition of a communication channel traversed by the spatial-multiplexed signals, and an MLD arithmetic calculation section that performs MLD arithmetic calculation using a channel estimation value from the channel estimation section and also using only signal points shared by respective modulation schemes as candidate signal points.

According to the above aspect, the configuration of an MLD arithmetic calculation circuit of a receiving apparatus in a MIMO-AMC system can be simplified.

This embodiment will now be described in detail using accompanying drawings.

Figure 8:
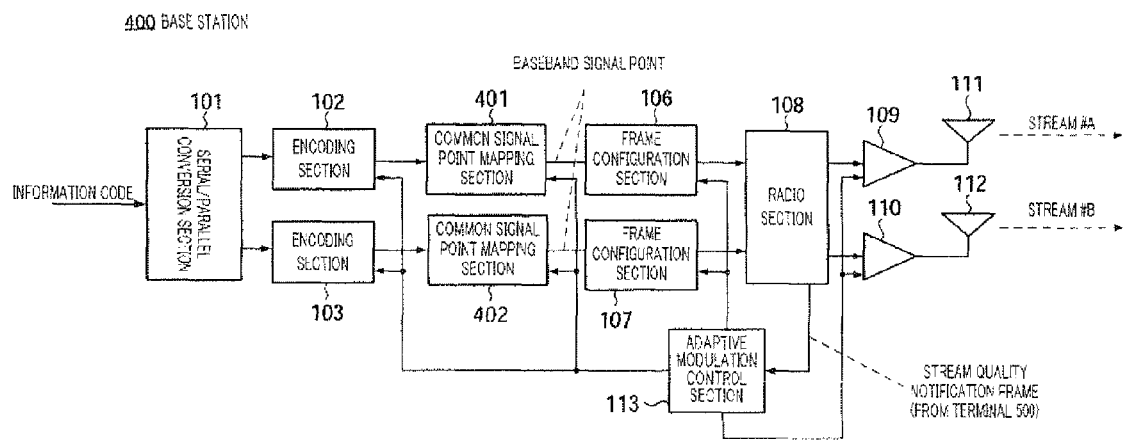
FIG. 8 is a block diagram showing a configuration of a base station of Embodiment 2.
Figure 9:
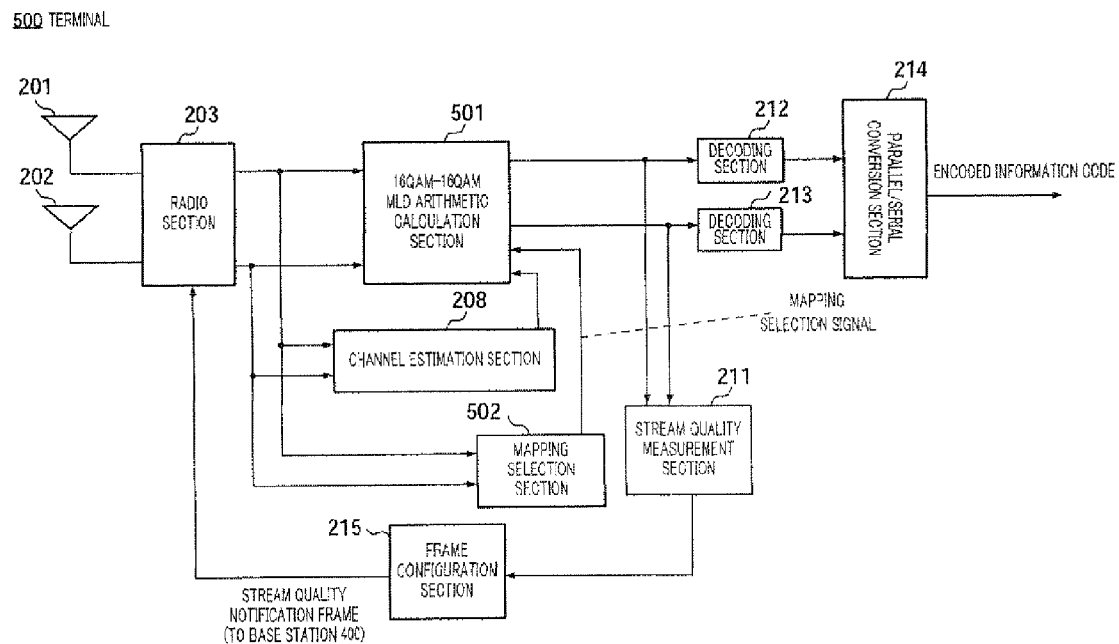
FIG. 9 is a block diagram showing a configuration of a terminal of Embodiment 2.

FIG. 8 shows a configuration of a base station according to this embodiment, and FIG. 9 shows a configuration of a terminal according to the present embodiment. As an example, the modulation schemes used in this embodiment are assumed to be QPSK and 16QAM. Also, as an example, the M-ary modulation value is assumed to be 2. Items in a configuration of this embodiment that have the same kind of function as in the configuration in FIG. 1 are assigned the same names and numbers as in FIG. 1. First, a configuration of this embodiment will be described.

In FIG. 8, information code is input to base station 400. Serial/parallel conversion section 101 performs processing that arranges the information code input to base station 400 into parallel form from serial form. For example, serial/parallel conversion section 101 outputs information code that is input at a particular time to encoding section 102, and outputs information code that is input at the next time to encoding section 103. By this means, serial/parallel conversion section 101 arranges information code into parallel form from serial form.

Encoding sections 102 and 103 perform channel encoding of input information code. A block code, convolutional code, or the like may be used in channel encoding. Encoding sections 102 and 103 can perform channel encoding using a plurality of coding rates, and which coding rate is used for encoding is controlled by adaptive modulation control section 113.

Common signal point mapping sections 401 and 402 map a channel encoded codeword. Codeword mapping according to this embodiment is as shown in FIG. 10($b$) or FIG. 10($d$).

Figure 10:
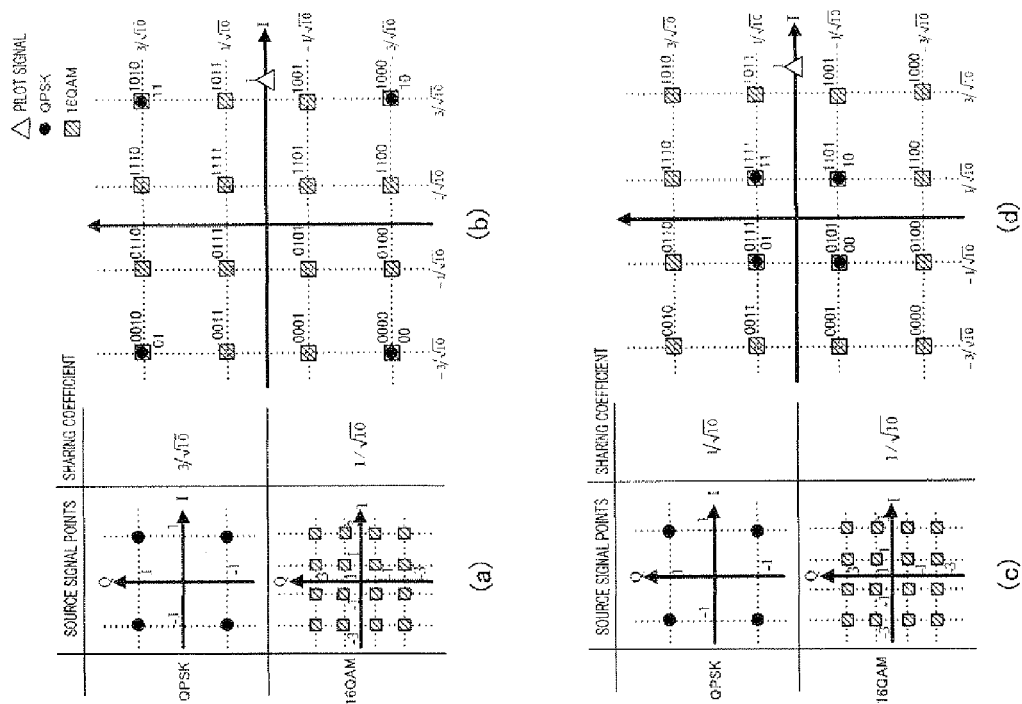
FIG. 10 is a drawing provided to explain mapping according to Embodiment 2, in which (a) and (c) are drawings showing source signal points and sharing coefficients, and (b) and (d) are drawings showing baseband signal point constellations.

When the mapping shown in FIG. 10($b$) is performed by common signal point mapping sections 401 and 402, it a modulation scheme applied to a stream is QPSK, mapping is performed to a QPSK signal point corresponding to an input codeword. For example, if the input codeword is [01], this is mapped to $(-3/\sqrt{10}, 3/\sqrt{10})$.

If a modulation scheme applied to a stream is 16QAM, mapping is performed to a 16QAM signal point corresponding to an input codeword. For example, if the input codeword is [0010], this is mapped to $(-3/\sqrt{10}, 3/\sqrt{10})$. The same kind of operation is also performed when common signal point mapping sections 401 and 402 perform the mapping shown in FIG. 10($d$).

In this way, output of encoding sections 102 and 103 is mapped to an IQ plane, and output of common signal point mapping sections 401 and 402 becomes a baseband signal point. A modulation scheme of mapping performed on output of encoding sections 102 and 103 by common signal point mapping sections 401 and 402 is controlled by adaptive modulation control section 113.

Figure 2:
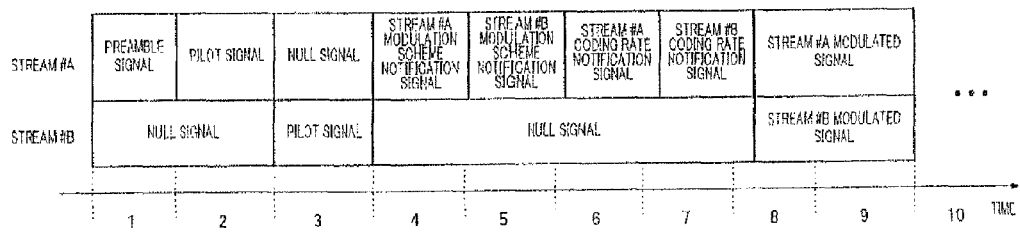
FIG. 2 is a drawing showing a transmit frame configuration.

Frame configuration sections 106 and 107 configure a frame such as shown in FIG. 2. That is to say, in time 1, frame configuration section 106 inserts a preamble signal in stream #A, and frame configuration section 107 inserts a null signal in stream #B. An M sequence or the like is used as a preamble signal here.

A null signal is referred to as a "void signal." In time 2, a pilot signal is inserted in stream #A. This pilot signal is a signal mapped to the pilot signal point shown in FIG. 10($b$) or FIG. 10($d$).

In time 2, a null signal is inserted in stream #B. In time 3, a null signal is inserted in stream #A, and a pilot signal is inserted in stream #B. In times 4, 5, 6, and 7, a stream #A modulation scheme notification signal, stream #B modulation scheme notification signal, stream #A coding rate notification signal, and stream #B coding rate notification signal, respectively, are inserted in stream #A, and a null signal is inserted in stream #B.

In time 8 onward, frame configuration sections 106 and 107 insert a modulated signal in each stream for the length of the stream. The modulation scheme notification signals and coding rate notification signals inserted by frame configuration sections 106 and 107 are controlled by adaptive modulation control section 113 so as to correspond to the respective streams.

Since a frame configured by frame configuration sections 106 and 107 is a baseband signal, radio section 108 converts this frame to a continuous waveform of a frequency band used in communication. That is to say, radio section 108 up-converts a signal resulting from filtering a baseband signal and converting it to an analog waveform to a signal of a frequency band used in communication.

Power control sections 109 and 110 control the power of radio section 108 output. This output power is decided by adaptive modulation control section 113. Radio section 108 output signal power is controlled so as to be approximately equal for each stream. Signals generated in this way are spatial-multiplex transmitted from antennas 111 and 112.

Next, the configuration of terminal 500 in FIG. 9 will be described. Terminal 500 detects a signal of each stream included in a received spatial-multiplexed signal by means of MLD. First, radio section 203 converts a received frame to a signal of a frequency band handled the terminal. Then radio section 203 finds a sliding correlation with a preamble signal in the down-converted received frame, and detects a time at which the correlation value is at a peak as synchronization timing. Radio section 203 performs received frame synchronization in this way.

Channel estimation section 208 estimates channel fluctuation undergone by a received frame using a pilot signal in the received frame. A channel estimation value can be obtained by using a channel fluctuation estimation method such as shown in Equation (3) or Equation (5).

Mapping selection section 502 obtains information on modulation schemes applied to a received frame from stream #A and #B modulation scheme notification signals included in the frame. From the modulation scheme information, mapping selection section 502 decides a candidate signal point used by 16QAM-16QAM MLD arithmetic calculation section 501.

16QAM-16QAM MLD arithmetic calculation section 501 finds the square Euclidean distance shown in Equation (7) for all 16QAM signal point combinations. That is to say, 16QAM-16QAM MLD arithmetic calculation section 501 substitutes combinations of all 16QAM modulation scheme candidate signal point combinations for $s_1$, $s_2$ in Equation (7), and finds a square Euclidean distance.

Here, since baseband signal points of each modulation scheme are shared by means of common signal point mapping sections 401 and 402 of base station 400, a square Euclidean distance found from a candidate signal point corresponding to a modulation scheme applied to a frame is a square Euclidean distance desired to be found. For example, if a modulation scheme applied to a received frame is 16QAM, 16QAM-16QAM MLD arithmetic calculation section 501 can compute square Euclidean distances using all candidate signal point combinations, and take a candidate signal point that generates a minimum square Euclidean distance among these as a signal detection result.

On the other hand, if a modulation scheme applied to a received frame is QPSK, 16QAM-16QAM MLD arithmetic calculation section 501 selects a signal point corresponding to a QPSK signal point among 16QAM baseband signal points. Then 16QAM-16QAM MLD arithmetic calculation section 501 computes square Euclidean distances using a square Euclidean distance for this selected signal point, and takes a candidate signal point that generates a minimum square Euclidean distance among these as a signal detection result.

To continue with the description of FIG. 9, stream quality measurement section 211 measures detected stream quality, and feeds back the measurement result to base station 400. Here, stream quality represents a stream reception condition, and therefore an SINR (Signal to Interference and Noise power Ratio), received signal power, or the like is used, for example. In order to support MIMO-AMC, terminal 500 feeds back measured stream reception quality information to base station 400. For this purpose, terminal 500 configures a frame including measured reception quality information, and feeds this back to base station 400.

Frame configuration section 215 configures a frame that includes stream quality information. The configuration of a stream quality notification frame is as shown in FIG. 6(*a*). In a stream quality notification frame, a preamble signal is inserted in time 1, a stream quality notification frame pilot signal in time 2, and stream #A and #B quality notification signals (reception quality information) in time 3 and time 4.

The stream quality notification frame is converted to a radio signal by radio section 203, and fed back to base station 400 from antenna section 201. In the terminal configuration shown in FIG. 9, a case in which a stream quality notification frame is fed back without undergoing transmission scheme using MIMO spatial-multiplexing is shown as an example, but stream quality may also be fed back to the base station using MIMO spatial-multiplexing. In this case, however, a stream quality notification frame must be compatible with transmission scheme using MIMO spatial-multiplexing. An example of such a frame configuration is shown in FIG. 6 (*b*).

An example of a stream quality notification frame configuration when stream quality is fed back using MIMO spatial-multiplexing will now be described using FIG. 6 (*b*). In time 1, a preamble signal is inserted in stream #A. In time 2, a pilot signal is inserted in stream #A, and in time 3, a pilot signal is inserted in stream #B. In time 4, signals giving notification of stream #A and stream #B reception quality are inserted.

Next, adaptive modulation in base station 400 corresponding to terminal 500 reception quality will be described.

Base station 400 receives a stream quality notification frame fed back from terminal 500, and performs adaptive modulation based on this. Adaptive modulation control section 113 has a table associating stream quality with a modulation scheme and coding rate. Adaptive modulation control section 113 controls adaptive modulation using this table.

That is to say, the table contains modulation scheme and coding rate combinations that improve transmission efficiency according to stream quality. For example, combinations of code rate, modulation scheme, and transmission power that improve transmission efficiency may be set beforehand for received stream SINR values as shown in FIG. 13.

Adaptive modulation control section 113 controls encoding sections 102 and 103 and common signal point mapping sections 401 and 402 so as to perform channel encoding and mapping using a coding rate and modulation scheme corresponding to a received stream quality signal. Also, adaptive modulation control section 113 controls frame configuration sections 106 and 107 so that stream #A and #B modulation scheme notification signals and coding rate notification signals correspond to a transmitted frame.

Base station 400 converts a frame configured as described above to a radio signal, and transmits it. Thereafter, terminal 500 similarly receives a frame transmitted by base station 400, and performs the same kind of reception operation as described above.

Figure 11:
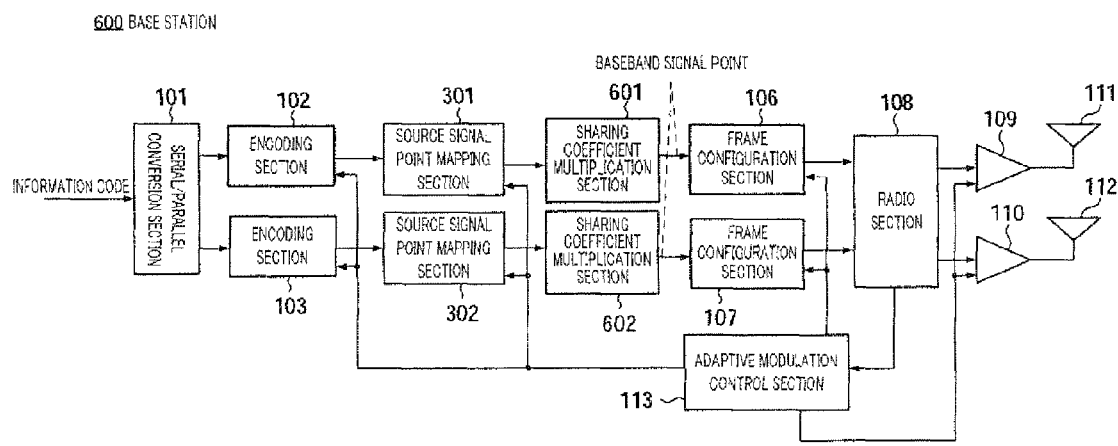
FIG. 11 is a block diagram showing a configuration of a base station of Embodiment 2.

The base station configuration is not limited to that shown in FIG. 8, and the configuration shown in FIG. 11, for example, may also be used. Employing the configuration of base station 600 shown in FIG. 11 also enables baseband signal point constellations of respective modulation schemes to be shared in the same way as with the configuration in FIG. 8.

Figure 3:
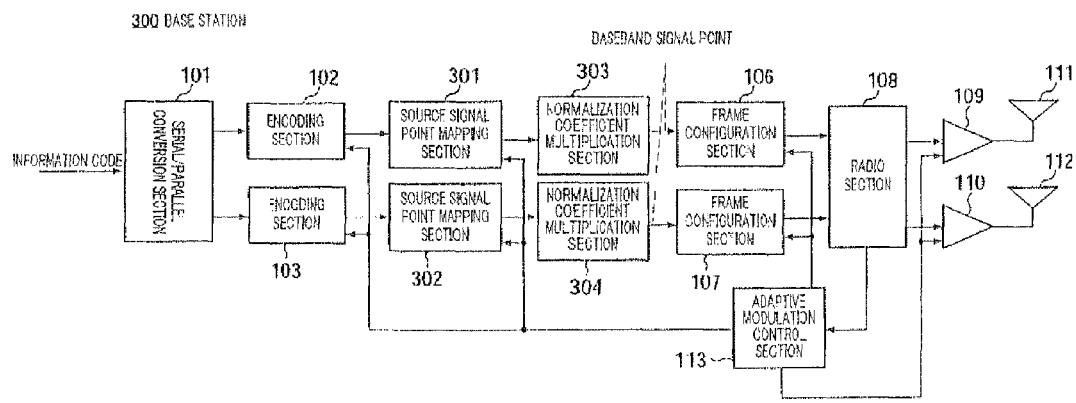
FIG. 3 is a block diagram showing a configuration of a conventional base station.
Figure 4:
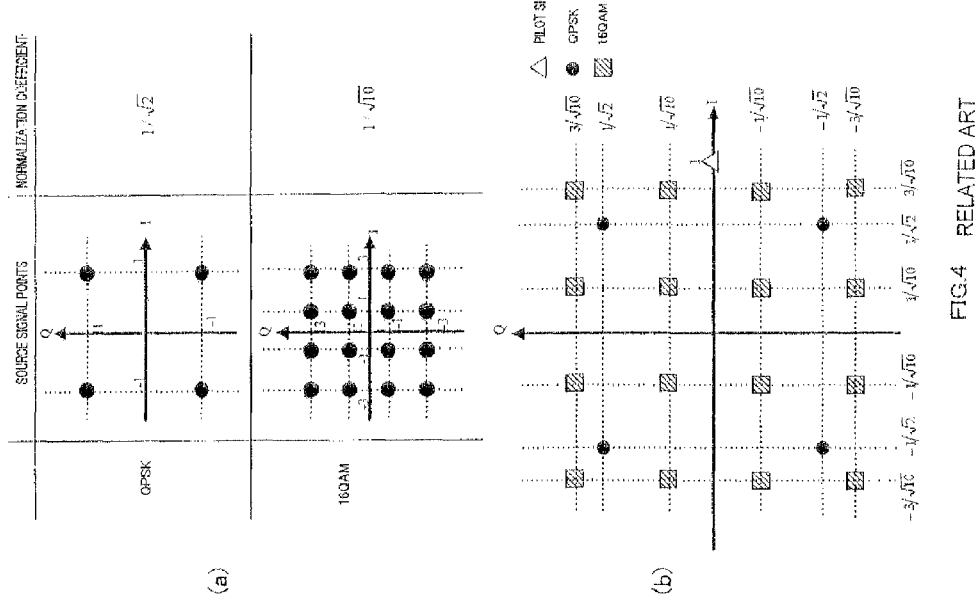
FIG. 4 is a drawing provided to explain source signal points, normalization coefficients, and baseband signal point constellations.

Base station 600 shown here in FIG. 11 has a configuration resembling that of base station 300 shown in FIG. 3. However, a clear difference between base station 600 of this embodiment and base station 300 in FIG. 3 lies in the coefficients by which mapped source signal points are multiplied. In base station 300, a source signal point was multiplied by a normalization coefficient in order to normalize the source signal point.

In contrast, base station 600 of this embodiment multiplies source signal points by a sharing coefficient by means of sharing coefficient multiplication sections 601 and 602 in order to share baseband signal points. The coefficients multiplied by at this time are the sharing coefficients for source signal points shown in FIG. 10(*a*) and FIG. 10(*c*). The baseband signal point constellations shown in FIG. 10(*b*) and FIG.

10(d) are obtained by multiplying the source signal points shown in FIG. 10(a) and FIG. 10(c) by the sharing coefficients shown. Thus, using base station 600 enables baseband signal point constellations of respective modulation schemes to be shared in the same way as with base station 400.

This concludes a description of configurations of this embodiment.

Next, an important point of this embodiment will be explained.

An important point of this embodiment is that signal points of mapping executed on transmission streams when transmission scheme using MIMO spatial-multiplexing is performed are shared by modulation schemes. For example, QPSK mapping signal points are shared with 16QAM mapping signal points as shown in FIG. 10(b) and FIG. 10(d).

Sharing of mapping signal points here does not mean sharing of source signal points. When source signal points are used, mapping is performed so that baseband signal points are shared after source signal points are multiplied by a sharing coefficient, as shown in FIG. 10 (b). Following this, a base station of this embodiment transmits streams on which mapping has been executed using shared baseband signal points. By performing mapping using shared baseband signal points in this way, square Euclidean distances that need to be found by means of MLD arithmetic calculation in a terminal can be shared.

A detailed description is given below of MLD arithmetic calculation in a terminal when baseband signal points are shared in a base station.

Figure 12:
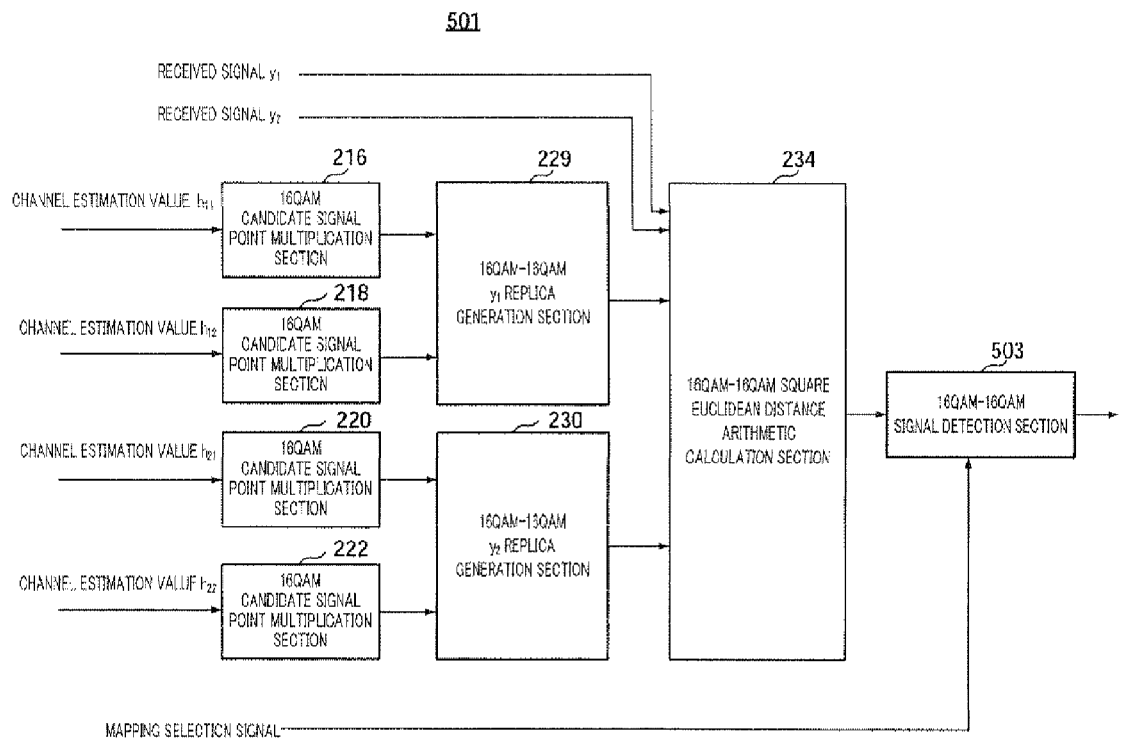
FIG. 12 is a block diagram showing a configuration of a 16QAM-16QAM MLD arithmetic calculation section.

Terminal 500 receives streams in which shared mapping has been executed on baseband signal points. The configuration of 16QAM-16QAM MLD arithmetic calculation section 501 in terminal 500 is shown in FIG. 12. The procedure is as follows when signal detection is performed by means of MLD in 16QAM-16QAM MLD arithmetic calculation section 501.

16QAM-16QAM MLD arithmetic calculation section 501 has received signals $y_1$ and $y_2$ as input from radio section 203. Also, 16QAM-16QAM MLD arithmetic calculation section 501 generates received signal replicas using channel estimation values $h_{11}$, $h_{12}$, $h_{21}$, and $h_{22}$, obtained by channel estimation section 208. Received signal replicas generated here are only those using 16QAM modulation mapping.

This will now be described in detail. Channel estimation value $h_{11}$ is multiplied by a signal point of mapping used in 16QAM modulation by 16QAM candidate signal point multiplication section 216. Output from 16QAM candidate signal point multiplication section 216 is $h_{11} s_a$ in Equation (7). However, since there are 16 possibilities for candidate signal point $s_a$, there are also 16 possibilities for 16QAM candidate signal point multiplication section 216 output $h_{11} s_a$. Hereinafter, $h_{11} s_a$ representing this 16-possibility output $h_{11} s_a$ is written as $h_{11} s_i$ (where i=1, 2, . . . , 16). Here, $s_i$ is a variable representing 16 possible 16QAM modulation scheme candidate signal points.

In a similar way, 16QAM candidate signal point multiplication sections 218, 220, and 222 multiply channel estimation values $h_{12}$, $h_{21}$, and $h_{22}$, respectively, by 16-possibility 16QAM candidate signal points. 16QAM candidate signal point multiplication section 220 output is $h_{21} s_i$, and 16QAM candidate signal point multiplication section 218 and 222 outputs are $h_{12} s_j$ and $h_{22} s_j$ respectively (where j=1, 2, . . . , 16). 16QAM-16QAM $y_1$ replica generation section 229 and 16QAM-16QAM $y_2$ replica generation section 230 generate received signal replicas using $h_{11} s_i$, $h_{12} s_j$, $h_{21} s_i$, and $h_{22} s_j$, respectively. 16QAM-16QAM $y_1$ replica generation section 229 generates a received signal replica shown in Equation (8), and 16QAM-16QAM $y_2$ replica generation section 230 generates a received signal replica shown in Equation (9).

[8]
$$y_{1,i,j}=h_{11}s_i+h_{12}s_j \ (i,j=1,2,\ldots 16) \qquad \text{(Equation 8)}$$

[9]
$$y_{2,i,j}=h_{21}s_i+h_{22}s_j \ (i,j=1,2,\ldots 16) \qquad \text{(Equation 9)}$$

16QAM-16QAM square Euclidean distance arithmetic calculation section 234 computes a square Euclidean distance from 16QAM-16QAM $y_1$ replica generation section 229 and 16QAM-16QAM $y_2$ replica generation section 230 outputs and received signals $y_1$ and $y_2$. Found square Euclidean distances are as shown in Equation (10).

[10]
$$E_{i,j}=|y_1-y_{1,i,j}|^2+|y_2-y_{2,i,j}|^2 \ (i,j=1,2,\ldots 16) \qquad \text{(Equation 10)}$$

16QAM-16QAM signal detection section 503 performs received signal detection Signal detection here is performed as follows. 16QAM-16QAM signal detection section 503 has a square Euclidean distance as input from 16QAM-16QAM square Euclidean distance arithmetic calculation section 234. 16QAM-16QAM signal detection section 503 outputs a combination of candidate signal points that generate a minimum square Euclidean distance that is inputted as a detection result. Here, a combination of candidate signal points represents an $s_i$, $s_j$ combination, and in the case of a combination of a 16QAM modulation scheme and 16QAM modulation scheme, there are 256 (=16×16) possible candidate signal point combinations.

A square Euclidean distance used here is controlled by a mapping selection signal. For example, if the combination of modulation schemes applied in the base station is a 16QAM modulation scheme and a 16QAM modulation scheme, all square Euclidean distances found by 16QAM-16QAM square Euclidean distance arithmetic calculation section 234 may be used as a square Euclidean distance.

On the other hand, if the combination of modulation schemes applied in the base station includes QPSK, used square Euclidean distances are punctured. For example, to consider a case in which mapping is performed using the baseband signal points shown in FIG. 10(b), if the four QPSK baseband signal points [00], [0T], [101][11] shown in FIG. 10(b) are taken as $s_1, s_2, s_3, s_4$, 16QAM-16QAM signal detection section 503 punctures square Euclidean distances computed using the other 12 points in performing signal detection.

Square Euclidean distances generated from QPSK candidate signal points are equal to square Euclidean distances found from $s_1, s_2, s_3, s_4$ among candidate signal points corresponding to 16QAM modulation. Thus, of square Euclidean distances found by 16QAM-16QAM square Euclidean distance arithmetic calculation section 234, those corresponding to square Euclidean distances found from $s_1, s_2, s_3, s_4$ can be taken as square Euclidean distances found from QPSK modulation candidate signal points.

Since 16QAM baseband signal points and QPSK baseband signal points are shared, a square Euclidean distance computed using 16QAM baseband signal points can also be used as a square Euclidean distance corresponding to a QPSK baseband signal point. Thus, if the combination of modulation schemes applied in the base station includes QPSK, square Euclidean distances computed using signal points not shared with QPSK baseband signal points are punctured.

In other words, if a modulation scheme applied to a stream is QPSK, MLD arithmetic calculation can be performed using square Euclidean distances computed using $s_1, s_2, s_3, s_4$. For example, when the modulation scheme applied to stream #A is QPSK and the modulation scheme applied to stream #B is 16QAM, the following square Euclidean distances should be found.

[11]

$$E_{i,j}=|y_1-y_{1,i,j}|^2+|y_2-y_{2,i,j}|^2 \ (i=1,2,3,4, j=1,2,\ldots 16) \quad \text{(Equation 11)}$$

In Equation (11), i corresponds to stream #A and j corresponds to stream #B. Thus, square Euclidean distances can be found using those signal points among 16QAM modulation scheme signal points that are QPSK modulation scheme signal points.

16QAM-16QAM signal detection section 503 outputs a candidate signal point combination that generates a minimum square Euclidean distance among shared square Euclidean distances as a detection result.

From the above, in a case in which QPSK is used as a modulation scheme applied to a MIMO stream, also, MLD arithmetic calculation for a QPSK modulation scheme can be implemented by only an MLD arithmetic calculation circuit that uses candidate signal points corresponding to a 16QAM modulation scheme.

Thus, in this embodiment, by performing mapping using shared baseband signal points of respective modulation schemes in a base station, square Euclidean distances that need to be computed by a terminal are only those corresponding to a 16QAM modulation scheme.

According to this embodiment, the following effect can be obtained.

By having a base station share signal points of modulation schemes applied to transmission streams when performing transmission scheme using MIMO spatial-multiplexing, the amount of MLD arithmetic calculation performed by a terminal can be reduced compared with a case in which signal points are not shared by modulation schemes.

That is to say, by sharing signal points of respective modulation schemes, square Euclidean distances for signal points can be shared when MLD arithmetic calculation is performed by a terminal. Sharing square Euclidean distances eliminates the need to find square Euclidean distances for each modulation scheme, and enables the scale of MLD arithmetic calculation to be reduced compared with a case in which signal points are not shared by modulation schemes.

As described above, in this embodiment, sharing of baseband signal points by respective modulation schemes is performed in a communication system that uses MIMO-AMC. In this embodiment, mapping is performed using shared the baseband signal point constellation. Sharing of baseband signal points by respective modulation schemes makes it unnecessary to provide a configuration that performs MLD arithmetic calculation according to a combination of modulation schemes in a receiving apparatus. In a configuration of this embodiment, it is only necessary to provide a configuration that performs MLD arithmetic calculation only according to a combination of modulation schemes having the maximum M-ary modulation value. Consequently, by employing a configuration of this embodiment, the circuit scale of an MLD arithmetic calculation section in a receiving apparatus can be reduced.

In this embodiment, a case has been described by way of example in which correspondence relationships between codewords and signal points is as shown in FIG. 10 (*b*) and FIG. 10(*d*), but correspondence relationships are not limited to these, the essential requirement being only that baseband signal points are shared by respective modulation schemes.

In this embodiment, a case has been described by way of example in which the MIMO spatial-multiplexing degree is 2, but the MIMO spatial-multiplexing degree is not limited to 2.

Embodiment 3

In Embodiment 2, an MLD arithmetic calculation apparatus in a communication system using MIMO-AMC was provided by means of a simple configuration. Embodiment 2 provided a common configuration for MLD arithmetic calculation performed by a receiving apparatus by sharing the baseband signal point constellations of modulation schemes applied to respective streams.

This embodiment relates to a communication system in which the transmission power of a transmit frame is controlled. If sharing of baseband signal points is performed in a communication system in which the transmission power of a transmit frame is controlled, it is necessary to perform signal point sharing in such a way as to prevent the communication system from being adversely affected while achieving sharing of MLD arithmetic calculation in a receiving apparatus.

Figure 14:
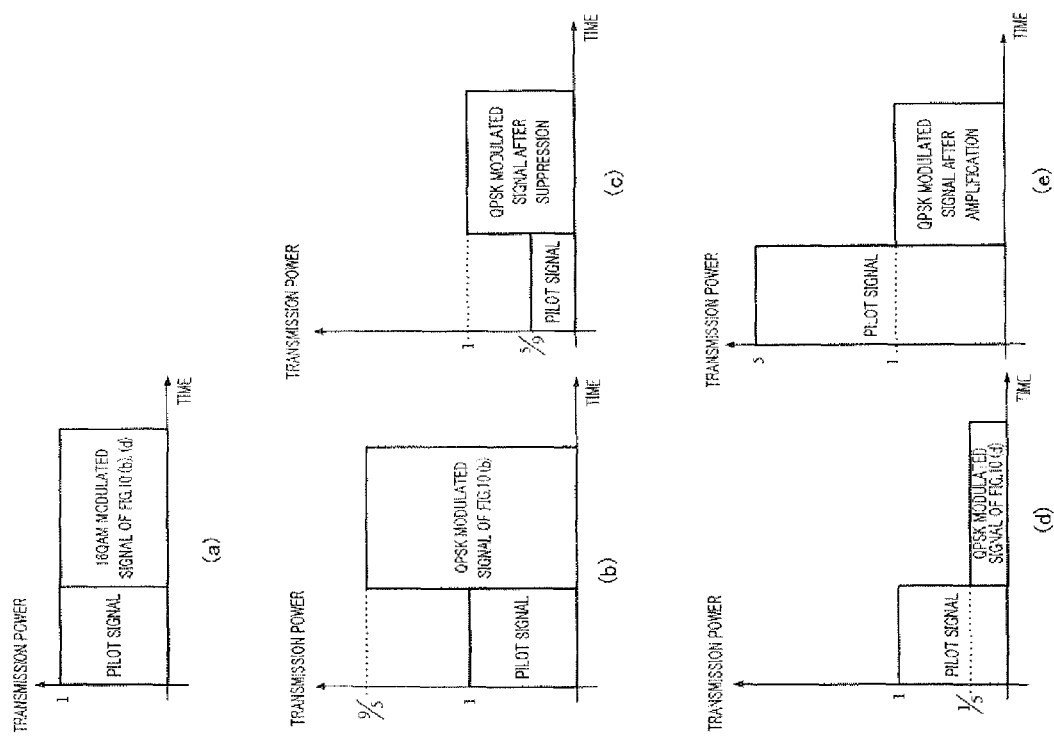
FIG. 14 is a drawing showing the average power of signals modulated using the baseband signal points in FIG. 10, in which (a) is a drawing showing the average power of a pilot signal and 16QAM modulated signal when the signal points in FIGS. 10(b) and (d) are used, and (b) through (e) are drawings showing the average power of a pilot signal and QPSK modulated signal when the signal points in FIGS. 10(b) and (d) are used.

The average power of signals modulated using the baseband signal points shown in FIG. 10 is shown in FIG. 14. FIG. 14(*a*) shows the average power of a pilot signal and 16QAM modulated signal included in a stream #A modulated signal when the signal points in FIGS. 10(*b*) and (*d*) are used. As there is no variation in the sharing coefficient for a pilot signal and 16QAM modulated signal here, average transmission power is the same for both, and there is no particular problem.

However, when the QPSK signal points shown in FIG. 10(*b*) are used, the sharing coefficient is larger than the normalization coefficient, and therefore the average power of a stream #B modulated signal is 9/5 times that of a pilot signal, as shown in FIG. 14(*b*). Thus, if the QPSK modulated signal transmission power is suppressed to the same level as that of a stream #A 16QAM modulated signal, the transmission power of a pilot signal of the same frame is also suppressed to a 5/9-times level. If the pilot signal transmission power is low, a sufficiently accurate channel estimation value cannot be obtained by a receiving apparatus, and therefore reception characteristics degrade.

Figure 15:
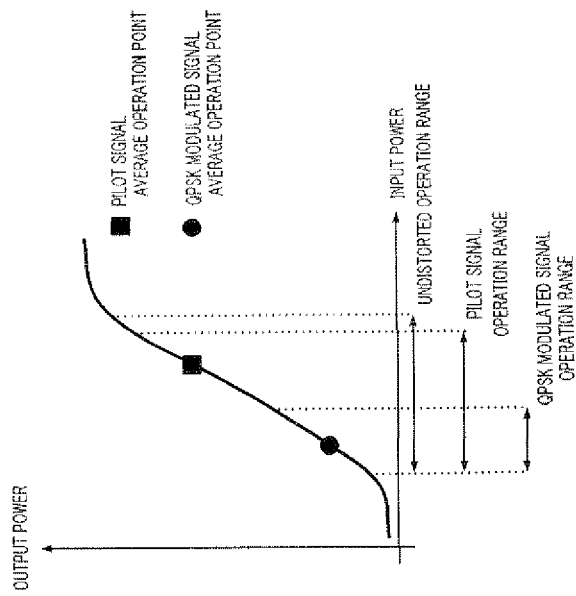
FIG. 15 is a drawing provided to explain a dynamic range of an amplification level found by an amplification power control section.

On the other hand, when the QPSK signal points shown in FIG. 10(*d*) are used, the sharing coefficient is smaller than the normalization coefficient, and therefore the average power of a stream #B modulated signal is 1/5 that of a pilot signal, as shown in FIG. 14(*d*). If, at this time, the QPSK modulated signal transmission power is made the same level as that of a stream #A 16QAM modulated signal to prevent the CNR (Carrier to Noise power Ratio) of the QPSK modulated signal from becoming low, the pilot signal transmission power becomes 5 as shown in FIG. 14(*e*), and the dynamic range of the amplification level of a power control apparatus required by a transmitting apparatus becomes large. For example, an amplification apparatus having a characteristic of amplifying a pilot signal without distortion requires a wide amplification level dynamic range as shown in FIG. 15. Thus, an amplification apparatus in a transmitting apparatus becomes expensive.

In view of the above, it is desirable to implement signal point sharing in a communication system that uses MIMO-AMC in such a way as to prevent the communication system from being adversely affected while achieving MLD arithmetic calculation configuration sharing in a receiving apparatus.

This embodiment takes this point into consideration, and provides for the average transmission power to be of the same magnitude or of the same order of magnitude for each modulation scheme when signal point sharing is performed. By this means, transmit frame power control can be performed using a power control apparatus with a small amplification level dynamic range, with no degradation of the CNR of a modulated signal or degradation of pilot signal reception characteristics.

This embodiment will now be described in detail using accompanying drawings.

Figure 16:
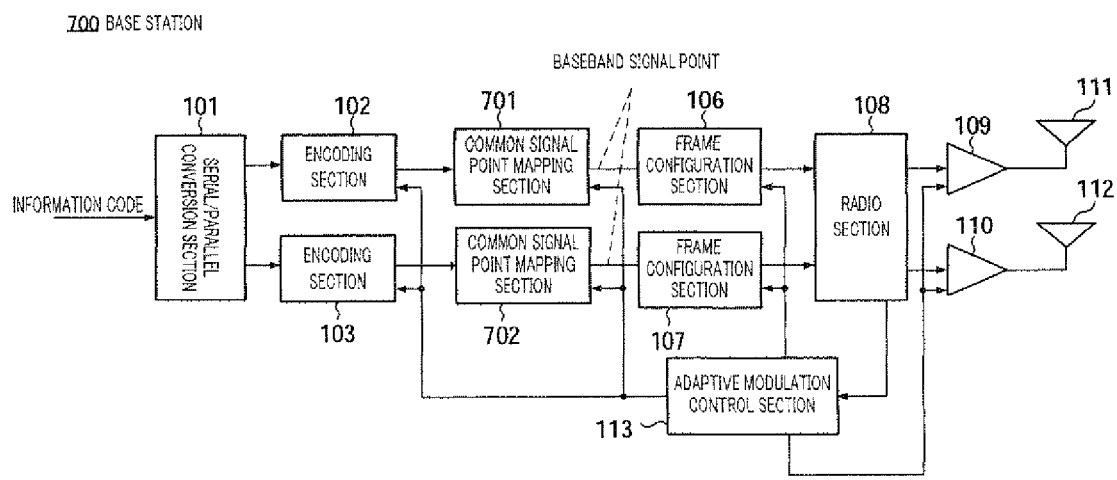
FIG. 16 is a block diagram showing a configuration of a base station of Embodiment 3.

FIG. 16, in which parts corresponding to those in FIG. 8 are assigned the same reference codes as in FIG. 8, shows a configuration of a base station of this embodiment. Base station 700 differs from base station 400 shown in FIG. 8 in the configuration of common signal point mapping sections 701 and 702. Baseband signal mapping by common signal point mapping sections 701 and 702 will now be described.

Figure 17:
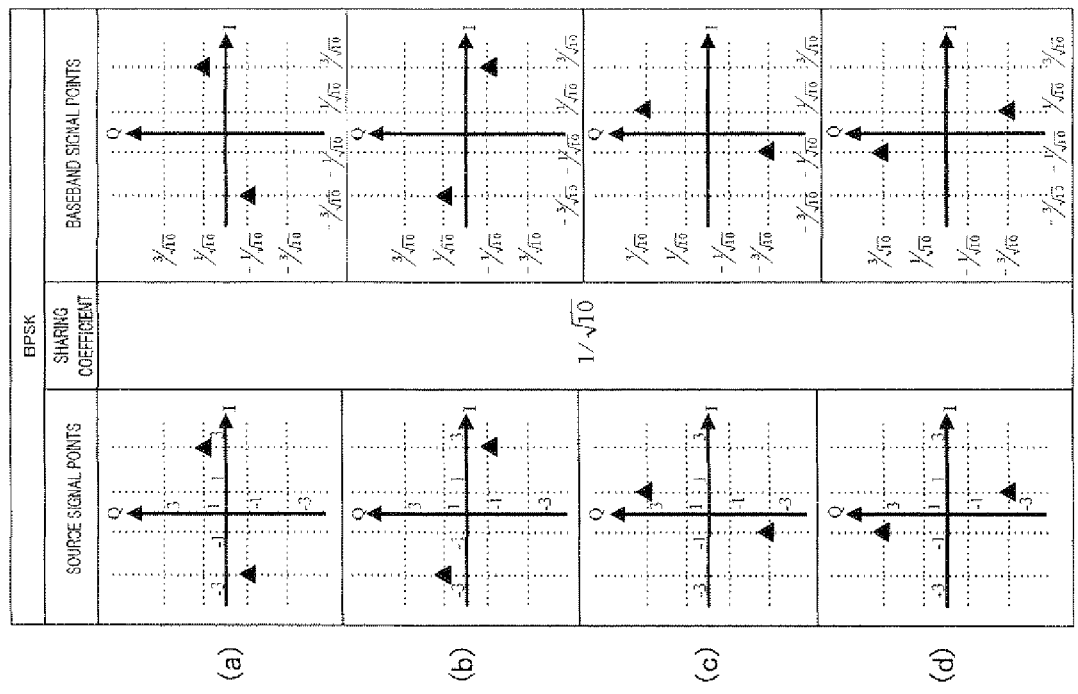
FIGS. 17(a) through (d) are drawings showing BPSK mapping of Embodiment 3.
Figure 18:
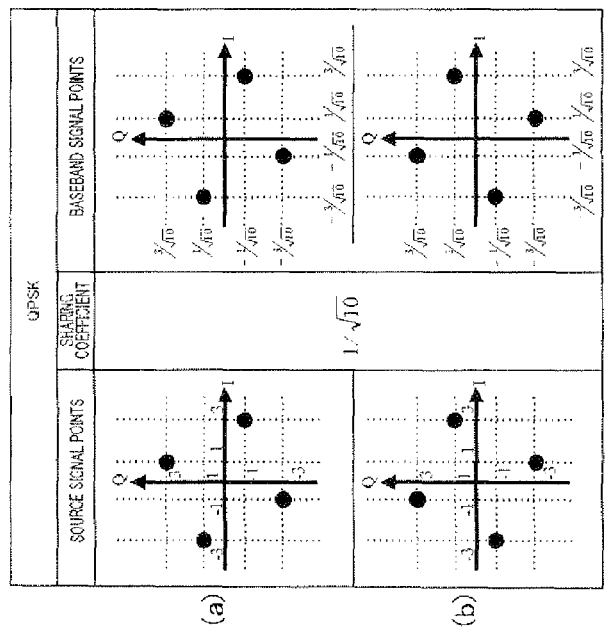
FIGS. 18(a) and (b) are drawings showing QPSK mapping of Embodiment 3.
Figure 19:
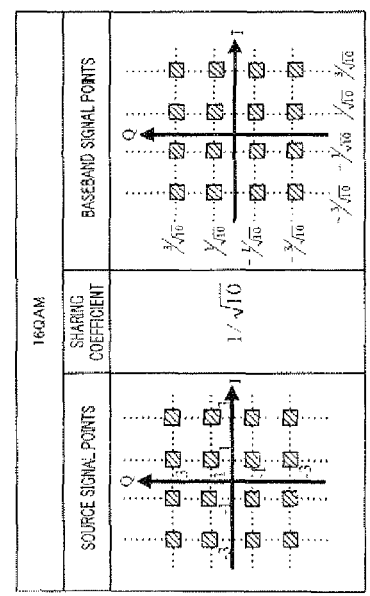
FIG. 19 is a drawing showing 16QAM mapping of Embodiment 3.

FIG. 17, FIG. 18, and FIG. 19 show mapping by common signal point mapping sections 701 and 702. FIG. 17 shows BPSK modulation scheme baseband signal mapping, FIG. 18 shows QPSK modulation scheme baseband signal mapping, and FIG. 19 shows 16QAM modulation scheme baseband signal mapping.

When mapping is performed using the 16QAM modulation scheme baseband signal points shown in FIG. 19, the baseband level average power is 1. FIGS. 17(a) through (d) and FIGS. 18(a) and (b) show BPSK and QPSK modulation scheme baseband signal points shared with a 16QAM signal so as to have the same baseband level average power as this 16QAM modulation scheme baseband level average power. The baseband level average power is 1 for all these baseband signals.

Common signal point mapping sections 701 and 702 perform mapping using these baseband signal points. FIG. 17 through FIG. 19 also show correspondence to a configuration that generates a baseband signal by multiplying a source signal point by a sharing coefficient as in base station 600 (FIG. 11) For example, the BPSK baseband signal shown in FIG. 17(a) can be obtained by multiplying the source signal points shown in FIG. 17(a) by $1/\sqrt{10}$ as a sharing coefficient. Mapping of this embodiment can also be applied to a configuration that generates a baseband signal by multiplying source signal points by a sharing coefficient in this way.

An important point of this embodiment is as follows.

This important point is that provision is made for the average transmission power and pilot signal transmission power of each modulation scheme to be the same when baseband signal points are shared by modulation schemes in a base station.

Figure 20:
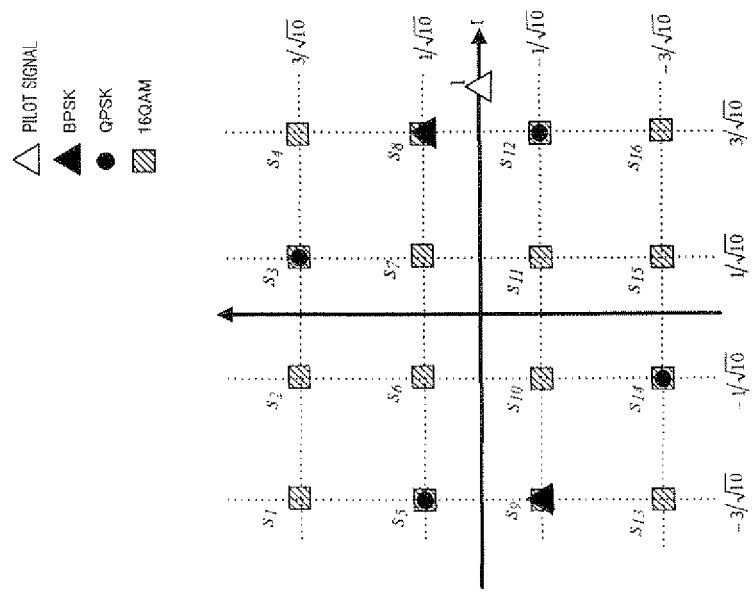
FIG. 20 is a drawing provided to explain baseband signal point sharing processing according to Embodiment 3.

For example, BPSK, QPSK, and 16QAM baseband signal points are shared as shown in FIG. 20. At this time, the baseband level average transmission power is 1 for BPSK, QPSK, and 16QAM, and the pilot signal baseband level transmission power is also 1.

If signal points are shared in this way, a terminal need only have a configuration that finds square Euclidean distances when a 16QAM modulation scheme is used for stream #A and stream #B. If, for example, a BPSK modulation scheme is used for stream #A and a QPSK modulation scheme is used for stream #B, the square Euclidean distances in the following equation should be used in MLD arithmetic calculation.

[12]

$$E_{i,j}=|y_1-y_{1,i,j}|^2+|y_2-y_{2,i,j}|^2 \ (i=8, 9, j=3, 5, 12, 14)$$ (Equation 12)

where i and j correspond to i and j of signal points $s_i$ and $s_j$ shown in FIG. 20.

According to this embodiment, the following effect can be obtained.

Since signal points are shared by respective modulation schemes in a base station, square Euclidean distances that need to be found can be shared when spatial-multiplexed signal detection is performed by means of MLD in a terminal, and the MLD arithmetic calculation scale can be reduced, in the same way as in Embodiment 2. Details of MLD arithmetic calculation at this time are similar to those of Embodiment 2.

Also, since baseband signal points are shared in such a way that the average transmission power and pilot signal transmission power of each modulation scheme are the same, a difference in transmission power between a pilot signal and modulated signal does not arise when transmit frame power is controlled. By this means, transmit frame power control can be performed using a power control apparatus with a small amplification level dynamic range, with no degradation of the CNR of a modulated signal or degradation of pilot signal reception characteristics.

Embodiment 4

In Embodiments 2 and 3, a configuration that performs spatial-multiplexed signal detection by means of MLD in a terminal in a MIMO-AMC system was simplified by having a base station use baseband signal points shared by respective modulation schemes.

This embodiment simplifies a configuration that performs spatial-multiplexed signal detection by means of MLD in a terminal in a MIMO-AMC system by having a base station change the mapping of pilot signals of respective modulation schemes.

This embodiment will now be described in detail using accompanying drawings.

Figure 21:
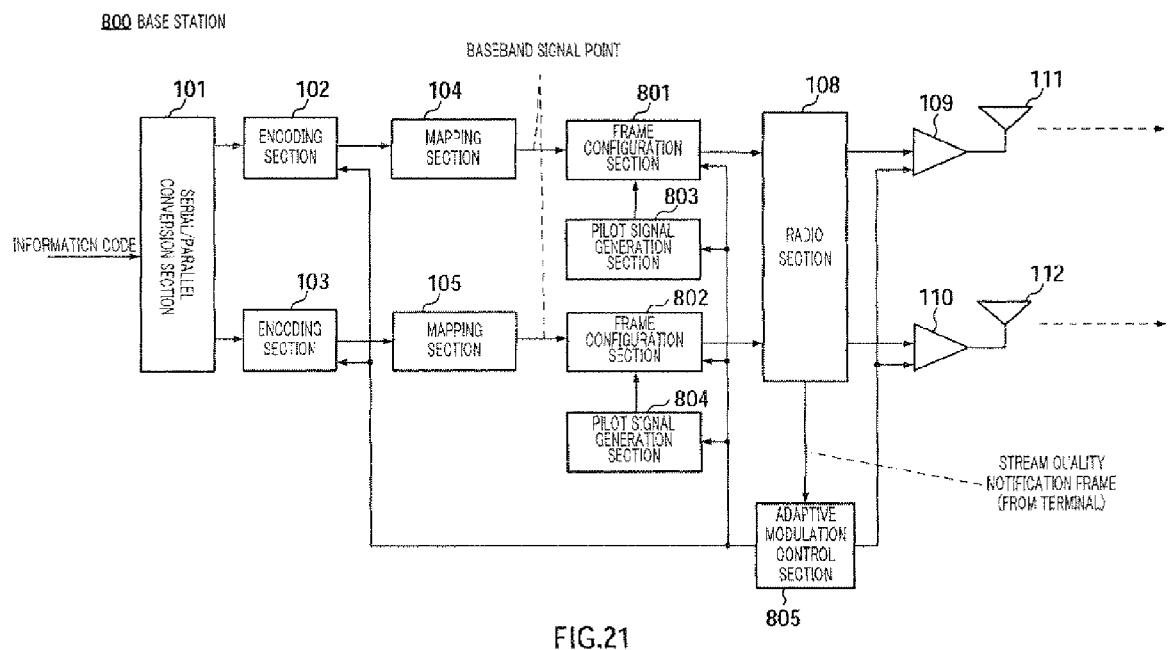
FIG. 21 is a block diagram showing a configuration of a base station of Embodiment 4.

FIG. 21, in which parts corresponding to those in FIG. 8 are assigned the same reference codes as in FIG. 8, shows a configuration of a base station according to this embodiment.

Information code is input to base station 800. Serial/parallel conversion section 101 performs processing that arranges the input information code into parallel form from serial form. For example, serial/parallel conversion section 101 outputs information code that is input at a particular time to encoding section 102, and outputs information code that is input at the next time to encoding section 103. By this means, serial/parallel conversion section 101 arranges information code into parallel form from serial form.

Encoding sections 102 and 103 perform channel encoding of input information code. A block code, convolutional code, or the like may be used in channel encoding. Encoding sections 102 and 103 can perform channel encoding using a plurality of coding rates, and which coding rate is used for encoding is controlled by adaptive modulation control section 805.

A channel encoded codeword is mapped by mapping sections 104 and 105. The mapping executed here is processing that maps code to a baseband signal point of a selected modulation scheme. Mapping sections 104 and 105 have mapping patterns of a plurality of modulation schemes, and which modulation scheme is selected is controlled by adaptive modulation control section 805.

The mapping to baseband signal points executed by mapping sections 104 and 105 is shown in the "BASE STATION TRANSMIT BASEBAND SIGNAL POINTS" column in FIG. 22A, FIG. 22B, FIG. 23A, FIG. 23B, and FIG. 24. FIG. 22A, FIG. 22B, FIG. 23A, FIG. 23B, and FIG. 24 show baseband signal points, and a corresponding pilot signal point, of respective modulation schemes. Here, baseband signal points and a corresponding pilot signal point are shown for BPSK modulation in (a) through (h) in FIG. 22A and FIG.

Figure 22A:
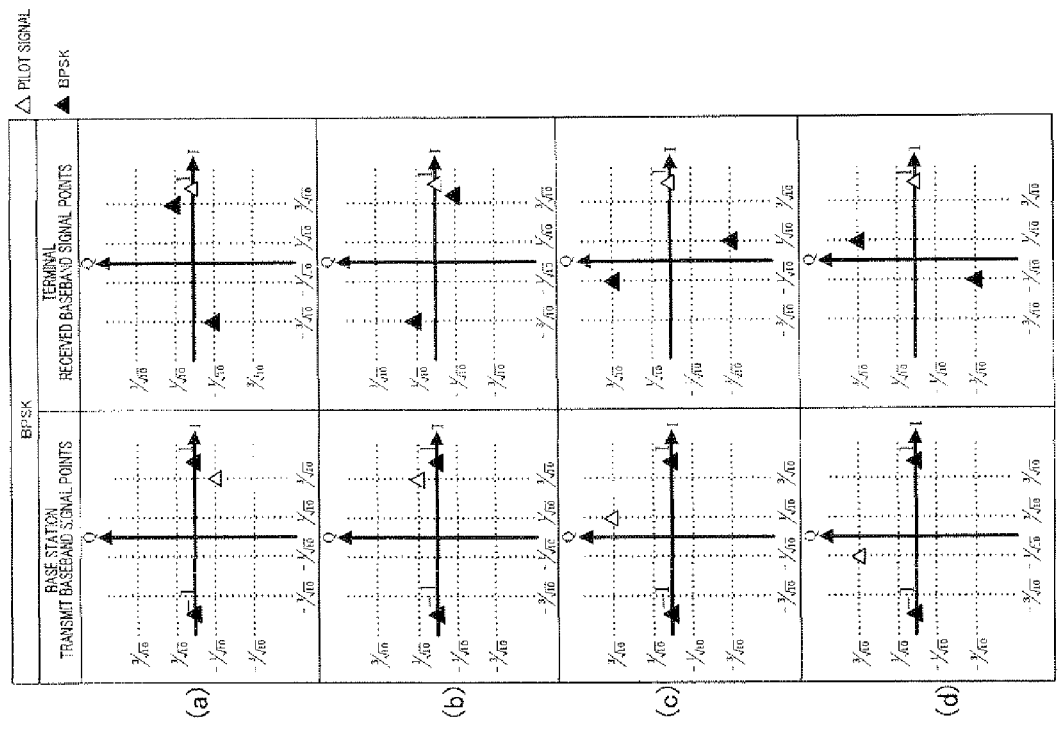
FIG. 22A(a) through (d) are drawings showing BPSK mapping of Embodiment 4.
Figure 22B:
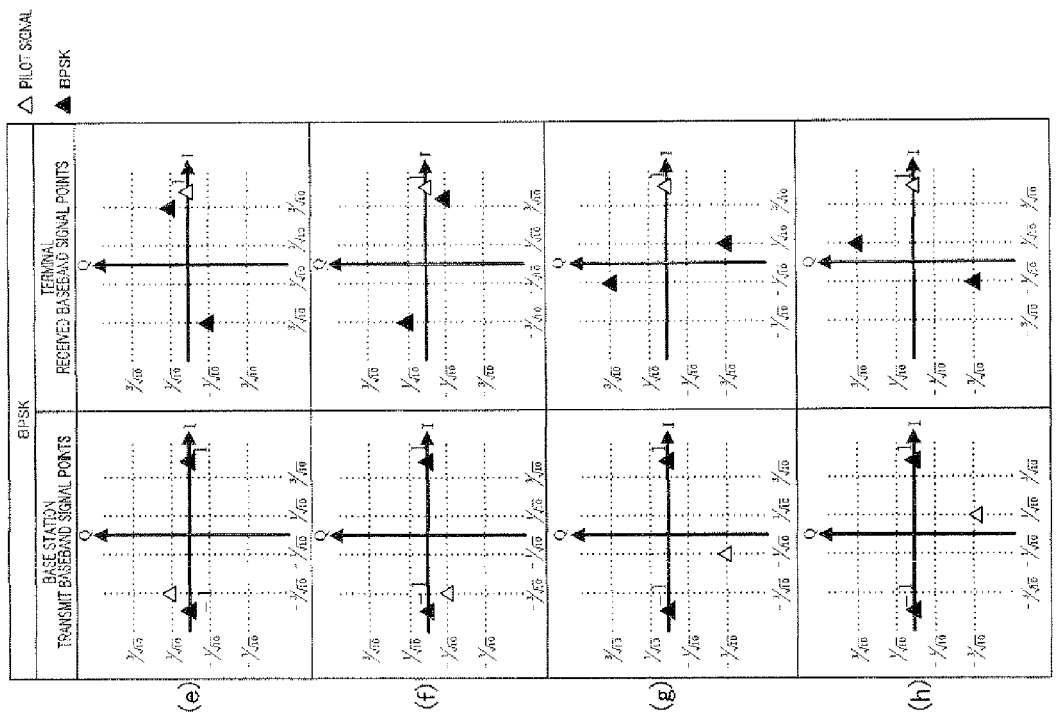
FIG. 22B(e) through (h) are drawings showing BPSK mapping of Embodiment 4.
Figure 23A:
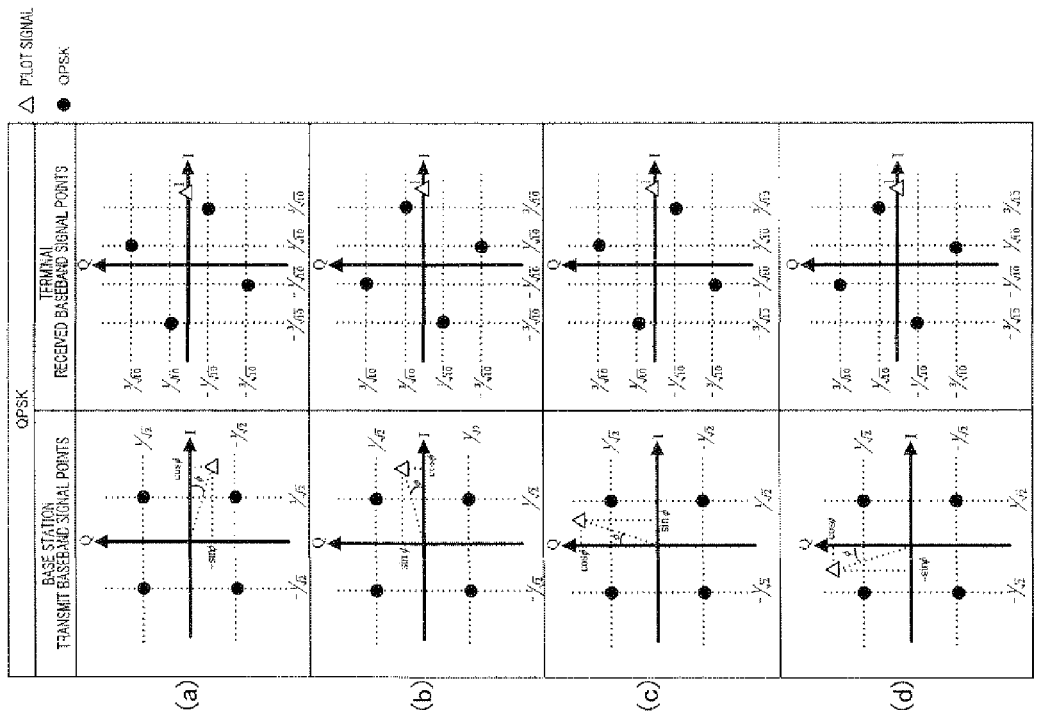
FIG. 23A(a) through (d) are drawings showing QPSK mapping of Embodiment 4.
Figure 23B:
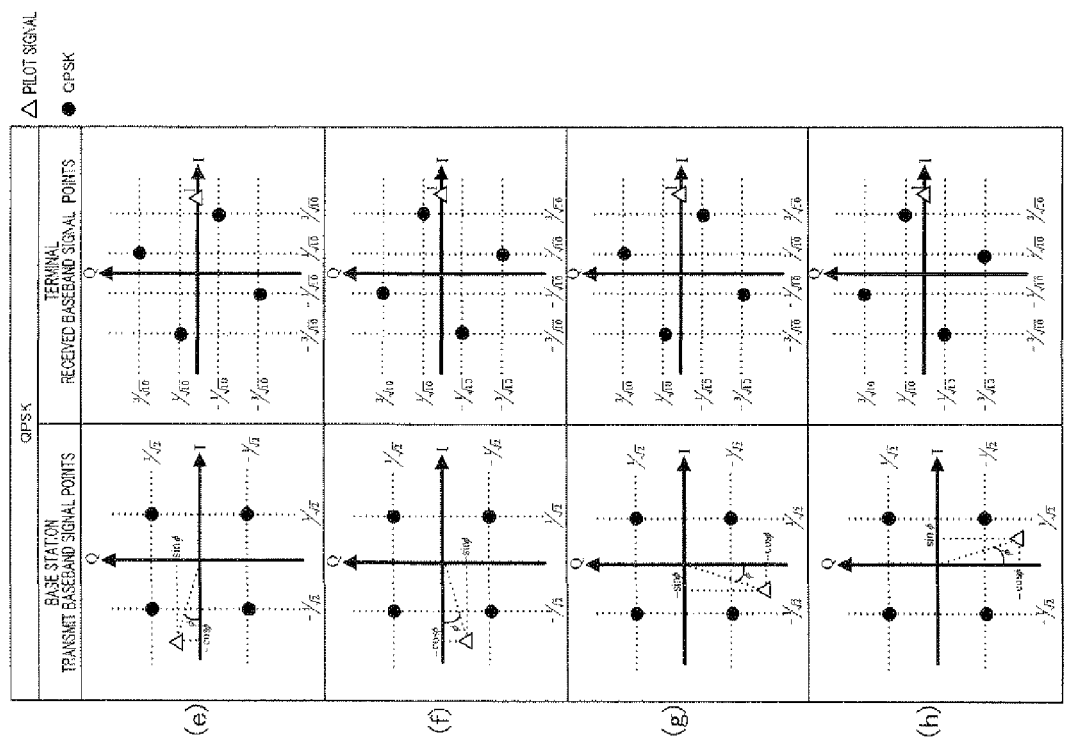
FIG. 23(e) through (h) are drawings showing QPSK mapping of Embodiment 4.
Figure 24:
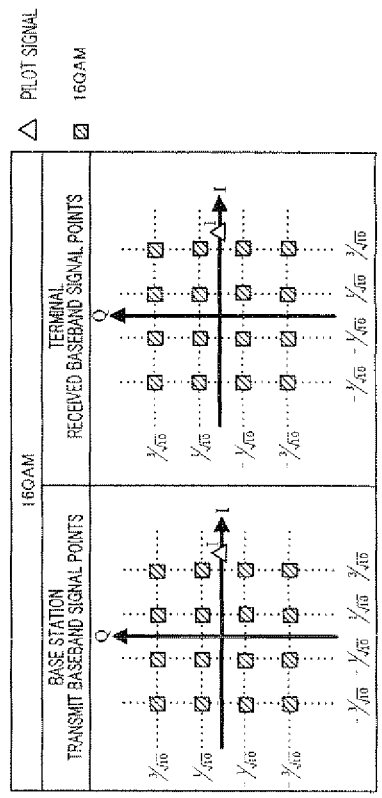
FIG. 24 is a drawing showing 16QAM mapping of Embodiment 4.

22B, for QPSK modulation in (a) through (h) in FIG. 23A and FIG. 23B, and for 16QAM modulation in FIG. 24. The baseband signal points shown in FIG. 22A, FIG. 22B, FIG. 23A, FIG. 23B, and FIG. 24 represent a plurality of examples. In actuality, mapping of respective modulation schemes executed by mapping sections 104 and 105 is decided from among the mapping examples shown in FIG. 22A, FIG. 22B, FIG. 23A, FIG. 23B, and FIG. 24.

For example, BPSK modulation mapping is decided as one of (a) through (h) in FIG. 22A and FIG. 22B. Similarly, QPSK modulation mapping is decided as one of (a) through (h) in FIG. 23A and FIG. 23B. Mapping sections 104 and 105 perform mapping to baseband signal points using one mapping pattern decided for each modulation scheme as described above.

Pilot signal generation sections 803 and 804 generate a pilot signal corresponding to a modulation scheme. For which modulation scheme a pilot signal is generated is controlled by adaptive modulation control section 805. Pilot signals generated by pilot signal generation sections 803 and 804 correspond to modulation schemes applied by mapping sections 104 and 105.

Here, pilot signals generated by pilot signal generation sections 803 and 804 are as shown in FIG. 22A, FIG. 22B, FIG. 23A, FIG. 23B, and FIG. 24. FIG. 22A, FIG. 22B, FIG. 23A, FIG. 23B, and FIG. 24 show baseband signal points of each modulation scheme together with a pilot signal point corresponding to each modulation scheme.

Here, (a) through (h) in FIG. 22A and FIG. 22B show a pilot signal point corresponding to BPSK modulation, (a) through (h) in FIG. 23A and FIG. 23B show a pilot signal point corresponding to QPSK modulation, and FIG. 24 shows a pilot signal point corresponding to 16QAM modulation. In FIG. 23A and FIG. 23B, $\phi=\text{Tan}^{-1}3-\pi/4$ [rad].

For pilot signal generation sections 803 and 804 also, as with mapping sections 104 and 105, a pilot signal corresponding to each modulation scheme is decided from among those shown in FIG. 22A, FIG. 223, FIG. 23A, FIG. 23B, and FIG. 24.

For example, a pilot signal corresponding to BPSK modulation is decided as one of (a) through (h) in FIG. 22A and FIG. 22B. Similarly, mapping according to QPSK modulation is decided as one of (a) through (h) in FIG. 23A and FIG. 23B. Pilot signal generation sections 803 and 804 generate one pilot signal decided for each modulation scheme as described above.

Next, frame configuration sections 801 and 802 configure a frame such as shown in FIG. 2. First, in time 1, a preamble signal is inserted in stream #A and a null signal is inserted in stream #B. In time 2, a pilot signal is inserted in stream #A and a null signal is inserted in stream #B. The pilot signal inserted here is a pilot signal generated by pilot signal generation section 803.

In time 3, a null signal is inserted in stream #A and a pilot signal is inserted in stream #B. The pilot signal inserted here is a pilot signal generated by pilot signal generation section 804. In time 4, a signal notifying the receiving apparatus of a modulation scheme applied to stream #A is inserted. In time 5, a signal notifying the receiving apparatus of a modulation scheme applied to stream #B is inserted.

In time 6, a signal for notification of a code rate applied to stream #A is inserted. In time 7, a signal for notification of a code rate applied to stream #B is inserted. In time 8 onward, modulated signals transmitted in streams #A and #B are inserted. Here, information on modulation schemes and code rates applied to streams #A and #B is obtained from adaptive modulation control section 805. Frame configuration sections 801 and 802 configure a transmit frame as described above.

Radio section 108 converts a frame configured by frame configuration sections 106 and 107 to a radio signal of a radio frequency band used by the communication system. Power control sections 109 and 110 convert a radio signal generated by radio section 108 to a radio signal having power equivalent to transmission power. Power conversion here is controlled by adaptive modulation control section 805, and is controlled so that transmission power is the same for streams #A and #B.

Here, encoding sections 102 and 103, mapping sections 104 and 105, frame configuration sections 801 and 802, pilot signal generation sections 803 and 804, and power control sections 109 and 110 are controlled by adaptive modulation control section 805. This control is as follows. First, a stream quality notification frame fed back from the receiving apparatus is input to adaptive modulation control section 805. This stream quality notification frame includes a parameter indicating received stream quality in the receiving apparatus. For example, the SINR (Signal to Interference and Noise power Ratio), received power, or the like of each stream is used as received stream quality.

Adaptive modulation control section 805 obtains information on received stream quality in the receiving apparatus from this stream quality notification frame. Adaptive modulation control section 805 has a table associating stream quality with a modulation scheme, coding rate, and transmission power. Adaptive modulation control section 805 controls adaptive modulation using this table. That is to say, the table contains combinations of modulation scheme, coding rate, and transmission power that improve transmission efficiency according to stream quality.

An example of this table is shown in FIG. 13. From the table shown in FIG. 13, adaptive modulation control section 805 decides a coding rate, modulation scheme, and transmission power corresponding to a received stream quality signal, and controls encoding sections 102 and 103, mapping sections 104 and 105, and power control sections 109 and 110 so as to correspond to the decided items.

Also, adaptive modulation control section 805 controls pilot signal generation sections 803 and 804 so as to generate pilot signals corresponding to the stream #A and #B modulation schemes. Furthermore, adaptive modulation control section 805 controls frame configuration sections 801 and 802 so as to use the pilot signals generated by pilot signal generation sections 803 and 804 in a frame. At the same time, adaptive modulation control section 805 controls frame configuration sections 801 and 802 so that stream #A and #B modulation scheme notification signals and coding rate notification signals correspond to a transmitted frame.

Antennas 111 and 112 perform spatial-multiplex transmission of transmit signals output from power control sections 109 and 110.

An important point of this embodiment is as follows.

An important point is that, in order to simplify spatial-multiplexed signal detection by means of MLD by a terminal, a base station uses different pilot signal point placement for each modulation scheme as shown in this embodiment. Pilot signal point placement for each modulation scheme at this time is as indicated by a "A" symbol in the "BASE STATION TRANSMIT BASEBAND SIGNAL POINTS" column in FIG. 22A, FIG. 22B, FIG. 23A, FIG. 23B, and FIG. 24.

Reception operations in a terminal when a pilot signal is transmitted using such signal point placement will now be described. On receiving a pilot signal transmitted by the base station, a terminal receives a subsequent signal based on the received pilot signal.

When a received pilot signal is taken as a reference point, the terminal provides for the reference point to be the same for all modulation schemes. In this embodiment, a case in which the reference point is taken as (1,0) in the terminal will be described as an example.

For example, an explanation will be given of how a pilot signal point and BPSK modulation signal points appear in the terminal when a pilot signal is made $(-3/\sqrt{10}, 3/\sqrt{10})$ and BPSK modulation scheme baseband signal points are made (1,0) and (−1,0) as shown in the "BASE STATION TRANSMIT BASEBAND SIGNAL POINTS" column in FIG. 22A(a) The terminal sets a received pilot signal to a (1,0) reference point as shown in the "TERMINAL RECEIVED BASEBAND SIGNAL POINTS" column in FIG. 22A(a). At this time, on the terminal side, relative BPSK modulated signal positions with respect to the reference point are $(3/\sqrt{10}, 1/\sqrt{10})$ and $(-3/\sqrt{10}, 1/\sqrt{10})$ signal points as shown in the "TERMINAL RECEIVED BASEBAND SIGNAL POINTS" column in FIG. 22A(a).

Similarly, an explanation will be given of how a pilot signal point and 16QAM modulation signal points appear in the terminal when the base station transmits a pilot signal corresponding to a 16QAM modulation scheme and a 16QAM modulated signal as shown in the "BASE STATION TRANSMIT BASEBAND SIGNAL POINTS" column in FIG. 24. If the base station transmits a pilot signal as (1,0) and the received pilot signal is made reference point (1,0) by the terminal, the signal point arrangement of the 16QAM modulated signal relative to the reference point corresponding to this is as shown in the "TERMINAL RECEIVED BASEBAND SIGNAL POINTS" column in FIG. 24.

Here, a BPSK modulation scheme signal point arrangement in the terminal is shared with a 16QAM modulation scheme signal point arrangement. At this time, in MLD arithmetic calculation by the terminal, square Euclidean distances for BPSK modulation scheme candidate signal points can be shared with square Euclidean distances for 16QAM modulation scheme candidate signal points. Square Euclidean distances for candidate signal points shown in the "TERMINAL RECEIVED BASEBAND SIGNAL POINTS" column in FIG. 22A(a) can be used as square Euclidean distances for a BPSK modulation scheme. By this means, the MLD arithmetic calculation configuration is simplified. This effect is similar to that in Embodiments 2 and 3.

In addition, the same also applies when transmission is performed using a pilot signal, BPSK modulated signal, and QPSK modulated signal of signal points shown in (b) through (h) in FIG. 22A and FIG. 22B and (a) through (h) in FIG. 23A and FIG. 23B. To describe how signal points of each modulation scheme appear in the terminal when transmission is performed using such signal points, they appear as shown in the corresponding "TERMINAL RECEIVED BASEBAND SIGNAL POINTS" column in (b) through (h) in FIG. 22A and FIG. 22B and (a) through (h) in FIG. 23A and FIG. 23B.

In the terminal at this time, BPSK modulation scheme received baseband signal points and QPSK modulation scheme received baseband signal points are shared with 16QAM modulation scheme received baseband signal points. Thus, in MLD arithmetic calculation by the terminal, square Euclidean distances for BPSK modulation scheme candidate signal points and QPSK modulation scheme candidate signal points respectively can be shared with square Euclidean distances for 16QAM modulation scheme candidate signal points.

Square Euclidean distances for candidate signal points shown in the "TERMINAL RECEIVED BASEBAND SIGNAL POINTS" column in (b) through (h) in FIG. 22A and FIG. 22B and (a) through (h) in FIG. 23A and FIG. 23B can be used as square Euclidean distances for a QPSK modulation scheme By this means, the MLD arithmetic calculation configuration is simplified. This effect is similar to that in Embodiments 2 and 3.

Referring to FIG. 22A, FIG. 22B, FIG. 23A, FIG. 23E, and FIG. 24, signal points of each modulated signal in the terminal when the base station transmits a pilot signal for a BPSK modulation scheme and a BPSK modulated signal as shown in FIG. 22A(a), transmits a pilot signal for a QPSK modulation scheme and a QPSK modulated signal as shown in FIG. 23A(a), and transmits a pilot signal for a 16QAM modulation scheme and a 16QAM modulated signal as shown in FIG. 24, are received as shown in FIG. 20. Thus, since signal points of the respective modulation schemes are shared, MLD arithmetic calculation can be simplified in the same way as in Embodiments 2 and 3.

As described above, the relative positional relationship between a pilot signal and modulated signal in the base station is important. In the terminal, since a pilot signal is taken as a reference point, the relative position of a modulated signal with respect to a pilot signal should be shared by respective modulation schemes in the base station. By so doing, signal points of the respective modulation schemes are received by the terminal as signal points shared by the modulation schemes, enabling MLD arithmetic calculation by the terminal to be simplified.

Embodiment 5

This embodiment relates to a case in which a modulation scheme with a higher M-ary modulation value, such as 8PSK or 64QAM, is used in addition to BPSK, QPSK, and 16QAM modulation schemes in a MIMO-AMC system. The object of this embodiment is to simplify the larger MLD arithmetic calculation configuration in a terminal.

In this embodiment, as in Embodiment 3, MLD arithmetic calculation by a terminal is simplified by performing sharing of signal points by respective modulation schemes. When signal points shared by respective modulation schemes are used at this time, provision is made for the average transmission power to be of the same magnitude or of the same order of magnitude as pilot signal transmission power. By this means, degradation of the CNR of a modulated signal and degradation of pilot signal reception characteristics on the receiving side can be eliminated, and transmit frame power control can be performed using a power control apparatus with a small amplification level dynamic range.

Figure 25:
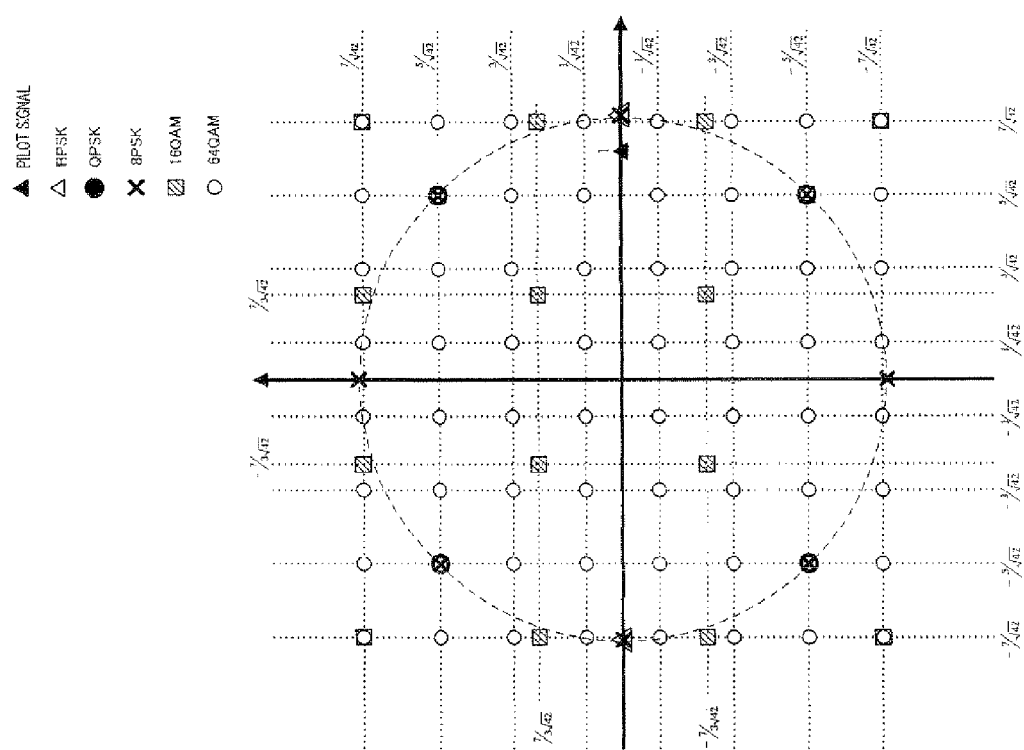
FIG. 25 is a drawing showing mapping of Embodiment 5.

The configuration of a base station according to this embodiment is similar to that in Embodiment 3. Therefore, the configuration of a base station according to this embodiment will be described using base station 700 shown in FIG. 16. However, a clear difference from Embodiment 3 here lies in the signal point constellations of respective modulation schemes. In this embodiment, some signal points of respective modulation schemes are shared so that the average transmission power is of the same magnitude or of the same order of magnitude as pilot signal transmission power for each modulation scheme. An example of modulation scheme signal point constellation employed in this embodiment are shown in FIG. 25.

QAM modulation scheme signal point sharing is performed as follows. First, a description will be given taking the case of a 16QAM modulation scheme and 64QAM modulation scheme as an example. As shown in FIG. 25, in sharing of 16QAM modulation scheme and 64QAM modulation scheme signal points, maximum amplitude points of the respective modulation schemes are shared at four points: (7/√42,7/√42), (7/√42,−7/√42), (−7/√42,7/√42), and (−7/√42,−7/√42) 16QAM and 64QAM signal point constellations are decided taking these maximum amplitude signal points as a reference. When signal points are shared in a combination of QAM modulation schemes in this way, four QAM modulation scheme maximum amplitude points are shared.

PSK modulation scheme signal point sharing is performed as follows. First, a description will be given taking the case of BPSK, QPSK, and 8PSK modulation schemes as an example. BPSK, QPSK, and SPSK modulation scheme signal points are shared as shown in FIG. 25. As phase angles between BPSK, QPSK, and SPSK signal points are all multiples of π/8, these can all be shared.

For example, it the terminal side (transmitting side) performs transmission using a modulation scheme from among BPSK, QPSK, and 8PSK modulation schemes, it is sufficient for the base station side (receiving side) to be able to perform MLD arithmetic calculation for only an 8PSK modulation scheme.

Also, if the terminal side (transmitting side) performs transmission using BPSK and QPSK modulation schemes, and an MLD arithmetic calculation section for an 8PSK modulation scheme is included in the base station side (receiving side), it is sufficient for the base station to be able to perform only QPSK modulation scheme MLD arithmetic calculation by transmitting BPSK modulation scheme signal points using QPSK modulation scheme signal points.

Even if signal points are shared in a combination of PSK modulation schemes in a situation in which a modulation scheme phase angle is not π/8, at least one signal point can be shared, enabling a reduction in the amount of MLD arithmetic calculation to be achieved.

Sharing of signal points of a combination of a QAM modulation scheme and a PSK modulation scheme is performed as follows. First, a description will be given taking the case of a QPSK modulation scheme and 64QAM modulation scheme as an example. As shown in FIG. 25, QPSK modulation scheme and 64QAM modulation scheme signal points are shared at four points: (5/√42,5/√42), (5/√42,−5/√42), (−5/√42,5/√42), and (−5/4 42,−5/√42). Consequently, when QAM modulation scheme and PSK modulation scheme signal point sharing is performed, at least one signal point can be shared.

There are also cases in which a plurality of points can be shared as in this embodiment.

An example of a case in which signal points of respective modulation schemes are shared as described above is shown in FIG. 25. However, when performing signal point sharing, it is necessary for provision to be made for the average transmission power of each modulation scheme to be of the same order as pilot signal transmission power. The average transmission power of respective modulation schemes when signal points are shared as in this embodiment is as shown in Table 2.

TABLE 2

| MODULATION SCHEME | AVERAGE TRANSMISSION POWER |
|---|---|
| BPSK | 25/21(≈1.19) |
| QPSK | 25/21(≈1.19) |
| 8PSK | 25/21(≈1.19) |
| 16QAM | 35/27(≈1.29) |
| 64QAM | 1 |

When transmission is performed using the signal point constellations shown in FIG. 25 there are 80 candidate signal points, and therefore in the case of two-stream transmission it is sufficient to have a configuration that performs MLD arithmetic calculation handling 80×80 (=6400) candidate signal points. A configuration that performs this MLD arithmetic calculation is shown in FIG. 26.

Figure 26:
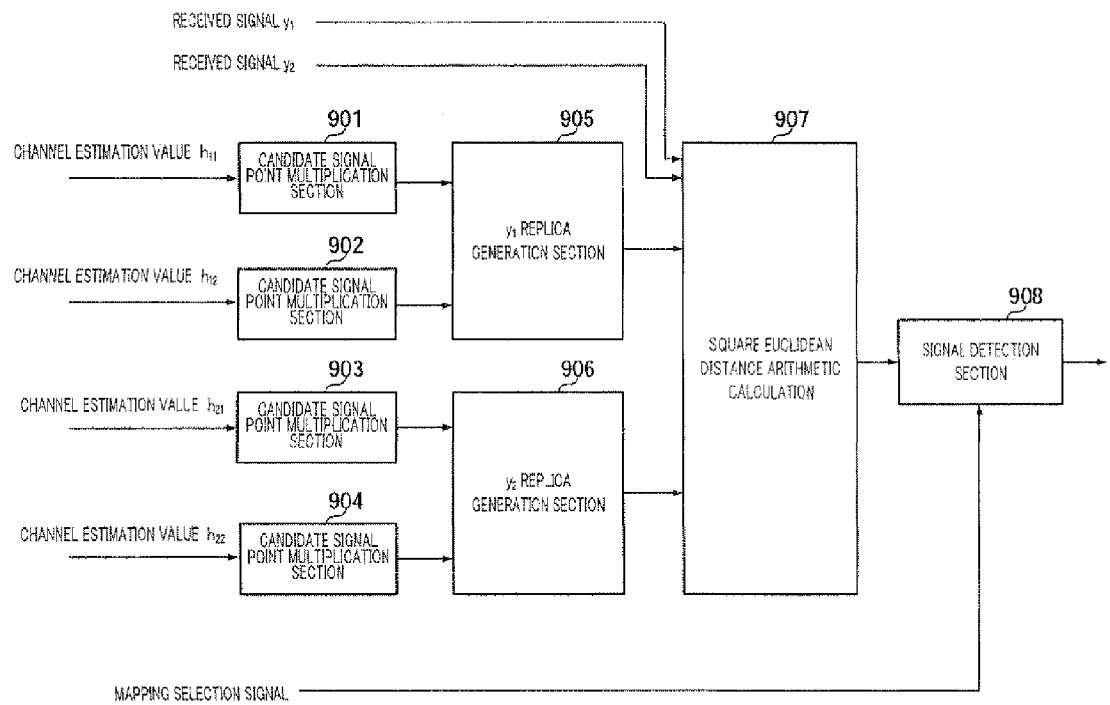
FIG. 26 is a block diagram showing a configuration of an MLD arithmetic calculation section of Embodiment 5.

In FIG. 26, candidate signal point multiplication sections 901, 902, 903, and 904 multiply a channel estimation value by a candidate signal point. In this embodiment, 80 candidate signal points are multiplied by a channel estimation value. The arithmetic calculations performed by these candidate signal point multiplication sections 901, 902, 903, and 904 correspond to the $h_{11} s_i$, $h_{12} s_j$, $h_{21} s_i$, and $h_{22} s_j$ arithmetic calculations (where i, j=1, 2, ..., 80) in Equation (8). Here, $s_i$ and $s_j$ can have 80 candidate signal point values.

Here, $y_1$ replica generating section 905 and $y_2$ replica generating section 906 generate a replica signal using outputs from candidate signal point multiplication sections 901, 902, 903, and 904. Arithmetic calculation by $y_1$ replica generating section 905 corresponds to Equation (8), and arithmetic calculation by $y_2$ replica generating section 906 corresponds to Equation (9).

Square Euclidean distance arithmetic calculation section 907 finds square Euclidean distances corresponding to Equation (10) using outputs from replica generating sections 905 and 906

Signal detection section 908 obtains information on a modulation scheme applied to each stream from a mapping selection signal. Signal detection section 908 makes a selection from among the square Euclidean distances found by square Euclidean distance arithmetic calculation section 907 using candidate signal points corresponding to the modulation scheme applied to each stream. Signal detection section 908 selects a combination of candidate signal points that generate a minimum square Euclidean distance from among the square Euclidean distances corresponding to the modulation scheme applied to each stream.

MLD arithmetic calculation performed in this embodiment is as follows. The numbers of square Euclidean distances that need to be found in MLD arithmetic calculation here are shown in Table 3.

TABLE 3

| STREAM #A | STREAM #B | CONVENTIONAL METHOD | METHOD OF PRESENT INVENTION |
|---|---|---|---|
| BPSK | BPSK | 4 | 6400 |
|  | QPSK | 8 |  |
|  | 8PSK | 16 |  |
|  | 16QAM | 32 |  |
|  | 64QAM | 128 |  |
| QPSK | QPSK | 16 |  |
|  | 8PSK | 32 |  |
|  | 16QAM | 64 |  |
|  | 64QAM | 256 |  |
| 8PSK | 8PSK | 64 |  |
|  | 16QAM | 128 |  |
|  | 64QAM | 512 |  |
| 16QAM | 16QAM | 256 |  |
|  | 64QAM | 1024 |  |
| 64QAM | 64QAM | 4096 |  |
| TOTAL |  | 6636 | 6400 |

Table 3 shows numbers of square Euclidean distances in a method of Embodiment 1 and a method of this embodiment for combinations of modulation schemes applied to transmission streams #A and #B. The method of Embodiment 1 is based on the configuration in FIG. 7, and the method of this embodiment is based on the configuration in FIG. 26.

According to Table 3, in Embodiment 1 (a method in which sharing of signal points by modulation schemes is not performed) the total number of square Euclidean distances found according to combinations of modulation schemes applied to streams is 6636. On the other hand, when a method of this embodiment is used, the total number of square Euclidean distances found is 6400, enabling the total number of square Euclidean distances that need to be found to be reduced compared with a conventional method.

Embodiment 6

This embodiment relates to a technology that reduces the amount of information fed back in a radio communication system in which a terminal performs feeds back information on a radio propagation path (hereinafter also referred to as a channel) estimated by the terminal to a base station. Fed-back channel information is used for adaptive modulation control and preceding.

Configurations of a base station and terminal according to this embodiment will now be described using accompanying drawings.

Figure 27:
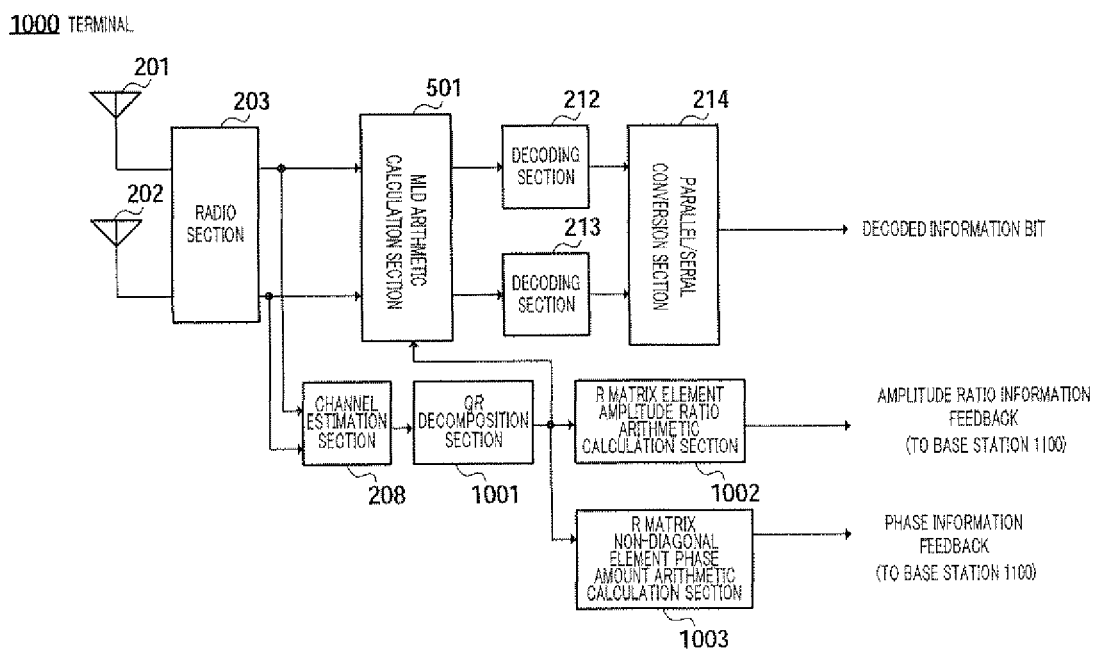
FIG. 27 is a block diagram showing a configuration of a terminal of Embodiment 6.

FIG. 27 shows the configuration of terminal 1000 according to this embodiment. Configuration elements in FIG. 27 identical to those in FIG. 9 are assigned the same names and numbers as in FIG. 9, and descriptions thereof are omitted here.

Terminal 1000 receives a signal transmitted from a base station in the same way as in Embodiment 1. In terminal 1000, signals received by antennas 201 and 202 are input to radio section 203. Radio section 203 down-converts input received signals to a frequency band handled by signal processing in the terminal. down-converted signals output from radio section 203 are input to channel estimation section 208.

Here, it is assumed that the base station transmits a frame that includes pilot signals as shown in FIG. 2. In this case, channel estimation section 208 performs channel estimation using pilot signals included in down-converted signals input from radio section 203. If a received signal is designated y, a matrix representing a channel is designated H (a channel matrix), a transmit signal is designated x, noise generated in terminal 500 is designated n, and it is assumed that there is no delayed wave effect in the channel, received signal y can be represented by y=Hx+n, with channel matrix H having fixed values.

For example, if OFDM (Orthogonal Frequency Division Multiplexing) is applied to a transmit signal, and a delay amount of a delayed wave in the channel is within an OFDM signal guard interval, there can be considered to be no delayed wave effect in the channel. In this case, y=Hx+n representation is possible in OFDM signal subcarrier units. In the description of this embodiment, it will be assumed by way of example that OFDM is applied to a transmit signal, and the delay amount of a delayed wave in the channel is within an OFDM signal guard interval.

Here, it is assumed that base station 1100 (FIG. 28) transmits signals from $N_{Tx}$ antennas, and terminal 1000 (FIG. 27) receives signals transmitted from base station 100 at $N_{Rx}$ antennas, where $N_{Tx} \leq N_{Rx}$. In this case, received signal y is an $N_{Rx} \times 1$ vector, channel matrix H is an $N_{Rx} \times N_{Tx}$ matrix, transmit signal x is an $N_{Tx} \times 1$ vector, and noise n is an $N_{Rx} \times 1$ vector.

Channel estimation section 208 estimates an $N_{Rx} \times N_{Tx}$ channel matrix. The same kind of channel estimation method as in Embodiment 1 may be used, for example. Channel estimation section 208 outputs estimated channel matrix $H_{est}$.

Figure 28:
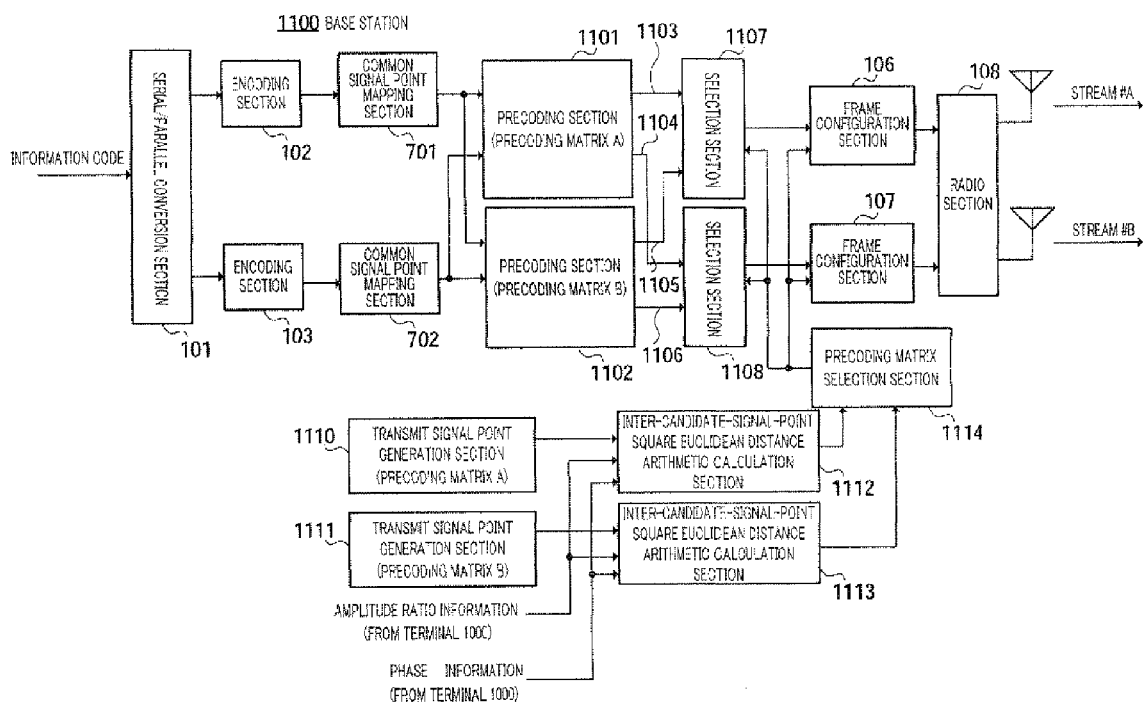
FIG. 28 is a block diagram showing a configuration of a base station of Embodiment 6.

To simplify the drawing, terminal 1000 shown in FIG. 27 illustrates a case in which number of receiving antennas $N_{Rx}=2$, but this embodiment is not limited to a case in which number of receiving antennas $N_{Rx}=2$, and the number of receiving antennas may be two or more. Also, to simplify the drawing, base station 1100 shown in FIG. 28 illustrates a case in which number of transmit antennas $N_{Tx}=2$, but this embodiment is not limited to a case in which number of transmit antennas $N_{Tx}=2$, and the number of transmit antennas may be two or more.

Channel estimation matrix $H_{est}$ estimated by channel estimation section 208 is input to QR decomposition section 1001. QR decomposition section 1001 performs QR decomposition of input channel estimation matrix $H_{est}$. Channel estimation matrix $H_{est}$ is decomposed by QR decomposition so that $H_{est}=Q \cdot R$. A Q matrix obtained by QR decomposition is an $N_{Rx} \times N_{Rx}$ unitary matrix, and an R matrix is an $N_{Rx} \times N_{Tx}$ upper triangular matrix (see Non-patent Document 3). An equation that performs QR decomposition of $N_{Rx} \times N_{Tx}$ channel estimation matrix $H_{est}$ is shown in Equation (13).

[13]

$$\begin{bmatrix} h_{1,1} & h_{1,2} & \cdots & h_{1,NTx} \\ h_{2,1} & \cdots & \cdots & h_{2,NTx} \\ \vdots & & \ddots & \vdots \\ h_{NRx,1} & \cdots & \cdots & h_{NRx,NTx} \end{bmatrix} = \begin{bmatrix} q_{1,1} & q_{1,2} & \cdots & q_{1,NRx} \\ q_{2,1} & \cdots & \cdots & q_{2,NRx} \\ \vdots & & \ddots & \vdots \\ q_{NRx,1} & \cdots & \cdots & q_{NRx,NRx} \end{bmatrix} \begin{bmatrix} r_{1,1} & r_{1,2} & \cdots & r_{1,NTx} \\ 0 & r_{2,2} & \cdots & r_{2,NTx} \\ \vdots & 0 & \ddots & \vdots \\ & & 0 & r_{NTx,NTx} \\ 0 & \cdots & & 0 \\ \vdots & & & \vdots \\ 0 & \cdots & & 0 \end{bmatrix}$$

(Equation 13)

where $$H_{est} = \begin{bmatrix} h_{1,1} & h_{1,2} & \cdots & h_{1,NTx} \\ h_{2,1} & \cdots & \cdots & h_{2,NTx} \\ \vdots & & \ddots & \vdots \\ h_{NRx,1} & \cdots & \cdots & h_{NRx,NTx} \end{bmatrix}$$

represents a channel estimation matrix, and $$Q = \begin{bmatrix} q_{1,1} & q_{1,2} & \cdots & q_{1,NRx} \\ q_{2,1} & \cdots & \cdots & q_{2,NRx} \\ \vdots & & \ddots & \vdots \\ q_{NRx,1} & \cdots & \cdots & q_{NRx,NRx} \end{bmatrix}, R = \begin{bmatrix} r_{1,1} & r_{1,2} & \cdots & r_{1,NTx} \\ 0 & r_{2,2} & \cdots & r_{2,NTx} \\ \vdots & 0 & \ddots & \vdots \\ & & 0 & r_{NTx,NTx} \\ 0 & \cdots & & 0 \\ \vdots & & & \vdots \\ 0 & \cdots & & 0 \end{bmatrix}$$

represent a Q matrix and R matrix when the channel estimation matrix has undergone QR decomposition.

An upper triangular matrix is a matrix in which an element positioned lower than a k-row, k-column diagonal element (where k=1, 2, ... $N_{Tx}$) is 0, as in the case of the R matrix shown in Equation (13). An R matrix diagonal element obtained by QR decomposition is a real number, and a non-diagonal element is a complex number. With QR decomposition section 1001, it is possible to perform QR decomposition of diagonal elements into positive real numbers in particular, and items are used that undergo QR decomposition so that diagonal elements become positive real numbers. QR decomposition section 1001 outputs the Q matrix and R matrix.

An R matrix is input to R matrix element amplitude ratio arithmetic calculation section 1002 from QR decomposition section 1001. R matrix element amplitude ratio arithmetic calculation section 1002 computes an amplitude ratio of input R matrix constituent elements, and outputs this. An amplitude ratio is found with the amplitude of a specific element in the R matrix as a reference. For example, if $r_{1,1}$ is taken as a reference, the amplitude ratio of R matrix m-row, n-column element $r_{m,n}$ is taken to be $(|r_{m,n}|/r_{1,1})$. R matrix element amplitude ratio arithmetic calculation section 1002 finds the amplitude ratio for an element present in an upper triangle in the R matrix, and feeds back found amplitude ratio information to base station 1100.

An R matrix is also input to R matrix non-diagonal element phase amount arithmetic calculation section 1003. A non-diagonal element in an R matrix is a complex number. Therefore, R matrix m-row, n-column element $r_{m,n}$ (where men) can be expressed as $r_{m,n}=\text{Re}(r_{m,n})+j\cdot\text{Im}(r_{m,n})$, where Re(·) and Im (·) represent functions that return a real component and imaginary component of a complex number respectively. R matrix non-diagonal element phase amount arithmetic calculation section 1003 computes $\arg(r_{m,n})=\text{Tan}^{-1}\{\text{Im}(r_{m,n})/\text{Re}(r_{m,n})\}$ for non-diagonal element $r_{m,n}$, where arg(·) represents a function that returns the phase of a complex number. R matrix non-diagonal element phase amount arithmetic calculation section 1003 finds the phase component of an R matrix non-diagonal element in this way, and feeds back phase information to base station 1100.

FIG. 28 shows a configuration of a base station according to this embodiment. Configuration elements in FIG. 28 identical to those in FIG. 8 and FIG. 16 are assigned the same names and numbers as in FIG. 8 and FIG. 16, and descriptions thereof are omitted here.

Base station 1100 has a configuration that selects a precoding matrix using amplitude ratio information and phase information fed back from terminal 1000. It has already been shown that signal x transmitted from number of transmit antennas $N_{Tx}$ antennas can be expressed as an $N_{Tx}\times 1$ vector.

Precoding means executing processing such as matrix multiplication in advance on the $N_{Tx}\times 1$ transmit signal vector x. Precoding processing that performs matrix multiplication on a spatial-multiplex transmitted signal vector is shown in Equation (14).

[14]

$$\begin{bmatrix} s_1 \\ s_1 \\ \vdots \\ s_{NTx} \end{bmatrix} = \begin{bmatrix} w_{1,1} & w_{1,2} & \cdots & w_{1,NTx} \\ w_{2,1} & \cdots & & w_{2,NTx} \\ \vdots & & \ddots & \vdots \\ w_{NTx,1} & \cdots & & w_{NTx,NTx} \end{bmatrix} \begin{bmatrix} x_1 \\ x_1 \\ \vdots \\ x_{NTx} \end{bmatrix} \quad \text{(Equation 14)}$$

where $$x = \begin{bmatrix} x_1 \\ x_1 \\ \vdots \\ x_{NTx} \end{bmatrix}$$

represents a post-mapping signal vector, $$W = \begin{bmatrix} w_{1,1} & w_{1,2} & \cdots & w_{1,NTx} \\ w_{2,1} & \cdots & & w_{2,NTx} \\ \vdots & & \ddots & \vdots \\ w_{NTx,1} & \cdots & & w_{NTx,NTx} \end{bmatrix}$$

represents a precoding matrix, and $$s = \begin{bmatrix} s_1 \\ s_1 \\ \vdots \\ s_{NTx} \end{bmatrix}$$

represents a post preceding transmit signal vector.

A precoding matrix W component is a complex number. Base station 1100 has a plurality of different matrices as precoding matrix W candidates. For example, in this embodiment, base station 1100 has $W_A$ (pattern A) and $W_B$ {pattern B} as different preceding matrices.

Of preceding matrices $W_A$ and $W_B$, base station 1100 selects the preceding matrix for which terminal 1000 reception characteristics are improved, using information fed back from terminal 1000. As a preceding matrix selection criterion in base station 1100 here, it is desirable to use a criterion whereby, for example, a precoding matrix is selected such that a minimum value of a square Euclidean distance between candidate signal points used by MLD arithmetic calculation section 501 in terminal 1000 is maximized.

The reason why such a precoding matrix selection criterion is desirable is as follows. It was shown earlier that received signal y can be expressed as y=Hx+n. For received signal y, noise term n is added to candidate signal point Hx. Here, a square Euclidean distance between candidate signal points $Hx_1$ and $Hx_2$ is assumed to be a minimum square Euclidean distance. Also, a received signal when transmit signal $x_1$ is transmitted is designated $y_1=Hx_1+n$. In this case, square Euclidean distance $\|y_1-Hx_2\|^2$ between candidate signal point $Hx_2$ and transmit signal $x_1$ has the highest possibility of being smaller than $\|y_1-Hx_1\|^2$ due to noise term n as compared with square Euclidean distances between other candidate signal points and received signal points.

MLD arithmetic calculation is arithmetic calculation that takes a transmit signal configuring a candidate signal point for which the distance between a received signal point and candidate signal point is a minimum as a detection result. Therefore, when a square Euclidean distance between candidate signal points $Hx_1$ and $Hx_2$ is a minimum, the possibility of transmit signal $x_1$, when transmitted, being mistaken for $x_2$ in MLD arithmetic calculation on the receiving side is highest. In order to reduce the effect of an error in MLD arithmetic calculation, it is desirable for the minimum distance between candidate signal points to be increased.

For this reason, provision is made for base station 1100 of this embodiment to select a precoding matrix so as to maximize a minimum value of a square Euclidean distance between candidate signal points. Another criterion may also be used as a preceding matrix selection criterion by base station 1100, but since base station 1100 selects a preceding matrix according to a channel state between base station 1100 and terminal 1000, base station 1100 uses channel information fed back from terminal 1000 at the time of precoding matrix selection.

Returning to FIG. 28, the description will now be continued. In FIG. 28, transmit signal point generation section (preceding matrix A) 1110 and transmit signal point generation section (preceding matrix B) 1111 generate signal points after preceding has been executed. Specifically, transmit signal point generation section (preceding matrix A) 1110 generates an $s_A = W_A x$ signal point by performing precoding using preceding matrix $W_A$, and similarly, transmit signal point generation section (preceding matrix B) 1111 generates an $s_B = W_B x$ signal point by performing precoding using preceding matrix $W_B$.

FIG. 28 shows a case in which base station 1100 number of transmit antennas $N_{Tx}$ is two as an example. In this case, transmit signal point generation section (preceding matrix A) 1110 and transmit signal point generation section (preceding matrix B) 1111 output respectively generated precoded signal points $s_A = [s_{1,A}, s_{2,A}]^T$ and $s_B = [s_{1,B}, s_{2,B}]^T$. Here, there are combinations for $(s_{1,A}, s_{2,A})$. For example, assume that $s_{1,A}$ is composed of M-ary value M modulation signal points and $s_{1,B}$ is composed of M-ary value N modulation signal points. In this case, there are M×N possible combinations for $(s_{1,A}, s_{2,A})$. Therefore, there are M×N possible candidate signal points. Similarly, there are M×N possible combinations for $(s_{1,B}, s_{2,B})$.

Amplitude ratio information and phase information fed back from terminal 1000 is input to both of inter-candidate-signal-point square Euclidean distance arithmetic calculation sections 1112 and 1113. Also, output $s_A$ from transmit signal point generation section (preceding matrix A) 1110 is input to inter-candidate-signal-point square Euclidean distance arithmetic calculation section 1112, and output $s_B$ from transmit signal point generation section (preceding matrix B) 1111 is input to inter-candidate-signal-point square Euclidean distance arithmetic calculation section 1113. Inter-candidate-signal-point square Euclidean distance arithmetic calculation sections 1112 and 1113 compute square Euclidean distances between candidate is signal points used by MLD arithmetic calculation section 501 in terminal 1000 when $s_A$ and $s_B$ are transmitted.

Here, candidate signal points used by MLD arithmetic calculation section 501 in terminal 1000 are as follows. Received signal y when transmit signal s is transmitted in a case in which precoding is performed can be expressed as y=Hs+n. It is assumed that channel estimation matrix H estimates an actual channel correctly.

By performing QR decomposition of a channel estimation matrix, y=Hs+n conversion is performed. Here, y=QR·s+n is multiplied by Q* from the left. That is to say, Q*y=Q*QR·s+Q*n, where (·)* represents a matrix transposed conjugate. Here, since a Q matrix is a unitary matrix, it follows that Q*Q=I, where I represents a unitary matrix. By performing this kind of arithmetic calculation, if z=Q*y and v=Q*n, z=R·s+v is obtained.

MLD arithmetic calculation section 501 performs an $E = \|z - Rs\|^2$ arithmetic calculation on vector z obtained by multiplying a received signal by $Q^* \cdot E = \|z - Rs\|^2$ is a arithmetic calculation for finding a square Euclidean distance between vector z and candidate signal point Rs. Since MLD arithmetic calculation section 501 uses Rs as a candidate signal point in this way, it is only necessary for matrix R to be obtained by base station 1100 in order for inter-candidate-signal point square Euclidean distance arithmetic calculation sections 1112 and 1113 to compute distances between candidate signal points.

R matrix amplitude ratios and R matrix non-diagonal element phase information are fed back to base station 1100 from terminal 1000. If an R matrix generated by base station 1100 is designated $R_{est}$, base station 1100 generates $R_{est}$ matrix m-row, n-column element $r_{m,n}^{(est)}$ as follows, using the feedback information.

Assume that terminal 1000 feeds back amplitude ratios of R matrix elements with $r_{1,1}$ as a reference. In this case, an amplitude ratio for $r_{m,n}$ is $(|r_{m,n}|/r_{1,1})$. If $r_{m,n}$ is an m=n diagonal element, base station 1100 uses $(|r_{m,n}|/r_{1,1})$ directly as $R_{est}$ matrix m-row, n-column element $r_{m,n}^{(est)} = (|r_{m,n}|/r_{1,1})$. On the other hand, if $r_{m,n}$ is an m<n non-diagonal element, base station 1100 uses a non-diagonal element phase component fed back from terminal 1000. $R_{est}$ matrix m-row, n-column element $r_{m,n}^{(est)}$ generated at this time is taken as $r_{m,n}^{(est)} = (|r_{m,n}|/r_{1,1}) \arg(r_{m,n})$. An R matrix generated in this way is shown in Equation (15).

[15]

$$R_{est} = \begin{bmatrix} 1 & \frac{|r_{1,2}|}{r_{1,1}}\arg(r_{1,2}) & \cdots & \frac{|r_{1,NTx}|}{r_{1,1}}\arg(r_{1,NTx}) \\ 0 & \frac{r_{2,2}}{r_{1,1}} & \cdots & \frac{|r_{2,NTx}|}{r_{1,1}}\arg(r_{2,NTx}) \\ \vdots & 0 & \ddots & \vdots \\ & & 0 & \frac{r_{NTx,NTx}}{r_{1,1}} \\ 0 & \cdots & & 0 \\ \vdots & & & \vdots \\ 0 & \cdots & & 0 \end{bmatrix}$$ (Equation 15)

An $R_{est}$ matrix generated by base station 1100 here is $R_{est} = (R/r_{1,1})$. However, if candidate signal point arrangement relationships are known by base station 1100, which precoding matrix can be used to maximize the minimum distance between candidate signal points is known. Therefore, even if candidate signal points generated by $R_{est}$'s are used, there is no effect on preceding matrix selection since candidate signal point arrangement relationships are known.

An actual arithmetic calculation by inter-candidate-signal-point square Euclidean distance arithmetic calculation sections 1112 and 1113 when the number of transmit antennas is two is shown in Equation (16).

[16]

$$E = \left| (s_1(m_1) - s_1(m_2)) + \frac{|r_{12}|}{r_{11}} \exp\{j \cdot \arg(r_{12})\}(s_2(n_1) - s_2(n_2)) \right|^2 + \left| \frac{r_{22}}{r_{11}} \frac{(s_2(n_1) - s_2(n_2))}{s_2(n_2)} \right|^2$$ (Equation 16)

Here, $s_1(m)$ represents an m'th transmit signal of M existing transmit signals $s_1$ (where m=1, 2, ..., M). Similarly, $s_2(n)$ represents an n'th transmit signal of N existing transmit signals $s_2$ (where n=1, 2, ..., N). Also, arg(X) is a function that returns a phase component of X.

In performing an arithmetic calculation, inter-candidate-signal-point square Euclidean distance arithmetic calculation section 1112 converts $(s_1,s_2)$ in Equation (16) to $(s_{1,A},s_{2,A})$. Similarly, in performing a arithmetic calculation, inter-candidate-signal-point square Euclidean distance arithmetic calculation section 1113 converts $(s_1,s_2)$ in Equation (16) to $(s_{1,B}, s_{2,B})$. A case in which $(m_1, n_1)=(m_2, n_2)$ is a case in which identical transmit signals are transmitted, and therefore Equation (16) gives a value of 0. Since it is necessary to find a square Euclidean distance between candidate signal points, inter-candidate-signal-point square Euclidean distance arithmetic calculation sections 1112 and 1113 do not perform arithmetic calculation for a case in which $(m_1,n_1)=(m_2,n_2)$.

Inter-candidate-signal-point square Euclidean distance arithmetic calculation section 1112 finds square Euclidean distances between candidate signal points corresponding to all $(m_1, n_1, m_2, n_2)$ combinations other than $(m_1, n_1)=(m_2, n_2)$, and outputs the minimum value thereof. Similarly, inter-candidate-signal-point square Euclidean distance arithmetic calculation section 1113 also finds all square Euclidean distances between candidate signal points and outputs the minimum value thereof.

Precoding matrix selection section 1114 selects the precoding matrix for which minimum values of square Euclidean distances between candidate signal points input from inter-candidate-signal-point square Euclidean distance arithmetic calculation sections 1112 and 1113 become larger. Precoding matrix selection section 1114 outputs control information indicating the selected precoding matrix.

Modulated signals from common signal point mapping sections 701 and 702 are input to precoding section (precoding matrix A) 1101 and precoding section (precoding matrix B) 1102. Precoding section (precoding matrix A) 1101 performs the arithmetic calculation in Equation (14) on modulated signals input from common signal point mapping sections 701 and 702 using precoding matrix $W_A$, and precoding section (precoding matrix B) 1102 similarly performs the arithmetic calculation in Equation (14) on modulated signals input from common signal point mapping sections 701 and 702 using precoding matrix $W_B$.

Of the signals after precoding processing has been executed, section (precoding matrix A) 1101 selects signal $(s_{1,A})$ corresponding to stream #A transmission as output signal 1103, and outputs this signal to selection section 1107. Also, section (precoding matrix A) 1101 outputs signal $(s_{2,A})$ corresponding to stream #B transmission to selection section 1108 as output signal 1104.

Similarly, of the signals after precoding processing has been executed, preceding section (precoding matrix B) 1102 selects signal $(s_{1,B})$ corresponding to stream #A transmission as output signal 1105, and outputs this signal to selection section 1107. Also, precoding section (precoding matrix B) 1102 outputs signal $(s_{2,B})$ corresponding to stream #B transmission to selection section 1108 as output signal 1106.

Precoding signals 1103 and 1105 from precoding sections 1101 and 1102, and control information from precoding matrix selection section 1114, are input to selection section 1107. Precoding signals 1104 and 1106 from precoding sections 1101 and 1102, and control information from precoding matrix selection section 1114, are input to selection section 1108.

Of precoding signals 1103, 1104, 1105, and 1106, election sections 1107 and 1108 select and output a signal on which preceding processing has been performed using a precoding matrix indicated by input control information, For example, if precoding matrix $W_A$ has been selected by precoding matrix selection section 1114, selection sections 1107 and 1108 select a signal precoded using preceding matrix $W_A$, and output this.

Signals selected by selection sections 1107 and 1108 are input to frame configuration sections 106 and 107 respectively. In addition, control information indicating a precoding matrix is input to frame configuration sections 106 and 107 from precoding matrix selection section 1114. Frame configuration sections 106 and 107 perform framing of signals input from selection sections 1107 and 1108 by adding information indicating the selected precoding matrix, and output a framed signal.

Signal W·p resulting from multiplying pilot signal p by preceding matrix W is used as information indicating the preceding matrix used here. When post-mapping signal x is multiplied by precoding matrix W, the transmit signal becomes W·x. In this case, a received signal in terminal 1000 is represented by y=H·(Wx)+n=(HW)x+n, where H represents a channel matrix and n represents noise. At this time, term (HW) can be thought of as a channel matrix used at the time of precoding application.

When base station 1100 transmits a signal resulting from multiplying pilot signal p by precoding matrix W, y=(HW)p+n is obtained by terminal 1000 as received signal y. Since pilot signal p is a signal known to base station 1100 and terminal 1000, term (HW) is estimated as a channel estimation matrix from the equation y=(HW)p+n by channel estimation section 208 in terminal 1000.

MLD arithmetic calculation section 501 can perform MLD arithmetic calculation, irrespective of what kind of preceding matrix has been multiplied by post-mapping signal x, by performing MLD arithmetic calculation using channel estimation matrix (HW) estimated by channel estimation section 208. Therefore, signal W·p resulting from multiplying pilot signal p by preceding matrix W can be used as information indicating a preceding matrix.

A channel state between base station 1100 and terminal 1000 fluctuates over time since terminal 1000 moves. Consequently, a channel state between base station 1100 and terminal 1000 fluctuates over time even during processing whereby terminal 1000 feeds back channel information to base station 1100 and base station 1100 selects a preceding matrix.

Therefore, by using a signal resulting from multiplying a pilot signal by a precoding matrix as information indicating a preceding matrix, as described above, channel estimation section 208 of terminal 1000 is able to perform channel estimation that tracks fluctuation over time of a channel between base station 1100 and terminal 1000. Furthermore, by performing MLD arithmetic calculation using channel estimation matrix (HW) estimated by channel estimation section 208, MLD arithmetic calculation section 501 is able to perform MLD arithmetic calculation irrespective of what kind of precoding matrix is selected by preceding matrix selection section 1114.

Therefore, this embodiment will be described below on the premise that a signal resulting from multiplying a pilot signal by a precoding matrix is used as information indicating a precoding matrix.

In this case, frame configuration sections 106 and 107 can configure the same kind of frame as shown in FIG. 2. However, of the information added when framing is performed by frame configuration sections 106 and 107, the selected multiplied by a preceding matrix selected by precoding matrix selection section 1114 is used for information of time 2 through time 7 in FIG. 2. A preamble signal transmitted in time 1 is a signal needed by terminal 1000 to perform synchronization, and therefore multiplication by a precoding matrix is not necessary. Also, signals from time 8 onward are signals already multiplied by a precoding matrix that are input from selection sections 1107 and 1108, and therefore do not need to be multiplied anew by a precoding matrix in frame configuration sections 106 and 107.

Radio section 108 up converts a frame input from frame configuration sections 106 and 107 to a radio signal, and supplies this to the antennas. Each antenna transmits a supplied radio signal.

Terminal 1000 receives a signal transmitted from base station 1100. In terminal 1000, a received signal is down-converted by radio section 203 to a frequency band handled by terminal 1000 signal processing. A down-converted received signal is input to MLD arithmetic calculation section 501 and channel estimation section 208. Channel estimation section 208 generates a channel estimation matrix using a signal resulting from multiplying a pilot signal in a frame configured by frame configuration sections 106 and 107 of base station 1100 by a preceding matrix. Channel estimation section 208 outputs the generated channel estimation matrix to QR decomposition section 1001.

QR decomposition section 1001 performs QR decomposition of the channel estimation matrix input from channel estimation section 208, and outputs a Q matrix and R matrix obtained thereby to MLD arithmetic calculation section 501. MLD arithmetic calculation section 501 performs MLD arithmetic calculation using the Q matrix and R matrix obtained by QR decomposition of the channel estimation matrix. MLD arithmetic calculation using a Q matrix and R matrix is as follows.

In channel estimation section 208, matrix (HW) including a preceding matrix is estimated. Thus, received signal y can be expressed as shown in the first line of Equation (17). QR decomposition section 1001 performs conversion from the first line of Equation (17) to the second line by performing QR decomposition on (HW). Equation (18) is obtained by multiplying Equation (17) by $Q^*$ from the left, where $(\cdot)^*$ represents a matrix transposed conjugate. Here, since a Q matrix is a unitary matrix, it follows that $Q^*Q=I$, where I represents a unitary matrix.

[17]
$$y = (HW)x + n \quad \text{(Equation 17)}$$
$$= QRx + n$$

[18]
$$Q^*y = Q^*QRx + Q^*n \quad \text{(Equation 18)}$$
$$z = Rx + v$$
$$\text{where } z = \begin{bmatrix} z_1 \\ z_1 \\ \vdots \\ z_{NTx} \end{bmatrix} \text{ and } v = \begin{bmatrix} v_1 \\ v_1 \\ \vdots \\ v_{NTx} \end{bmatrix}$$

MLD arithmetic calculation section 501 performs an $E=\|z-Rx\|^2$ arithmetic calculation on vector z obtained by multiplying a received signal by $Q^*$ as shown in Equation (18). This arithmetic calculation can be represented as shown in Equation (19).

[19]
$$E = \|z - Rx\|^2 \quad \text{(Equation 19)}$$
$$= |z_1 - (r_{11}x_1 + r_{12}x_2)|^2 + |z_2 - r_{22}x_2|^2$$

Since a candidate signal point for vector z is Rx, MLD arithmetic calculation section 501 finds a square Euclidean distance between vector z and its candidate signal point Rx. MLD arithmetic calculation section 501 performs an $E=\|z-Rx\|^2$ arithmetic calculation on all vectors x for which there is a possibility of having been transmitted.

For example, arithmetic calculation when the number of transmission streams is two is as follows. If the M-ary modulation value of a signal transmitted from stream #A is designated M, and the M-ary modulation value of a signal transmitted from stream #B is designated N, there are M×N combinations of vector x for which there is a possibility of having been transmitted. MLD arithmetic calculation section 501 performs an $E=\|z-Rx\|^2$ arithmetic calculation on all M×N vector x combinations.

Of square Euclidean distances found for all vectors x, MLD arithmetic calculation section 501 outputs vector x that gives a minimum value as a spatial-multiplexed signal detection result.

Processing in decoding sections 212 and 213 onward is similar to that in FIG. 9. This concludes a description of a configuration of this embodiment.

Next, an effect obtained by employing a configuration of this embodiment will be described.

Base station 1100 of this embodiment selects a preceding matrix so as to maximize a minimum value of square Euclidean distances between candidate signal points used by MLD arithmetic calculation section 501 in terminal 1000. At this time, base station 1100 needs information on a channel between base station 1100 and terminal 1000. Base station 1100 reproduces candidate signal points in terminal 1000 by using channel information. Base station 1100 selects a precoding matrix so as to maximize a minimum value of distances between reproduced candidate signal points. However, since feedback information from terminal 1000 to base station 1100 is necessary at this time, frequency resources in a communication channel from terminal 1000 to base station 1100 are used. As frequency resources are limited, if the amount of feedback information from terminal 1000 to base station 1100 is large, frequency resources that can be used for other information communication in a communication channel from terminal 1000 to base station 1100 are reduced. Therefore, it becomes necessary to reduce the amount of feedback information from terminal 1000 to base station 1100.

Thus, in this embodiment, channel estimation matrix H estimated by terminal 1000 is not fed back directly, but instead, information to be fed back is generated using an R matrix obtained after QR decomposition of channel estimation matrix H.

An R matrix is an upper triangular matrix in which diagonal elements are real numbers. Terminal 1000 computes only an amplitude ratio by means of R matrix element amplitude ratio arithmetic calculation section 1002 for an R matrix diagonal element and feeds back this amplitude ratio. On the other hand, an amplitude ratio and phase component are found by R matrix element amplitude ratio arithmetic calculation section 1002 and R matrix non-diagonal element phase amount arithmetic calculation section 1003 for an R matrix non-diagonal element, and these are fed back.

The number of feedback information items generated based on an R matrix in this way is as follows. Assume that the number of streams transmitted from base station 1100 is $N_{Tx}$. In this case, the number of R matrix diagonal elements is $N_{Tx}$, and the number of non-diagonal elements in an upper triangular matrix of the R matrix is $N_{Tx} \cdot (N_{Tx}-1)/2$. Therefore, since only an amplitude ratio is fed back for a diagonal element, the number of feedback information items is $N_{Tx}$. Also, since an amplitude ratio and phase component are fed back for a non-diagonal element, the number of feedback information items is $\{N_{Tx}(N_{Tx}-1)/2\}\times 2=N_{Tx}(N_{Tx}-1)$. In addition, R matrix element amplitude ratio arithmetic calculation section 1002 computes an amplitude ratio taking a specific element of the R matrix as a reference, and feeds this back. Thus, the total number of information items fed back by terminal 1000 is $N_{Tx}+N_{Tx}(N_{Tx}-1)-1=N_{Tx}^2-1$.

On the other hand, the number of information items fed back when all channel estimation matrices H are fed back is as follows. Assuming that the number of receiving antennas is $N_{Rx}$, the number of channel estimation matrix elements is $N_{Rx}\cdot N_{Tx}$. Since channel estimation matrix elements are all complex numbers, it is necessary to feed back an amplitude ratio and phase component of each element. Therefore, the total number of information items fed back is $2N_{Rx}\cdot N_{Tx}$.

Since $N_{Tx} \leq NR_{Rx}$ here, the relationship between the total number of feedback information items when feedback information is generated based on an R matrix ($N_{Tx}^2-1$) and the total number of feedback information items when all channel estimation matrices H are fed back ($2N_{Rx}\cdot N_{Tx}$) is $(N_{Tx}^2-1)<(2N_{Rx}\cdot N_{Tx})$. Therefore, by generating feedback information based on an R matrix, feedback information can be reduced by a proportion of $\{(2N_{Rx}\cdot N_{Tx})-(N_{Tx}^2-1)\}/2N_{Rx}\cdot N_{Tx}$.

Next, a configuration will be described that reduces the total number of feedback information items when base station 1100 uses precoding that only changes the phase of a signal point.

When only the phase of a signal point is changed, for precoding matrices $W_A$ and $W_B$ used by precoding section (precoding matrix A) 1101 and precoding section (precoding matrix B) 1102, non-diagonal element term component $w_{mn}$ (where m≠n) is 0, and diagonal term $w_{mn}$ (where m=n) is $|w_{mn}|=1$.

Here, a case in which base station 1100 performs transmission scheme using MIMO spatial-multiplexing using two transmit antennas will be considered as an example. At this time, the relationship between distances between candidate signal points in MLD arithmetic calculation when QR decomposition is used is as shown in Equation (16). In Equation (16) the second term is $|(r_{22}/r_{11})(s_2(n_1)-s_2(n_2))|^2=|(r_{22}/r_{11})w_{22}(x_2(n_1)-x_2(n_2))|^2=|(r_{22}/r_{11})(x_2(n_1)-x_2(n_2))|^2$.

From the above, it can be seen that there is no great change in the size of the second term in Equation (16) even if the phase of a signal point is changed. Where a change in size appears due to changing the phase of a signal point is in the first term in Equation (16). Therefore, if first term $|(s_1(m_1)-s_1(m_2))+(|r_{12}|/r_{11})\exp\{j\cdot\arg((r_{12})\}(s_2(n_1)-s_2(n_2))|^2$ of Equation (16) can be generated, a minimum value of square Euclidean distances between candidate points can be found.

When this is done, the information required by base station 1100 is $(|r_{12}|/r_{11})$ and $\arg((r_{12}))$. Therefore, when base station 1100 uses precoding that only changes the phase of a signal point, R matrix element amplitude ratio arithmetic calculation section 1002 and R matrix non-diagonal element phase amount arithmetic calculation section 1003 in terminal 1000 need only feed back $(|r_{12}|/r_{11})$ and $\arg((r_{12}))$ respectively. By this means, amplitude ratio $(r_{22}/r_{11})$ feedback information can be reduced.

In addition, the following method may be employed as a method for reducing the amount of feedback information when using precoding that only changes the phase of a signal point. The first term in Equation (16) can be converted as shown in Equation (20).

[20]

$$\left|(s_1(m_1)-s_1(m_2))+\frac{|r_{12}|}{r_{11}}\exp\{j\cdot\arg(r_{12})\}(s_2(n_1)-s_2(n_2))\right|^2= \quad \text{(Equation 20)}$$

$$\left|(s_1(m_1)-s_1(m_2))-\frac{|r_{12}|}{r_{11}}\exp\{j\cdot\arg(r_{12})\}(s_2(n_2)-s_2(n_1))\right|^2=$$

$$\left|\Delta_1-\frac{|r_{12}|}{r_{11}}\exp\{j\cdot\arg(r_{12})\}\Delta_2\right|^2$$

where $\Delta_1=s_1(m_1)-s_1(m_2)$ and $\Delta_2=s_2(n_2)-s_2(n_1)$

Here, $\Delta_1$ and $\Delta_2$ in Equation (20) are defined as difference vectors that represent modulation signal point differences, with $\Delta_1$ defined as a difference vector corresponding to stream #A, and $\Delta_2$ defined as a difference vector corresponding to stream #B. From Equation (20) it can be seen that the first term of Equation (16) is the same as measuring a square Euclidean distance between a stream #A difference vector and a vector in which a stream #B difference vector has been multiplied by channel information.

Here, an equation that expands Equation (20) is as shown in Equation (21).

[21]

$$\left|\Delta_1-\frac{|r_{12}|}{r_{11}}\exp\{j\cdot\arg(r_{12})\Delta_2\}\right|^2= \quad \text{(Equation 21)}$$

$$|\Delta_1|^2+\left|\frac{|r_{12}|}{r_{11}}\Delta_2\right|^2-2|\Delta_1|\left|\frac{|r_{12}|}{r_{11}}\Delta_2\right|\cos(\omega-\phi)$$

where $\omega$ is a phase difference between difference vectors $\Delta_1$ and $\Delta_2$, and $\phi=\arg(r_{12})$ It is assumed here that the range of inter-vector phase difference $\omega-\phi$ in Equation (21) is $0\leq\omega-\phi\leq\pi$. When base station 1100 uses precoding that only changes the phase of a signal point, the $|\Delta_1|^2$ term and $|(r_{12}/r_{11})\Delta_2|^2$ term in Equation (21) do not change. When base station 1100 uses precoding that only changes the phase of a signal point, the $-2|\Delta_1||(|r_{12}|/r_{11})\Delta_2|\cos(\omega-\phi)$ term changes. The difference vectors $\Delta_1$ and $\Delta_2$ are $\Delta_1=s_1(m_1)-s_1(m_2)$ and $\Delta_2=s_2(n_2)-s_2(n_1)$, where $m_1$, $m_2=1, 2, \ldots, M$. Thus, difference vectors $\Delta_1$ and $\Delta_2$ have a plurality of constituent elements. Therefore, when base station 1100 uses precoding that only changes the phase of a signal point, base station 1100 finds term $D=\{-2|\Delta_1||(|r_{12}|/r_{11})\Delta_2|\cos(\omega-\phi)\}$ using each constituent element of $\Delta_1$ and $\Delta_2$. Base station 1100 finds a minimum value of the found D. Base station 1100 selects a precoding matrix that maximizes the minimum value of D.

If $\cos(\omega-\phi)=-1$, it can be stated that $D=\{-2|\Delta_1||(|r_{12}|/r_{11})\Delta_2|\cos(\omega-\phi)\}=\{2|\Delta_1||(|r_{12}|/r_{11})\Delta_2|\}$. However, origin symmetry components are present in difference vectors $\Delta_1$ and $\Delta_2$, as in a combination of $\Delta_1=s_1(m_1)-s_1(m_2)$ and $\Delta_1=s_1(m_2)-s_1(m_1)$. Therefore, it a difference vector such that $\cos(\omega-\phi)=-1$ is present, a corresponding difference vector such that $\cos(\omega-\phi)=1$ is also present.

Thus, in order to maximize the minimum value of term $D=\{-2|\Delta_1||(|r_{12}|/r_{11})\Delta_2|\cos(\omega-\phi)\}$, a precoding matrix is selected so that term $\cos(\omega-\phi)$ has a value closer to 0. That is to say, a precoding matrix is selected such that inter-vector phase difference $\omega-\phi$ has a value close to $\pi/2$. Specifically, base station 1100 finds a maximum value of $|\pi/2-(\omega-\phi)|$ for a difference vector when using each precoding matrix. If a precoding matrix is used that minimizes the found $|\pi/2-(\omega-\phi)|$ maximum value, inter-vector phase difference $\omega-\phi$ will have a value close to $\pi/2$. Therefore, provision is made for precoding matrix selection section 1114 in base station 1100 to select a preceding matrix such that the maximum value of $|\pi/2-(\omega-\phi)|$ becomes a minimum.

Figure 29:
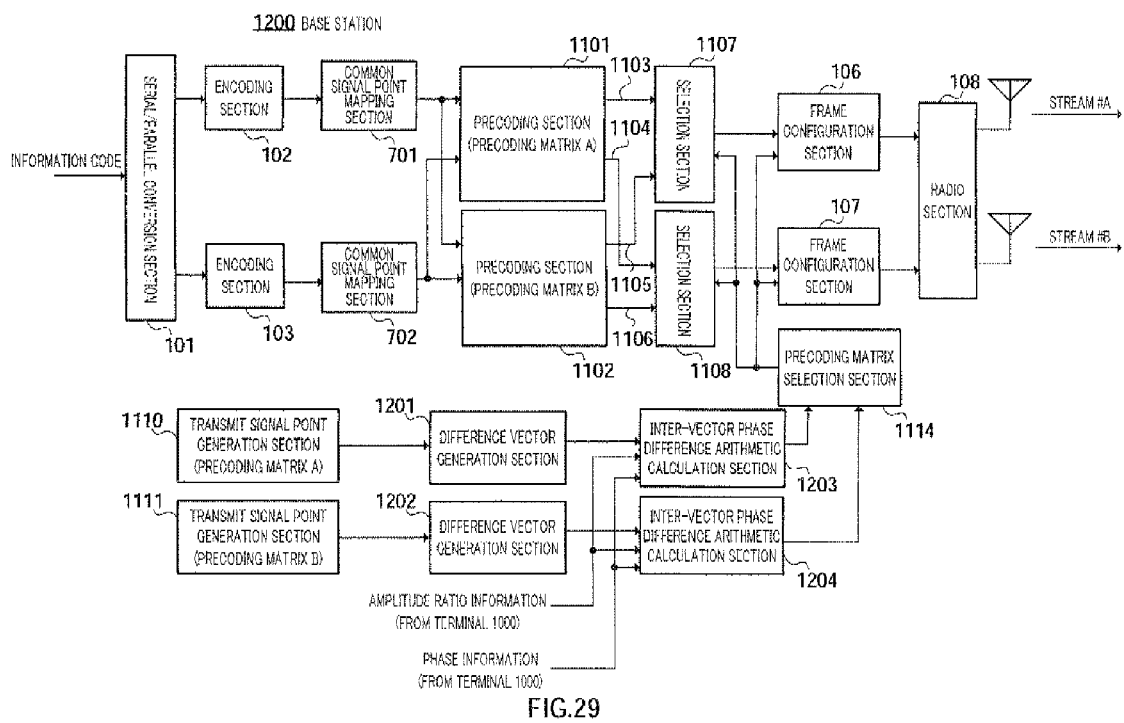
FIG. 29 is a block diagram showing a configuration of a base station of Embodiment 6.

A base station configuration for a case in which this kind of processing is performed is shown in FIG. 29. In FIG. 29, in which parts corresponding to those in FIG. 28 are assigned the same reference codes as in FIG. 28, base station 1200 generates precoded transmit signal vectors $s_A$ and $s_B$ when precoding matrices $W_A$ and $W_B$ are used respectively in transmit signal point generation section (preceding matrix A) 1110 and transmit signal point generation section (preceding matrix B) 1111. Transmit signal point generation section (precoding matrix A) 1110 and transmit signal point generation section (precoding matrix B) 1111 output generated transmit signal vectors $s_A$ and $s_B$ respectively to difference vector generation sections 1201 and 1202.

Difference vector generation sections 1201 and 1202 generate difference vectors $\Delta_A=[\Delta_{1,A}\,\Delta_{2,A}]^T$ and $\Delta_B=[\Delta_{1,B}\,\Delta_{2,B}]^T$ of input transmit signal vectors $s_A$ and $s_B$. It is assumed here that $\Delta_{1,x}=s_{1,x}(m_1)-s_{1,x}(m_2)$ and $\Delta_{2,x}=s_{2,x}(n_2)-s_{2,x}(n_1)$ (where X=A, B). Difference vector generation sections 201 and 1202 output generated difference vectors $\Delta_A$ and $\Delta_B$ respectively to inter-vector phase difference arithmetic calculation sections 1203 and 1204.

Inter-vector phase difference arithmetic calculation sections 1203 and 1204 generate phase differences $\omega_A$ and $\omega_B$ for these difference vectors $\Delta_A$ and $\Delta_B$. Here, inter-vector phase difference $\omega_A$ is a phase difference between difference vectors $\Delta_{1,A}$ and $\Delta_{2,A}$, and inter-vector phase difference $\omega_B$ is a phase difference between difference vectors $\Delta_{1,B}$ and $\Delta_{2,B}$. There are combinations for $m_1$, $m_2$, $n_1$, and $n_2$ in difference vectors $\Delta_{1,A}$ and $\Delta_{2,A}$ and difference vectors $\Delta_{1,B}$ and $\Delta_{2,B}$. Therefore, there are also combinations for difference vectors $\Delta_{1,A}$ and $\Delta_{2,A}$ and difference vectors $\Delta_{1,B}$ and $\Delta_{2,B}$ according to combinations of $m_1$, $m_2$, $n_1$, and $n_2$. Inter-vector phase difference arithmetic calculation sections 1203 and 1204 find phase differences corresponding to combinations of difference vectors $\Delta_{1,A}$ and $\Delta_{2,A}$ and difference vectors $\Delta_{1,B}$ and $\Delta_{2,B}$ as $\omega_A$ and $\omega_B$ respectively.

Inter-vector phase difference arithmetic calculation sections 1203 and 1204 finds inter-vector phase differences $\omega_A-\phi$ and $\omega_B-\phi$ in Equation (21) (where $0 \le \omega_A-\phi$, $\omega_B-\phi \le \pi$) using feedback information $\phi=\arg(r_{12})$ from terminal 1000.

Inter-vector phase difference arithmetic calculation sections 1203 and 1204 output maximum values of $|\pi/2-(\omega_A-\phi)|$ and $|\pi/2-(\omega_B-\phi)|$ respectively to precoding matrix selection section 1114 using inter-vector phase differences found as described above.

Precoding matrix selection section 1114 selects a preceding matrix that gives a minimum value among the input $|\pi/2-(\phi_A-\phi)|$ and $|\pi/2-(\omega_B-\phi)|$ maximum values. Base station 1200 selects a preceding matrix in the above-described way.

Here, inter-vector phase difference $\omega$ does not change according to a channel. On the other hand, the value of $\phi$ in Equation (21) changes according to a channel. Thus, $\arg(r_{12})$ information can be fed back from terminal 1000 in order for inter-vector phase difference arithmetic calculation sections 1203 and 1204 to obtain inter-vector phase difference $\omega-\phi$ information. Therefore, when preceding that only changes the phase of a signal point is used, in order to reduce the amount of feedback information, only phase information $\arg(r_{12})$ obtained by R matrix non-diagonal element phase amount arithmetic calculation section 1003 in terminal 1000 may be fed back, without feeding back amplitude ratio information obtained by R matrix element amplitude ratio arithmetic calculation section 1002.

Also, in order to reduce the amount of phase information feedback, R matrix non-diagonal element phase amount arithmetic calculation section 1003 may convert phase information to be fed back as follows.

Figure 30:
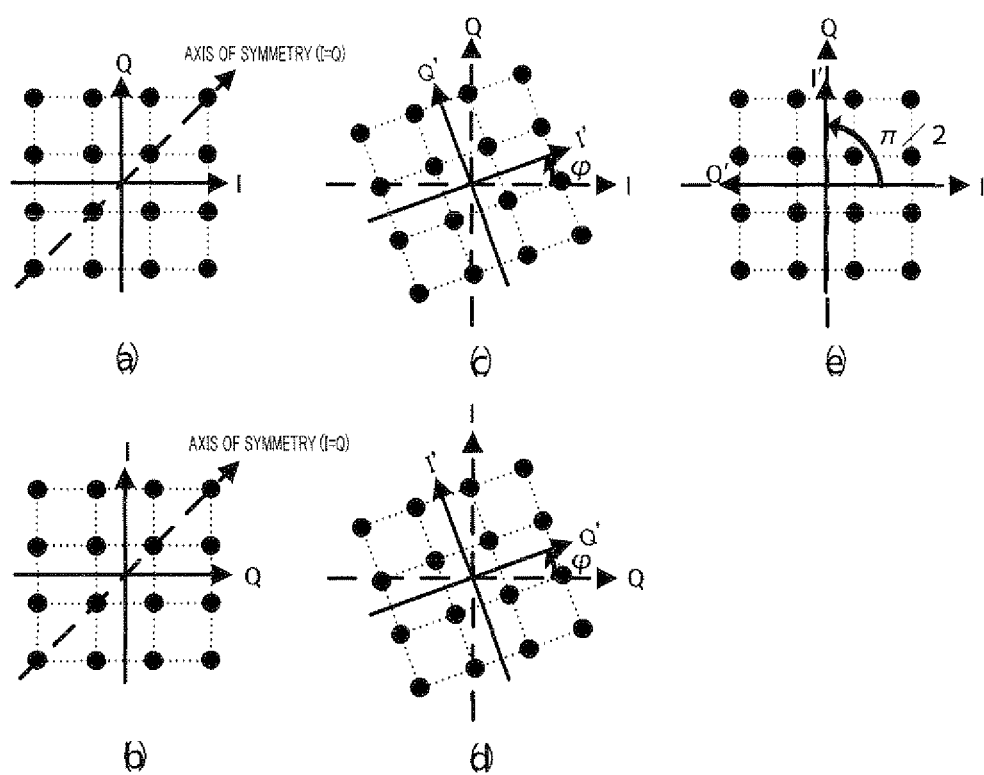
FIG. 30(a) through (e) are drawings provided to explain feedback phase information reduction according to Embodiment 6.

FIG. 30 shows QAM signal points. In FIG. 30, 16QAM is shown as an example of QAM. As shown in FIGS. 30(*a*) and (*b*), QAM signal points form a signal point arrangement that is symmetrical about an I=Q axis. FIG. 30(*c*) shows a signal point arrangement after subjection to channel fluctuation that imparts phase rotation of $\phi$ from the I axis to the signal points in FIG. 30(*a*). Similarly, FIG. 30(*d*) shows a signal point arrangement after subjection to channel fluctuation that imparts phase rotation of $\phi$ from the Q axis to the signal points in FIG. 30(*b*). In FIG. 30(*d*), the amount of phase change of a signal point due to a channel as viewed from the I axis is $(\pi/2-\phi)$. As shown in FIGS. 30(*c*) and (*d*), the signal point arrangement relationship is the same for amounts of phase change due to channel fluctuation of $(\phi)$ and $(\pi/2-\phi)$. Also, as shown in FIG. 30(*e*), the signal point arrangement of signal points subjected to $\pi/2$ phase rotation is the same the original signal point arrangement. Therefore, in order for a candidate signal point arrangement relationship to be reproduced by inter-candidate-signal-point square Euclidean distance arithmetic calculation sections 1112 and 1113 of base station 1100 (FIG. 28), phase information from I axis phase amount 0 to a $\pi/4$ phase amount constituting an axis of symmetry is sufficient as phase information that is fed back.

Based on the above, R matrix non-diagonal element phase amount arithmetic calculation section 1003 (FIG. 27) converts phase information that is fed back as follows.

Figure 31A:
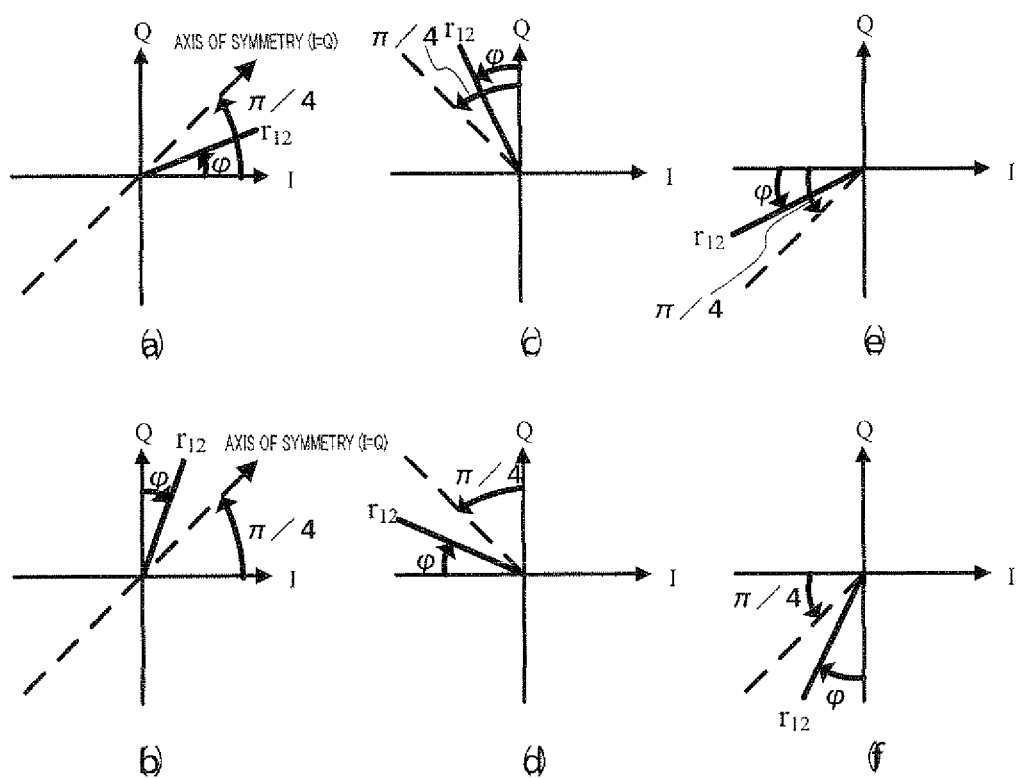
FIG. 31A(a) through (f) are drawings provided to explain feedback phase information reduction according to Embodiment 6.

1. If $0 \le \arg(r_{12}) < \pi/4$ as shown in FIG. 31A(a), R matrix non-diagonal element phase amount arithmetic calculation section 1003 feeds back $\phi=\arg(r_{12})$.

2. If $\pi/4 \le \arg(r_{12}) < \pi/2$ as shown in FIG. 31A(b), R matrix non-diagonal element phase amount arithmetic calculation section 1003 feeds back $\phi=\pi/2-\arg(r_{12})$.

3. If $\pi/2 \le \arg(r_{12}) < 2\pi/4$ as shown in FIG. 31A(c), R matrix non-diagonal element phase amount arithmetic calculation section 1003 feeds back $\phi=\arg(r_{12})-\pi/2$.

4. If $3\pi/4 \le \arg(r_{12}) < \pi$ as shown in FIG. 31A(d), R matrix non-diagonal element phase amount arithmetic calculation section 1003 feeds back $\phi=\pi-\arg(r_{12})$ 5. If $\pi \le \arg(r_{12}) < 5\pi/4$ as shown in FIG. 31A(e), R matrix non-diagonal element phase amount arithmetic calculation section 1003 feeds back $\phi=\arg(r_{12})-\pi$.

6. If $5\pi/4 \le \arg(r_{12}) < 3\pi/2$ as shown in FIG. 31(*f*), R matrix non-diagonal element phase amount arithmetic calculation section 1003 feeds back $\phi=3\pi/2-\arg(r_{12})$.

Figure 31B:
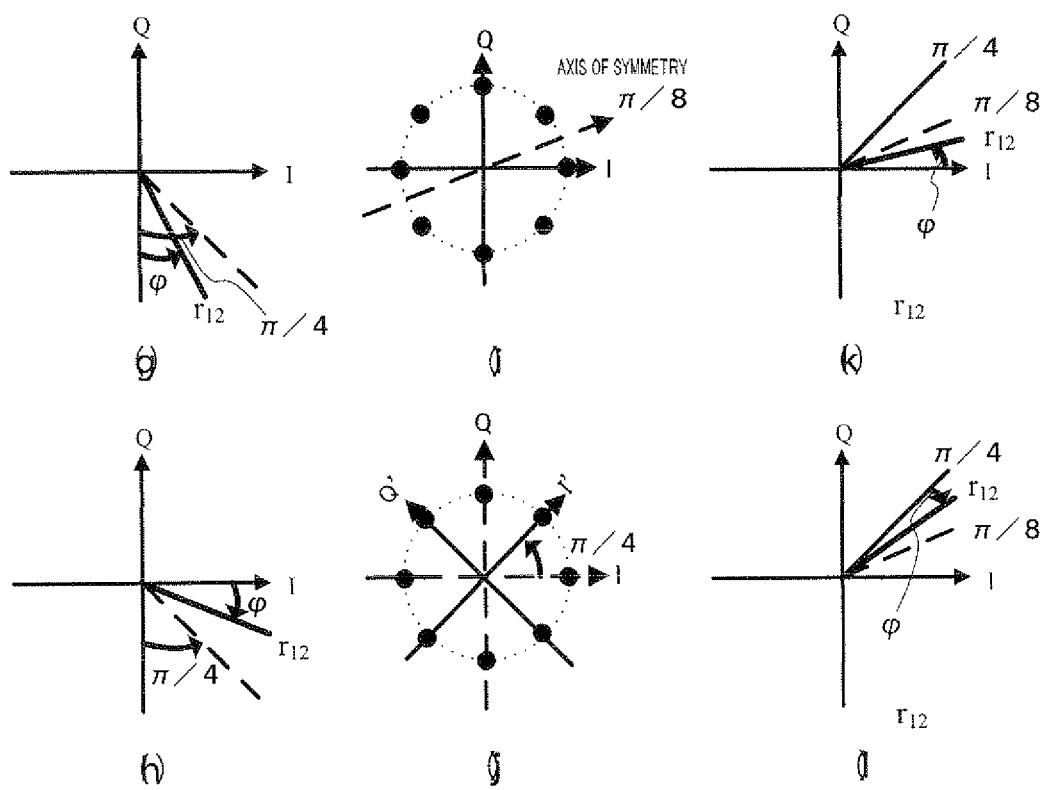
FIG. 31B(g) through (l) are drawings provided to explain feedback phase information reduction according to Embodiment 6.

7. If $3\pi/2 \le \arg(r_{12}) < 7\pi/4$ as shown in FIG. 31B(g) R matrix non-diagonal element phase amount arithmetic calculation section 1003 feeds back $\phi=\arg(r_{12})-3\pi/2$.

8. If $7\pi/4 \le \arg(r_{12}) < 2\pi$ as shown in FIG. 31B(h), R matrix non-diagonal element phase amount arithmetic calculation section 1003 feeds back $\phi=2\pi-\arg(r_{12})$.

The phase amounts shown in 1. through 8. are phase amounts in a range from 0 to $\pi/4$ for which candidate signal point arrangement relationships can be reproduced by inter-candidate-signal-point square Euclidean distance arithmetic calculation sections 1112 and 1113 of base station 1100 (FIG. 28). Based on the above, R matrix non-diagonal element phase amount arithmetic calculation section 1003 of terminal 1000 (FIG. 27) may perform reduction of the amount of feedback information by feeding back the phase information in 1. through 8. to base station 1100. In this way, phase information that is fed back can be reduced from a range of 0 to 2π to a range of 0 to π/4.

Thus far, a feedback phase information conversion method for use when a signal point arrangement is QAM has been described, but when the signal point arrangement is not QAM, but, for example, 8PSK, feedback phase information conversion can be performed as follows.

FIG. 31B(i) shows an 8PSK signal point arrangement. As shown in FIG. 31B(i), 8PSK has a signal point arrangement with the I axis as an axis of symmetry. Also, 8PSK has a signal point arrangement with an axis with a π/8 phase amount from the I axis as an axis of symmetry. Here, a signal point arrangement in which the 8PSK signal point phase amount is changed by π/4 is shown in FIG. 31B(j). As can be seen from FIG. 31B(j), 8PSK with the phase amount changed by π/4 has the same signal point arrangement as the original signal point arrangement.

Based on the above, in the case of 8PSK, as in the case of QAM, it is possible to reproduce candidate signal points by means of 0 to π/8 phase information. For example, if 0≦arg$(r_{12})$<π/8 as shown in FIG. 31B(k), R matrix non-diagonal element phase amount arithmetic calculation section 1003 of terminal 1000 (FIG. 27) feeds back φ=arg$(r_{12})$, and if π/8≦arg$(r_{12})$<π/4 as shown in FIG. 31B (1), terminal 1000 feeds back φ=π/4−arg$(r_{12})$.

By utilizing axial symmetry of modulation signal points in this way, it is possible to limit the range of phases fed back. Possible phase range limitation is as follows. Assume that a certain modulation signal point set C is symmetrical about axis X, and that modulation signal point set C is symmetrical about axis Y differing from axis X. Assume that a phase difference between axis X and axis Y at this time is ψ (where 0<ψ≦π/2). Furthermore, assume that signal point set C' changed by phase amount Φ from axis X relative to modulation signal point set C is the same original modulation signal point set C. Here, if an axis for which Φ phase rotation is performed relative to axis X is designated Z, by converting a phase amount to be fed back to a phase amount from axis X or a phase amount from axis Z, it is possible to limit the fed-back phase range to 0 to ψ.

Here, if quantization is performed as follows by R matrix element amplitude ratio arithmetic calculation section 1002 and R matrix non-diagonal element phase amount arithmetic calculation section 1003 when feedback channel phase information and amplitude ratio information is quantized, the effect of an error occurring at the time of feedback can be lessened.

Figure 32:
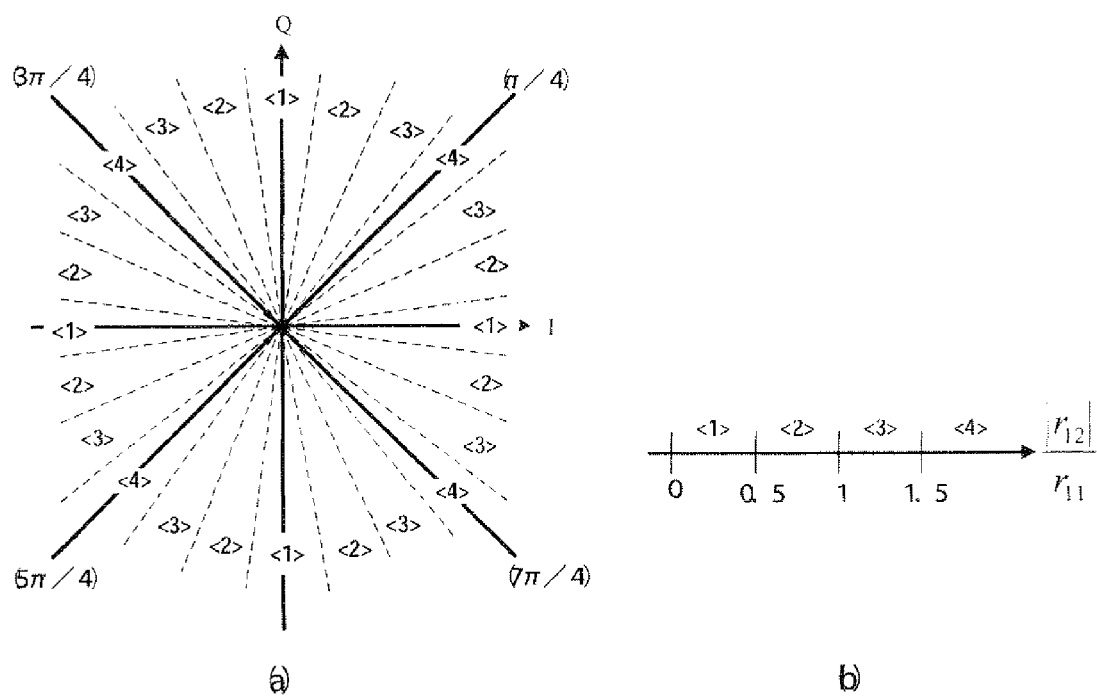
FIG. 32(a) is a drawing provided to explain phase information quantization according to Embodiment 6.
FIG. 32(b) is a drawing provided to explain amplitude ratio quantization according to Embodiment 6.

FIG. 32 shows examples of quantization methods for feedback phase information and amplitude ratio information. FIG. 32(a) shows an example of a phase information quantization methods and FIG. 32(b) shows an example of an amplitude ratio information quantization method. It has been stated above that when a QAM modulation scheme is used, the fed-back phase information range may be made 0 to π/4. FIG. 32(a) illustrates a quantization method used when the feedback phase information range may be made 0 to π/4, and the quantization bit width is made 2 bits, for example, and FIG. 32(b) illustrates a quantization method used when the amplitude ratio quantization bit width is made 2 bits, for example. When the quantization bit width is made 2 bits, a quantization object is divided into four (=$2^2$) areas.

Phase values or amplitude ratios that have consecutive values are present in one or another of the areas obtained by division. At this time, phase values or amplitude ratios that have consecutive values are represented by a particular fixed value in an existing area. In this way, phase values or amplitude ratios that have consecutive values are quantized. Quantization-width (in FIG. 32, 2-bit) binary values are assigned to areas divided by performing quantization.

At this time, the following rule is applied to assigned binary values in order to lessen the effect of an error arising during feedback. This rule is that, for areas obtained by division, a binary value assigned to a first area and a binary value assigned to an area adjacent to the first area should be binary values that differ by only 1 bit.

In FIGS. 32(a) and (b), when four divided areas "1<1>, <2>, <3>, <4>" are taken as indices representing respective adjacent areas, binary values are assigned as follows: "<1>: 00, <2>: 01, <3>: 11, <4>: 10". As can be seen from FIGS. 32(a) and (b), adjacent areas all have binary values differing by only 1 bit. When binary values quantized in this way are fed back, feedback information is assumed to be incorrect by 1 bit on the side receiving feedback information. With regard to information reproduced from feedback information at this time, since information of an adjacent area is reproduced, even if feedback information is incorrect by 1 bit, the only effect is that information reproduced from feedback information is reproduced as information of an adjacent area.

Here, it will be assumed that a binary value differing by 1 bit from a binary value assigned to a post-quantization area is assigned to a non-adjacent area If this is done, when feedback information is incorrect by 1 bit on the side receiving feedback information, information reproduced from feedback information is reproduced as information of a non-adjacent area. In this case, the error of information reproduced from feedback information becomes large due to a feedback information error. In view of this, the effect of error of information reproduced from feedback information due to a feedback information error can be lessened by having R matrix element amplitude ratio arithmetic calculation section 1002 and P matrix non-diagonal element phase amount arithmetic calculation section 1003 make binary values assigned to post-quantization areas binary values that differ by only 1 bit between adjacent areas.

Also, if fed-back phase values are limited to a range of 0 to π/4, an area to which the same binary value has been assigned appears every π/4. For example, there is an index <4> area before and after a phase value of π/4. Therefore, when R matrix non-diagonal element phase amount arithmetic calculation section 1003 quantizes fed-back phase width P at equal intervals, if the quantization bit width is designated n bits, the interval of areas divided by quantization should be made P/($2^n$−1). Deciding an area interval for division by quantization in this way enables equidistant division areas to be generated.

On the other hand, there is a possibility of an amplitude ratio having a value that is infinite or asymptotic with respect to 0. Consequently, R matrix element amplitude ratio arithmetic calculation section 1002 may also perform quantization into non-equidistant division areas, unlike the illustration in FIG. 32(b).

Base stations 1100 (FIG. 28) and 1200 (FIG. 29) of this embodiment have a configuration that performs preceding based on feedback information from terminal 1000 (FIG. 27). In this case, base stations 1100 (FIG. 28) and 1200 (FIG. 29) may use mapping sections 104 and 105 shown in FIG. 1 instead of generating mapped signal points using common signal point mapping sections 701 and 702. That is to say, a preceding effect of a minimum value of distances between candidate signal points used by MLD arithmetic calculation section 501 of terminal 1000 being made larger can also be obtained by using conventional mapping sections 104 and 105. More desirably still, the effect of Embodiments 1 through 4 of sharing a square Euclidean distance between a received signal point and candidate signal point found by MLD arithmetic calculation section 501 can be obtained by using common signal point mapping sections 701 and 702.

In this embodiment, base stations 1100 and 1200 have illustrated configurations in which a different precoding matrix is selected for performing precoding according to a channel. In this case, base stations 1100 and 1200 may also employ a configuration whereby signal points that are shared are changed according to a channel in signal point sharing by respective modulation schemes, instead of holding different precoding matrices.

Figure 33:
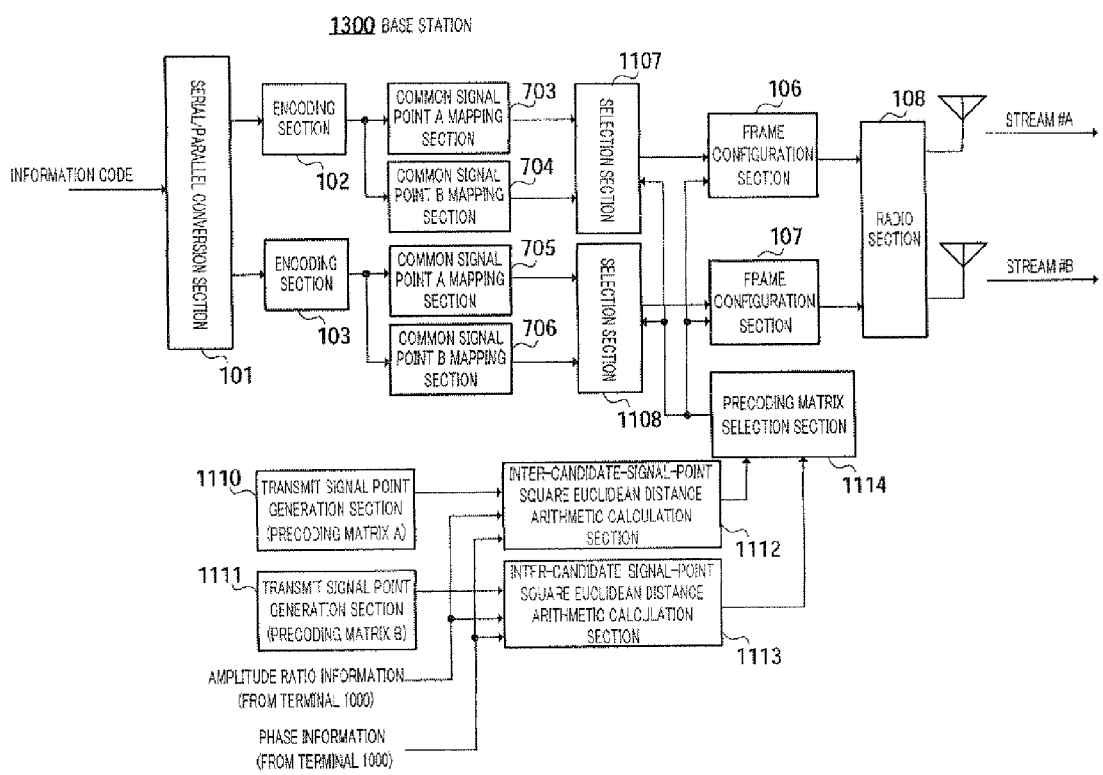
FIG. 33 is a block diagram showing a configuration of a base station of Embodiment 6.

FIG. 33 shows an example of a base station that implements this. In FIG. 33, in which parts corresponding to those in FIG. 28 are assigned the same reference codes as in FIG. 28, instead of having preceding section (preceding matrix A) 1101 and preceding section (preceding matrix B) 1102, base station 1300 has common signal point A mapping sections 703 and 705 and common signal point B mapping sections 704 and 706 such that signal points that are shared differ in signal point sharing by respective modulation schemes.

Figure 34:
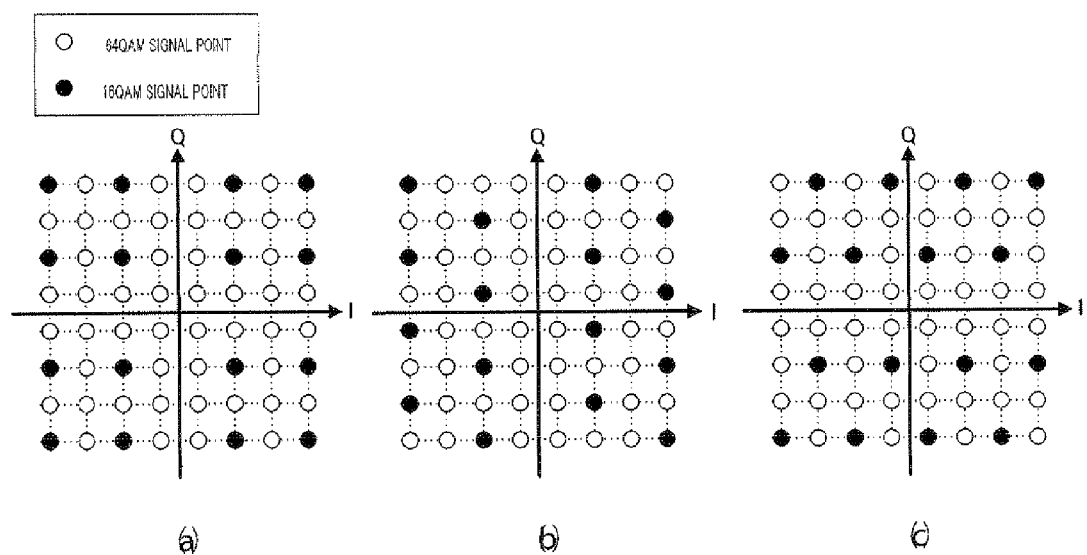
FIG. 34(a) through (c) are drawings showing three patterns in which the modulation signal point sharing method differs between 64QAM and 16QAM.

Examples of different signal point sharing patterns are shown in FIG. 34. FIG. 34 shows three patterns in which the modulation signal point sharing method differs between 64QAM and 16QAM. As shown in FIG. 34, changing the signal point sharing method is equivalent to changing the signal point arrangement of one stream (here, 16QAM) relative to the other stream (here, 64QAM). This has the same kind of effect as changing the phase of modulation signal points of one stream in preceding. Moreover, by using common signal point mapping sections 703, 704, 705, and 706, the effect of Embodiments 1 through 4 of sharing a square Euclidean distance between a received signal point and candidate signal point found by MLD arithmetic calculation section 501 can be obtained. In view of the above, base station 1300 may also employ a configuration whereby signal points that are shared by respective modulation schemes are changed according to a channel, instead of holding different precoding matrices.

Terminal 1000 shown in FIG. 27 employs a configuration whereby amplitude ratio information and phase information generated by R matrix element amplitude ratio arithmetic calculation section 1002 and R matrix nondiagonal element phase amount arithmetic calculation section 1003 is fed back to base station 1100. Separately from this, the configuration shown in FIG. 35 may also be used for a terminal.

Figure 35:
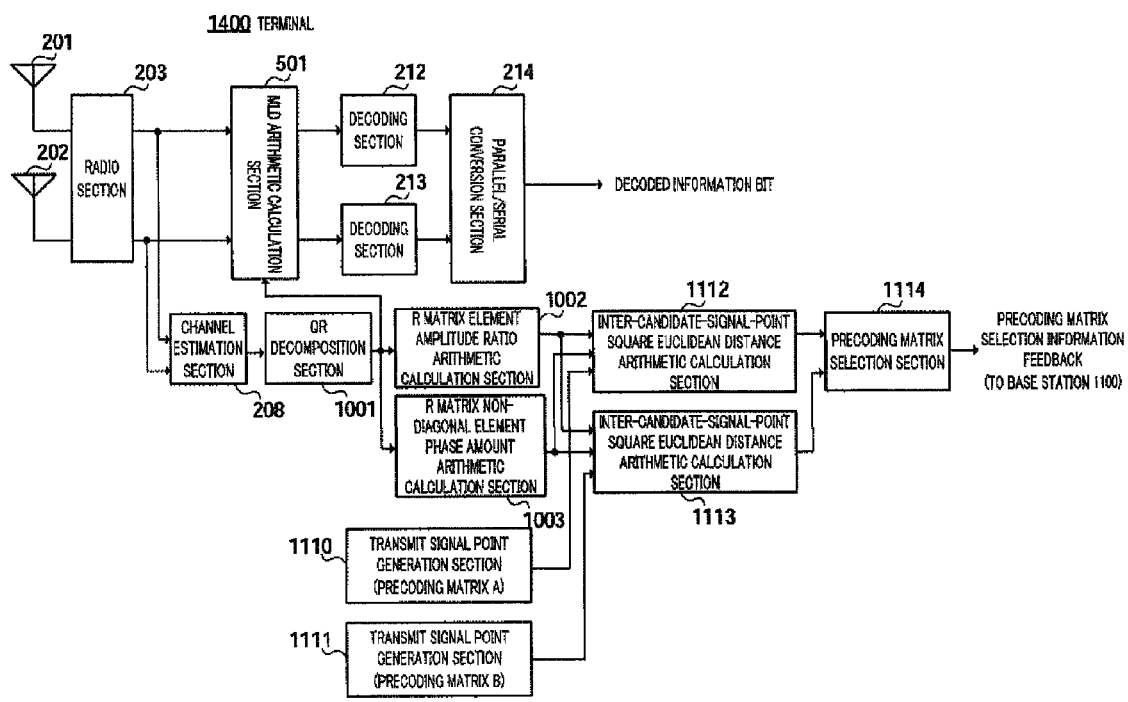
FIG. 35 is a block diagram showing a configuration of a terminal of Embodiment 6.

Terminal 1400 in FIG. 35, in which parts corresponding to those in FIG. 27 and FIG. 28 are assigned the same reference codes as in FIG. 27 and FIG. 28, selects a precoding matrix to be used in precoding by base station 1100 (FIG. 28), and feeds back information indicating the selected precoding matrix to base station 1100. in addition to the configuration of terminal 1000 shown in FIG. 27, terminal 1400 has transmit signal point generation section (preceding matrix A) 1110, transmit signal point generation section (preceding matrix B) 11, inter-candidate-signal-point square Euclidean distance arithmetic calculation sections 1112 and 1113, and preceding matrix selection section 1114. The configurations of these parts are similar to the configurations used by base station 1100 shown in FIG. 28. R matrix element amplitude ratio arithmetic calculation section 1002 and R matrix non-diagonal element phase amount arithmetic calculation section 1003 output a respectively generated R matrix constituent element amplitude ratio and R matrix non-diagonal element phase component to inter-candidate-signal-point square Euclidean distance arithmetic calculation sections 1112 and 1113.

Transmit signal point generation section (preceding matrix A) 1110 generates signal point $s_A$ on which preceding processing has been executed using preceding matrix $W_A$, and outputs the generated signal point to inter-candidate-signal-point square Euclidean distance arithmetic calculation section 1112. Similarly, transmit signal point generation section (preceding matrix B) 1111 generates signal point $s_B$ on which preceding processing has been executed using preceding matrix $W_B$, and outputs the generated signal point to inter-candidate-signal point square Euclidean distance arithmetic calculation section 1113.

Inter-candidate-signal-point square Euclidean distance arithmetic calculation sections 1112 and 1113 compute square Euclidean distances between candidate signal points used in MLD arithmetic calculation when $s_A$ and $s_B$ are transmitted. Inter-candidate-signal-point square Euclidean distance arithmetic calculation sections 1112 and 1113 output minimum values of found square Euclidean distances between candidate signal points.

Precoding matrix selection section 1114 selects the preceding matrix for which minimum values of square Euclidean distances between candidate signal points input from inter-candidate-signal-point square Euclidean distance arithmetic calculation sections 1112 and 1113 become larger. Precoding matrix selection section 1114 outputs preceding matrix selection information indicating a selected preceding matrix to base station 1100.

Base station 1100 executes preceding processing on post-mapping signal points using a preceding matrix indicated by preceding matrix selection information fed back from terminal 1400.

If the number of preceding matrices used by base station 1100 is designated $N_p$, precoding matrix selection information generated by precoding matrix selection section 1114 of terminal 1400 can be represented by ceil($\log_2 (N_p)$)-bit information, where ceil(X) is a function that returns an integer obtained by rounding-up a fractional part, and if a is an integer, returns a when a−1<X≦a. Here, the total number of R matrix amplitude ratio and non-diagonal term phase information items generated by R matrix element amplitude ratio arithmetic calculation section 1002 and R matrix non-diagonal element phase amount arithmetic calculation section 1003 is $N_{Tx}^2-1$, where $N_{Tx}$ represents the number of signal streams transmitted by base station 1100. Therefore, when ceil ($\log_2 (N_p)$)≦$N_{Tx}^2-1$, it is possible to reduce the amount of information fed back from terminal 1400 to base station 1100 by using precoding matrix selection information as feedback information.

If base station 1100 employs a configuration whereby signal points that are shared are changed according to a channel as shown in FIG. 33 instead of performing preceding, terminal 1400 may feed back information indicating signal points that are shared instead of information indicating a selected precoding matrix.

The disclosure of Japanese Patent Application No. 2007-010817, filed on Jan. 19, 2007, including the specification, drawings and abstract, is incorporated herein by reference in its entirety.

INDUSTRIAL APPLICABILITY

The present invention is suitable for use in a MIMO-AMC system.

The invention claimed is:

1. A multi-antenna transmitting apparatus comprising:
a mapping section that maps data transmitted from different antennas in a transmission scheme using multiple-input multiple-output spatial-multiplexing, to a signal point shared by respective different modulation schemes so that average transmission power of each modulation scheme is the same as or of the same order as a pilot signal; and
a transmitting section that transmits a modulated signal obtained by execution of mapping of the same or different modulation schemes by the mapping section, using multiple-input multiple-output spatial-multiplexing scheme.

2. The multi-antenna transmitting apparatus according to claim 1, wherein the mapping section shares some signal points of respective modulation schemes so that average transmission power of each modulation scheme is the same as or of the same order as a pilot signal.

3. A multi-antenna transmitting apparatus comprising:
a mapping section that maps data transmitted from different antennas in a transmission scheme using multiple-input multiple-output spatial-multiplexing, to a signal point according to respective different modulation schemes;
a pilot signal generation section that generates a pilot signal for which a signal point arrangement differs for each modulation scheme and in which a relative position of a signal point of a signal with respect to a signal point of the mapping section is shared by respective different modulation schemes so that average transmission power of one modulation scheme is the same as or of the same order as that of another modulation scheme; and
a transmitting section that transmits a modulated signal obtained by the mapping section and a pilot signal generated by the pilot signal generation section, using multiple-input multiple-output spatial-multiplexing scheme.

4. A multi-antenna receiving apparatus comprising:
a receiving section that receives at a plurality of antennas a spatial-multiplexed signal transmitted by a multi-antenna transmitting apparatus;
a channel estimation section that estimates a condition of a communication channel traversed by the spatial-multiplexed signal; and
an MLD arithmetic calculation section that performs maximum likelihood detection arithmetic calculation using a channel estimation value from the channel estimation section and also using a signal point shared by respective different modulation schemes, wherein the signal point is on a constellation defined such that an average transmission power of one modulation scheme is the same as or of the same order as an average transmission power of another modulation scheme as a candidate signal point.

5. A multi-antenna receiving apparatus comprising:
a receiving section that receives at a plurality of antennas a spatial-multiplexed signal in which signal points of respective different modulation schemes are shared so that average transmission power of each modulation scheme is the same as or of the same order as a pilot signal;
a channel estimation section that estimates a condition of a communication channel traversed by the spatial-multiplexed signal; and
a maximum likelihood detection arithmetic calculation section that performs maximum likelihood detection arithmetic calculation using a channel estimation value from the channel estimation section and also using a relative position of a signal point of each modulation scheme as a reference point of a pilot signal.

6. A multi-antenna transmitting method comprising:
a mapping step of mapping data transmitted from different antennas in a transmission scheme using multiple-input multiple-output spatial-multiplexing, to a signal point shared by respective different modulation schemes so that an average transmission power of one modulation scheme is the same as or of the same order as an average transmission power of another modulation scheme; and
a step of transmitting a modulated signal obtained by execution of mapping of the same or different modulation schemes in the mapping step, using multiple-input multiple-output spatial-multiplexing scheme.

7. A multi-antenna receiving method comprising:
a receiving step of receiving at a plurality of antennas a spatial-multiplexed signal transmitted by a multiantenna transmitting apparatus;
a channel estimation step of estimating a condition of a communication channel traversed by the spatial-multiplexed signal; and
an maximum likelihood detection arithmetic calculation step of performing maximum likelihood detection arithmetic calculation using a channel estimation value estimated by the channel estimation step and also using a signal point shared by respective different modulation schemes, wherein the signal point is on a constellation defined such that an average transmission power of one modulation scheme is the same as or of the same order as an average transmission power of another modulation scheme as a candidate signal point.

8. A terminal apparatus that performs multi-antenna communication using preceding with a base station apparatus, the terminal apparatus comprising:
a channel estimation section that performs channel estimation using a received pilot signal and generates a channel estimation matrix;
a QR decomposition section that performs QR decomposition of a channel estimation matrix generated by the channel estimation section; and
an R matrix nondiagonal element phase amount arithmetic calculation section that calculates a phase amount of phase components in a non-diagonal position in the upper triangle within an R matrix obtained by QR decomposition by the QR decomposition section, that feeds back information indicative of the phase components of elements of complex number to the base station apparatus.

9. The terminal apparatus according to claim 8, further comprising an R matrix element amplitude ratio arithmetic calculation section that takes a specific element among elements present at a position in an upper triangle within an R matrix obtained by QR decomposition by the QR decomposition section as a reference, calculates an amplitude ratio with respect to the element taken as a reference for an element other than the specific element in an upper triangle of the R matrix, and feeds back an amplitude ratio obtained by the arithmetic calculation to the base station.

10. The terminal apparatus according to claim 9, wherein the R matrix element amplitude ratio arithmetic calculation section, when quantizing information of the amplitude ratio, performs quantization so that, for areas obtained by dividing a quantization object, a binary value assigned to a first area and a binary value assigned to an area adjacent to the first area are binary values that differ by only 1 bit.

11. The terminal apparatus according to claim 8, wherein the R matrix non-diagonal element phase amount arithmetic calculation section, when quantizing information of the phase component, performs quantization so that, for areas obtained by dividing a quantization object, a binary value assigned to a first area and a binary value assigned to an area adjacent to the first area are binary values that differ by only 1 bit.

12. A base station apparatus that performs multi-antenna communication using precoding with a terminal apparatus, the base station apparatus comprising:
- a transmit signal point generation section that has a plurality of precoding matrices that become candidates, and generates a transmit signal point by multiplying a post-mapping signal by the precoding matrix that becomes a candidate;
- an inter-candidate-signal-point square Euclidean distance arithmetic calculation section that reproduces an R matrix using R matrix amplitude ratio information and phase information fed back from the terminal apparatus, generates a candidate signal point using the reproduced R matrix and a transmit signal point generated by the transmit signal point generation section, and computes a square Euclidean distance between the generated candidate signal points;
- a preceding matrix selection section that selects a preceding matrix such that a square Euclidean distance computed by the inter-candidate-signal-point square Euclidean distance arithmetic calculation section becomes a maximum; and
- a precoding section that multiplies a preceding matrix selected by the preceding matrix selection section by a post-mapping signal point.

13. A base station apparatus that performs multi-antenna communication using precoding with a terminal apparatus, the base station apparatus comprising:
- a transmit signal point generation section that, when sharing a signal point between different modulation schemes, generates a transmit signal point that is shared by a plurality of sharing methods;
- an inter-candidate-signal-point square Euclidean distance arithmetic calculation section that reproduces an R matrix using R matrix amplitude ratio information and phase information fed back from the terminal apparatus, generates a candidate signal point using the reproduced R matrix and a transmit signal point generated by the transmit signal point generation section, and computes a square Euclidean distance between the generated candidate signal points;
- a common signal point selection section that selects a signal point sharing method from among the plurality of sharing methods such that a square Euclidean distance computed by the inter-candidate-signal-point square Euclidean distance arithmetic calculation section becomes a maximum; and
- a common signal point mapping section that performs mapping to a modulation signal point using a signal point sharing method selected by the common signal point selection section.

* * * * *